United States Patent
Selsam

(10) Patent No.: US 8,197,179 B2
(45) Date of Patent: *Jun. 12, 2012

(54) STATIONARY CO-AXIAL MULTI-ROTOR WIND TURBINE SUPPORTED BY CONTINUOUS CENTRAL DRIVESHAFT

(76) Inventor: Douglas Spriggs Selsam, Fullerton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/370,739

(22) Filed: Mar. 7, 2006

(65) Prior Publication Data

US 2006/0233635 A1    Oct. 19, 2006

Related U.S. Application Data

(63) Continuation-in-part of application No. 10/810,375, filed on Mar. 27, 2004, now Pat. No. 7,063,501, and a continuation-in-part of application No. 10/781,213, filed on Feb. 17, 2004, now Pat. No. 7,008,172, which is a continuation-in-part of application No. 09/997,499, filed on Nov. 23, 2001, now Pat. No. 6,692,230, which is a continuation-in-part of application No. 09/881,511, filed on Jun. 14, 2001, now Pat. No. 6,616,402.

(60) Provisional application No. 60/712,792, filed on Aug. 30, 2005.

(51) Int. Cl.
*F03B 15/06* (2006.01)

(52) U.S. Cl. .................. 415/4.5; 416/198 R; 416/244 R

(58) Field of Classification Search .................. 415/4.1, 415/4.3, 4.5, 908; 416/1, 131, 120, 123, 416/124, 132 B See application file for complete search history.

(56) References Cited

U.S. PATENT DOCUMENTS

| | | | | |
|---|---|---|---|---|
| 582,000 | A * | 5/1897 | Smith | 416/120 |
| 1,371,836 | A * | 3/1921 | Antz | 416/10 |
| 4,151,424 | A | 4/1979 | Bailey | |
| 4,165,468 | A * | 8/1979 | Fry et al. | 290/55 |
| 4,450,364 | A * | 5/1984 | Benoit | 290/55 |
| 5,040,948 | A * | 8/1991 | Harburg | 416/85 |
| 5,328,334 | A * | 7/1994 | McCauley | 416/196 A |
| 6,080,343 | A * | 6/2000 | Kaufman et al. | 264/40.5 |
| 7,008,172 | B2 * | 3/2006 | Selsam | 415/4.5 |
| 7,299,627 | B2 * | 11/2007 | Corten et al. | 60/398 |

OTHER PUBLICATIONS

Chinese Patent Application No. 200680039677.X Office Action; Dec. 19, 211.

* cited by examiner

*Primary Examiner* — Edward Look
*Assistant Examiner* — Dwayne J White
(74) *Attorney, Agent, or Firm* — Knobbe, Martens, Olson & Bear LLP

(57) ABSTRACT

Co-axial, multi-rotor wind turbines, producing more power than a single rotor of the same diameter, are made even more powerful by increasing driveshaft length and supporting the driveshaft from more than one point. Sacrificing the ability to aim, for the extra length to support additional rotors, results in a more powerful co-axial multi-rotor turbine, especially useful for areas with a predominantly unidirectional wind resource. Ideally the turbine is placed at an offset angle α (alpha) from the wind direction, which, in combination with proper spacing between rotors, allows fresh wind to reach each rotor, so that all rotors contribute toward rotation of the driveshaft. Placing the driveshaft under tension can raise critical speeds and reduce the number of intermediate supports required. This places the Earth or underlying substrate in compression, making it effectively part of the structure of the turbine, saving cost. Cross-axis and reversible blades may also be incorporated.

43 Claims, 46 Drawing Sheets

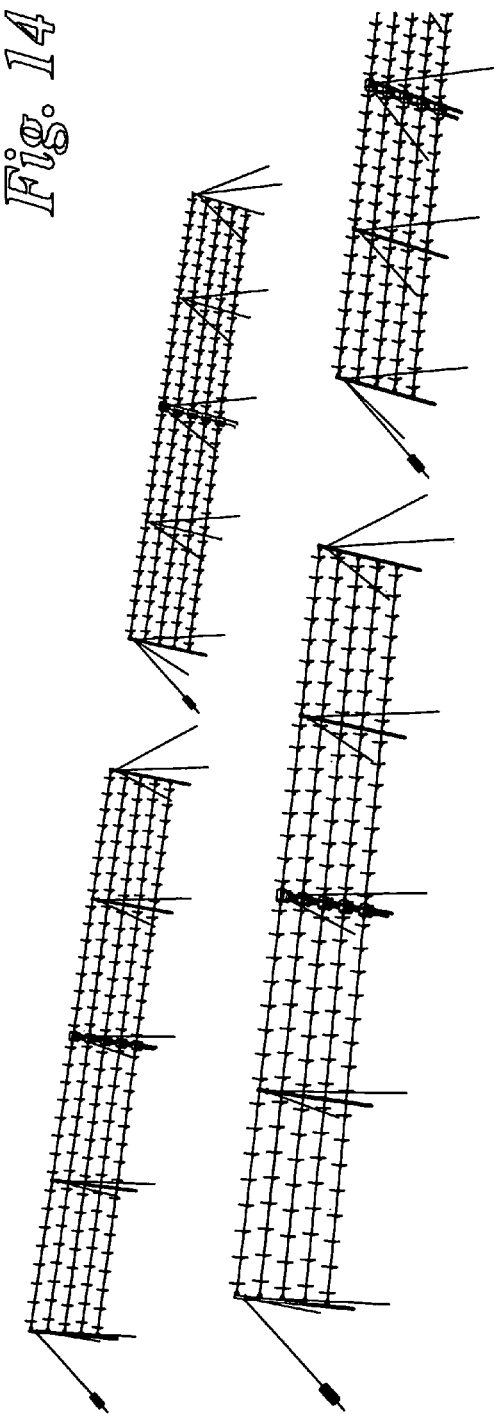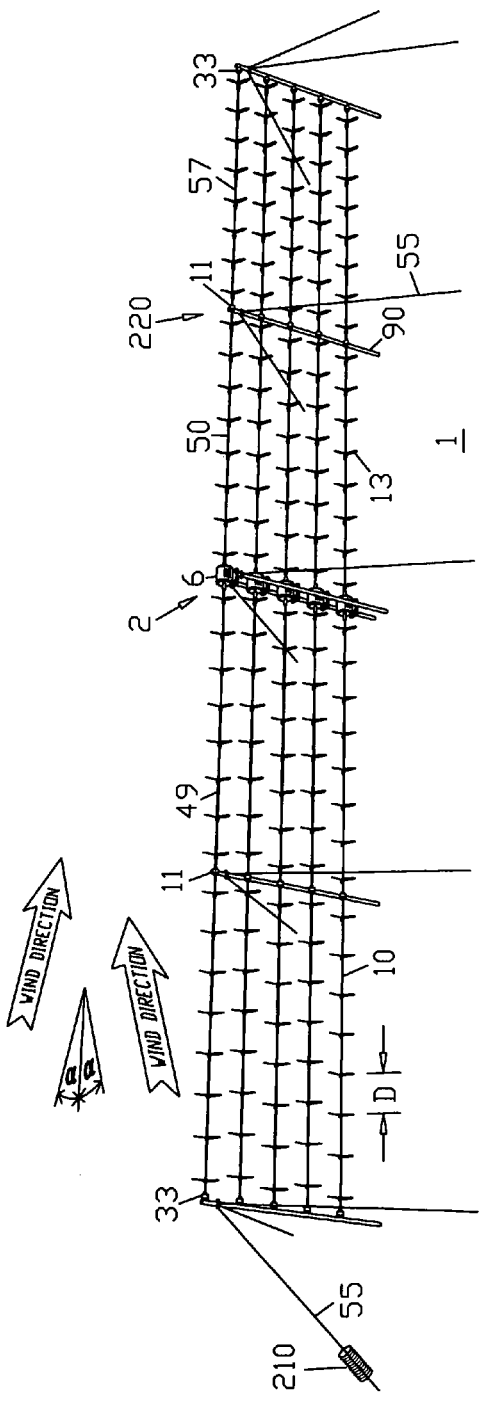

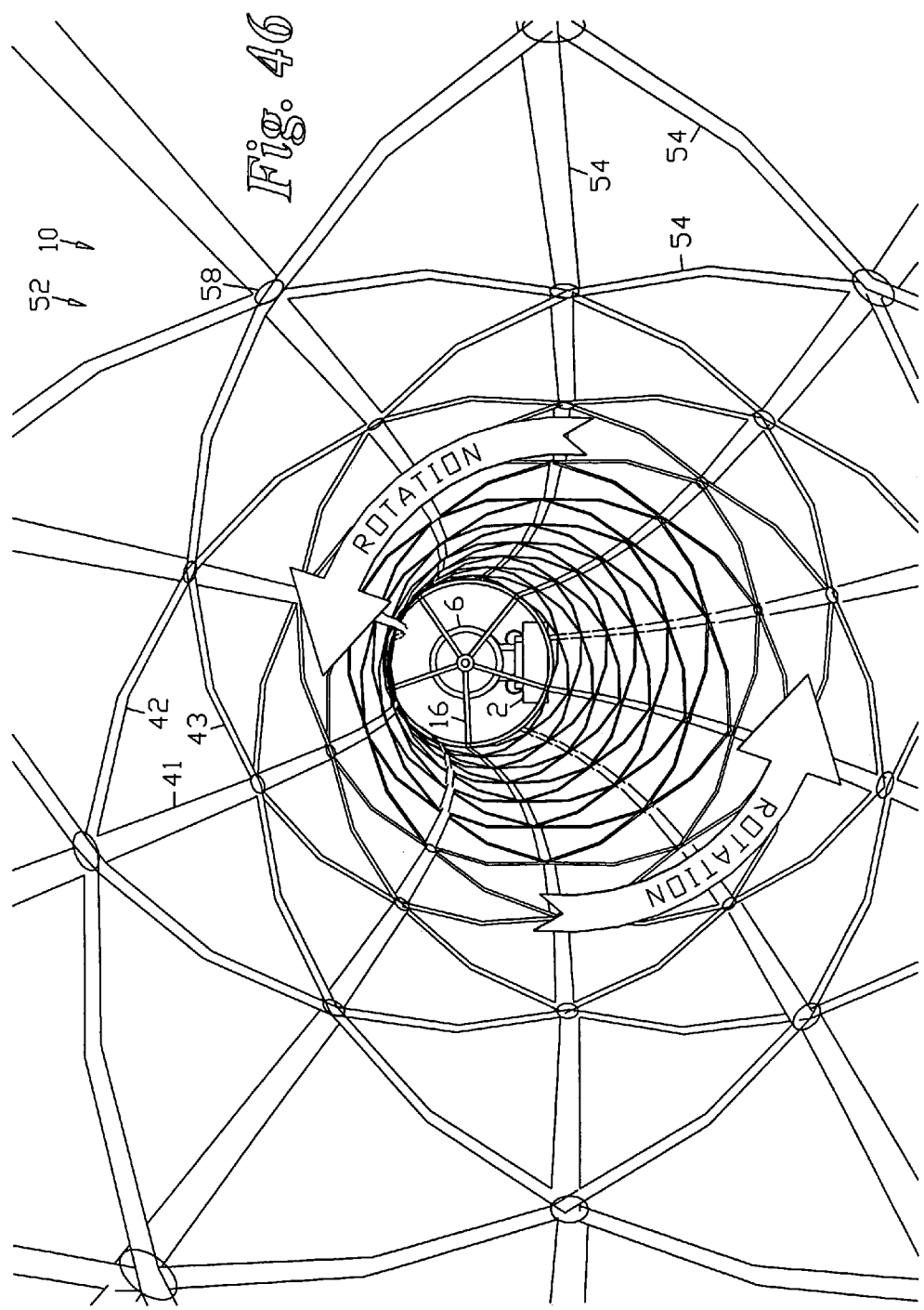

STATIONARY CO-AXIAL MULTI-ROTOR WIND TURBINE SUPPORTED BY CONTINUOUS CENTRAL DRIVESHAFT

CROSS-REFERENCE TO RELATED APPLICATIONS

This patent application claims priority from U.S. Provisional Patent Application No. 60/712,792, filed Aug. 30, 2005, and is a continuation-in-part of U.S. patent application Ser. No. 10/810,375, filed Mar. 27, 2004 now U.S. Pat. No. 7,063,501, and is a continuation-in-part of U.S. patent application Ser. No. 10/781,213, filed Feb. 17, 2004, issued as U.S. Pat. No. 7,008,172, which is a continuation-in-part of U.S. patent application Ser. No. 09/997,499, filed Nov. 23, 2001, issued as U.S. Pat. No. 6,692,230, which is a continuation-in-part of U.S. patent application Ser. No. 09/881,511, filed Jun. 14, 2001, issued as U.S. Pat. No. 6,616,402, the entireties of which are incorporated by reference herein and made a part of the present disclosure.

BACKGROUND OF THE INVENTION

This invention relates to windmills and wind turbines. (art unit 3745)

PRIOR ART

Power output of a wind turbine is proportional to the area swept by the blades. Traditionally, this swept area has been increased by increasing the rotor (propeller) diameter. This practice has resulted in disproportionately heavy blades and lowered rotational speed (low RPM), which have then required more gearing to drive a high-speed generator.

U.S. Pat. Nos. 6,616,402, 6,692,230, 7,008,172, and 7,063,501, issued to this inventor, and related PCT filings, reveal a new method for multiplying the swept area of a wind turbine, without increasing diameter, by lengthening the driveshaft and adding several extra rotors. Power output is multiplied in proportion to the number of rotors. We maintain the light weight and high RPM of smaller rotors, combined with the increased swept area and higher power output of a larger turbine, essentially achieving the best of both worlds, with a single moving part. The higher RPM can directly drive a generator, bypassing the need for a gearbox. The self-aiming driveshaft, with its rotors attached at spaced intervals, is normally oriented at an optimum offset angle $\alpha$ (alpha) to the wind direction, which, in combination with the spacing between blades, brings fresh wind to each rotor, for maximum swept area, and maximum power. A change in this directional alignment of the driveshaft in response to excessive winds reduces exposed swept area for overspeed protection.

One example is our prototype turbine funded by The California Energy Commission in 2004, which may be referenced at http://www.selsam.com. Power output was multiplied six fold using a total of seven rotors. Rotor spacing of 1.6 diameters and an offset driveshaft angle $\alpha$ (alpha) of 25 degrees from the wind direction, allowed near maximum power to be contributed by all rotors. In very strong winds the driveshaft was blown parallel to the wind, ($\alpha$ (alpha)=0 degrees) placing all rotors within the protective zone of the wake generated by the first rotor, reducing total power output, to prevent damage. Lighter total blade weight, and higher RPM that allows the use of a direct-drive generator, eliminating the gearbox, are distinct advantages of this new wind energy technology.
Engineering Challenges in Wind Turbine Design:

With wind energy now the fastest-growing segment of the energy industry, the traditional approach of meeting the demand for more powerful turbines by further increasing rotor diameter, results in three major engineering limitations:

First, larger blades produce less power for the amount of material used. Blade weight varies as the cube of diameter, power varies as the square of diameter; with increasing diameter, blade weight grows faster than power output, so larger blades are less economical.

Second, as rotor diameter increases, RPM drops: larger rotors turn slower, requiring more gearing to drive a generator. With the largest rotors turning at less than 10 rpm, and generators requiring up to 1800 rpm, a multi-stage gearbox is normally required.

Third, drivetrain torque, like blade weight, is a cubic function in relation to diameter, and so torque also increases disproportionately to power output as diameter increases. For larger diameter turbines, turning slower yet delivering more power, the gearbox must be made disproportionately stronger than the extra power produced. Wear on gear teeth and bearings is a major cause of expensive downtime and repair.

Direct-drive, large-diameter, low RPM, permanent magnet ring generators are one effective, but expensive solution. It is desired in the art to provide a higher initial RPM, to reduce the required diameter and cost of a direct-drive generator, or to reduce the amount of gearing.
We Solved the Above Three Challenges:

Our self-aiming design of several rotors mounted on a common driveshaft, gathered more power, without the undesirable increase in diameter. We combined the greater power of a large turbine with the high RPM of a small turbine, to directly drive a permanent-magnet generator of reasonable size, eliminating the gearbox. The result was a more reliable, economical turbine.

Overspeed Protection Overspeed protection was accomplished by aligning the driveshaft parallel to the wind, placing all rotors behind the first so wake effects reduce output, or by aligning the driveshaft across the wind, so that rotors face the wind edge-on, also reducing output. Stall control and pitch control are also possible using multiple rotors.

Low Wind Speed Performance: Lighter winds prevail near cities where energy is used. Our added swept area increased output in low winds, allowing effective placement near cities and other low wind locations. The configuration defined the answer to the long-sought "Low Wind Speed Turbine" (LWST), or "Expanded Wind Regime Turbine".

Passive Aim: The predominantly downwind nature of many versions disclosed replaced the normal tail or yaw control mechanism of conventional turbines.

Spinning Tower Our design was even reduced to a single moving part in many embodiments—a flexible, cantilevered, projecting, rotating "tower/driveshaft" combining the functions of a tower and a driveshaft, accomplishing passive downwind aim and overspeed protection by its bending response, and/or a resilient mount.

Compliant Mounting Means: The aiming function of the bending driveshaft was augmented by a directionally compliant mounting means for the base in some embodiments. One such directionally compliant mounting was placement in water, with flotation and weight distribution allowing the entire assembly to optimally tilt with the wind.

The Answer for Offshore: Our floating, tilting, offshore version had a single moving part, needing no rigid foundation, no gearbox, no yaw mechanism, no heavy steel tower, no crane with ship and crew for installation or maintenance, thereby solving most of the high-cost challenges of offshore wind.

Incorporation of "Vertical Axis" Blades: Cross-axis, also known as "vertical axis" blades were also incorporated, either separately attached to the driveshaft, attached to the horizontal axis (propeller) blades (using the horizontal axis blades as armatures), or comprising a structural matrix or mesh that augments or replaces the central driveshaft, forming a spinning lattice tower/driveshaft, which replaced the function of a normal, stationary tower.

Building-Mounted Turbines: Plenty of tower/blade clearance, make the long-sought "urban turbine" a possibility using several versions of our designs, which could be placed on top of a conventional hi-rise building.

Multiple Multi-Rotor Turbines Mounted Together: Multiple driveshafts supported on the same aiming frame have been disclosed as a way to provide more total driveshaft length, to support more rotors, providing more power.

Additional Driveshaft Support from a Central Frame: Auxiliary support for an extended driveshaft, using outboard bearings supported by guy wires, trusses, booms, support frames, etc. are possible, with several examples having been disclosed. These methods provide for a longer driveshaft while preserving directional aim, but are still limited in the number of additional rotors that can be supported at effective spacing intervals.

Armatures and Lashing: lashing extending from one rotor to the next, blade to blade, rotor to rotor, or armature to armature, to augment driveshaft stiffness and torque transmission were disclosed.

Tails to Tilt each Rotor Forward to Provide Lift: Aerodynamic control surfaces making each rotor a "flying machine" were disclosed. This relieved the driveshaft of the task of elevating the rotors, and placed the driveshaft in tension, allowing a longer, thinner, driveshaft that could support more rotors, to produce more power. Passive aim was preserved.

Buoyant Blades: Blades filled with helium or hydrogen to elevate the structure, augmenting or replacing the function of a normal tower were also disclosed. Such buoyant blades reduced or eliminated the requirement for stiffness of the driveshaft by providing an elevating means for themselves and the driveshaft, and placing by the driveshaft under tension. This allowed a longer driveshaft to project higher, exposing more rotors to more wind, producing more power, while preserving passive aim. Longer Suspended Driveshaft under Tension Extending Downwind to Lifting Body: Attaching a kite, glider, airfoil, parafoil, balloon, blimp, dirigible, zeppelin, or other lifting body to elevate the distal end of our driveshaft was also disclosed. The very long driveshaft was suspended between an upwind base and a downwind support point located proximate the lifting body, automatically and passively aimed in real time by the force of the wind. With the driveshaft so suspended between 2 points, the elevating function of the normal tower is preserved, and the requirement for driveshaft stiffness was reduced or eliminated.

These versions incorporating aerodynamic and buoyant lifting bodies such as a kite or blimp could be more powerful, since they could support such a longer driveshaft, suspended between the base from which it projects, and the lifting body, which is conveniently blown downwind, maintaining automatic, passive driveshaft aim. The requirement for driveshaft stiffness was lessened by the fact that the pulling force of the lifting body, and of the rotors themselves, as pushed downwind by the thrust force of the wind, placed the very long driveshaft under tension. The added driveshaft length that could be thus supported allowed more rotors, exposing more swept area, producing more power, while maintaining high rpm and passive aiming behavior.

Driveshaft Length has been Limited by Cantilevered, Projecting Method of Support:

The driveshaft length of our projecting, cantilevered designs has been limited by the requirement to support the driveshaft against gravity from a single directional pivot point (yaw bearing), to allow proper aim to be maintained as the wind changes direction. The cantilevered driveshaft configuration demands high stiffness and light weight, limiting length. Additional support means that allow a longer driveshaft while maintaining the ability to aim have been disclosed, but are still limited in their effectiveness. In any case, a driveshaft supported only from a central point is restricted in its practical length. Additional supports, such as lifting bodies, made a longer driveshaft possible, while maintaining proper aim in changing winds, and a vertically offset angle alpha $\alpha$, by providing a second, higher, downwind point of support, and by placing the driveshaft under tension.

Our Research has Shown High Effectiveness and Directional Tolerance:

Our research effort performed in 2004 for the Public Interest Energy Research (PIER) program of the California Energy Commission, USA, put hard numbers to the co-axial, multi-rotor concept in general, setting a world record for power output from a 7-foot diameter turbine, revealing the most effective way yet to augment the power output of a horizontal axis turbine of a given diameter. We showed that substantially full power was delivered by all rotors, when spaced co-axially at intervals of 1.6 diameters on a single, cantilevered, carbon fiber driveshaft. We observed that power output was maximized at an optimum offset angle $\alpha$ (alpha), yet remained at useful levels through a wide range of driveshaft alignment to the wind direction. Normal operation at a 25 degree forward tilt produced 4000 watts at 27 mph (12 m/s), while orienting the driveshaft parallel to the wind (horizontally) still produced 3000 watts, only a 25% decrease. Assuming that comparable output could also be maintained at higher offset angles up to 35 degrees, in any direction (a reasonable assumption based on our experience), yields at least a total 70-degree cone of good performance for driveshaft aim, in relation to the wind. The normal directional variation of the wind resource is far less than this in many areas, especially where windfarms are located.

Five significant observations from our previous research effort with variable-aim, terrestrially-supported turbines then, resulted in the present invention:

1. Power was proportional to the number of rotors that could be supported at sufficiently spaced intervals by the cantilevered driveshaft, which was limited by driveshaft length.

2. Driveshaft length, in turn, was determined by the cost of providing sufficient stiffness, straightness, and light weight demanded by a cantilevered configuration.

3. The cantilevered method of supporting the driveshaft was implemented mainly to allow free directional rotation of the turbine about a central yaw bearing, to maintain continuous, accurate aim into the wind.

4. Exact aim of the driveshaft however, while providing maximum power output, was not essential for at least useful power output. Performance was satisfactory over a significant range of offset angles to the wind direction.

5. The predominant wind resource at our test site prevails from within a narrow directional range, and this relatively unidirectional wind resource is common to most high wind locations.

Remaining Challenges of Our Co-Axial, Multi-Rotor Design Thrust:

Driveshaft power then, has been limited by the number, and effective spacing of the attached rotors, and by the angle and height of the driveshaft in relation to the instantaneous wind resource. The driveshaft length limits the number of rotors that can be mounted on the driveshaft at such an effective spacing interval. A longer driveshaft allows more rotors, properly spaced, so a longer driveshaft allows a more powerful turbine. It is desired to provide such a longer length for our terrestrially supported turbines.

Why Aim What Doesn't Need Aiming?

The co-axial, multi-rotor configuration does not require exact aim, nor is the ability to continually change a turbine's aim particularly important given the unidirectional nature of the resource in many windfarm locations. With the main factor limiting power output and preventing further cost reduction of the co-axial, multi-rotor turbine being in providing the ability to aim, our conclusion leading to the present invention is that a non-aiming version, in many cases, would have advantages over an aiming version. The result would be the ability to support more rotors, and generate more power, at lower cost.

PATENTS AND PRIOR ART OF OTHERS

William Heronemus the famous naval architect promoted the "Windship" concept in the mid $20^{th}$ century. This was a side-by-side array of conventional turbines on a frame projecting upward from a very large floating buoy. Heronemus, long deceased, has nevertheless recently been issued U.S. Pat. No. 6,749,399.

Lagerwey of the Netherlands, a large wind turbine company, has experimented with lateral arrays of multiple turbines on a single frame that can be oriented toward the wind. One example would be U.S. Pat. No. 6,294,844.

Harburg U.S. Pat. No. 5,040,948 Aug. 20, 1991 reveals a turbine comprising a series of sets of 5 separated, parallel lines strung between the extremities of a rotatable hub armature, mounted on an axle, supported by bearings, on a tower, and a distant, similar, rotatable hub armature, with cloth sails mounted on intermediate armatures, suspended between the lines. The lines are attached to the tips of the intermediate armatures, maintaining their distance of separation, so as to best transmit torque. The sails cause their supporting armatures to rotate, with the high torque of the low speed rotation transferred to the parallel lines, which then, by virtue of the leverage afforded by their separation, transmit the torque of the rotating sails to the armature of the next hub. This hub transfers this high torque to a single driveshaft mounted in bearings mounted atop a supporting tower. This driveshaft then turns a subsequent hub with armature, which then drives a further set of 5 separated, parallel lines, extending to a further additional armature, which then rotates a further driveshaft, and so on. At a terminal point, this high torque, low RPM rotation is stepped up in speed by an attached, non-co-axial ratio belt drive. Like many fanciful wind turbine "inventions", that are proposed but never actually built, this concept reveals a lack of real-world wind turbine experience:

Problems with this design include:

Low efficiency, drag-based operation: Harburg's design is restricted to low-speed rotation, due to the extremely low efficiency, low-speed, high-solidity rotors, featuring single-surface cloth sails with no defined airfoil shape rather than blades, a 2000 year-old technology, and because of the aerodynamic drag of the lines attached to the rotor tips: At high speed, a line with a circular cross section has many times the aerodynamic drag of a streamlined shape of the same cross sectional area, such as a blade. A modern high-speed, wind turbine blade is known to be sensitive to even dirt and bugs. The addition of even small appendages, anywhere near the tip of a modern blade, is known to ruin the blade's performance, because the tip is the fastest-moving part of the blade. Therefore a modern, high speed blade could not even be substituted for the sails in Harburg's design. Modern rotor blades have a high aspect ratio and hence modern rotors have a low solidity, and derive their high performance from refined, dual-surface airfoils that spin at high speed, and a high tip speed ratio (TSR), rather than a large surface area. The high tip speed of modern blades results in a high transfer of kinetic energy to the blades, and a low transfer of rotational energy to the air in the wake, meaning that more power goes to drive the rotor, and less is lost to wake vorticity or "swirl". The importance of this cannot be overemphasized: The graph of FIG. 38 shows the power coefficient of various rotor styles. High-solidity rotors such as the farm water-pumping windmill have very low power coefficient (efficiency), because they transfer a high percentage of their potential energy capture to wake swirl; the wind itself is sent spinning in the opposite direction of the rotor spin, using up a sizable portion of the energy available. In fact, such high-solidity, low TSR rotors are generally categorized as "drag based" turbines, rather than "lift-based", and are useful mainly for such applications as pumping water where consistent, unattended operation is more important than efficiency. The type of rotors required by Harburg's invention date back at least 2000 years to the Greek Islands, and are so inefficient that they do not even merit inclusion on this chart. So Harburg is restricted to slow, inefficient, drag-based operation rather than modern, high speed lift-based operation by the fact that at high tip speeds, his torque transmitting lines would present many times the aerodynamic drag of the blades themselves, rendering them ineffective.

Centrifugal force on Harburg's parallel "lines" used to transmit torque also limits RPM: The lines will be centrifugally forced to curve outward, so that they are no longer parallel. The greater radius of the outward-curving lines increases their absolute speed through the air, further increasing air resistance (drag), thereby further reducing efficiency, and further preventing the use of modern, high-speed blades. This outward splay of the "lines" also would increase line tension—another factor tending to limit RPM.

Low RPM not suitable for economical electric power generation: Besides low efficiency, drag-based turbines are not considered good candidates for electricity generation, due to low rotational speed (RPM). Standard generators require high-speed rotation, and lower initial RPM necessitates more gearing to drive the generator, raising costs and reducing reliability. Direct-drive generators must be sized in reverse proportion to RPM, again raising costs for slowly rotating, drag-based turbines, if no gearbox is used.

Low RPM raises torque: for any given level of rotational power output, torque is inversely proportional to RPM. This means that Harburg's slow rotation raises torque, raising tension on the "lines", and causing more stress on the entire drivetrain. The strength of the relatively small-diameter driveshafts supporting the armatures could be challenged by the twisting force of such high torque.

Cloth sails are known to be far slower and less efficient than rigid blades featuring airfoils having separate top and bottom surfaces, permanently and optimally shaped for their function.

Cloth sails are susceptible to icing and snow accumulation.

Cloth sails are not durable for long term operation, suffering from UV degradation from sunlight, and inevitable fraying from constant fluttering and flapping. Cloth sails are not suited to permanent use in the wind, during all weather.

Blades widest at the tip, as Harburg discloses, are similarly suitable only for the slow rotation of a high-solidity rotor. This again relegates Harburg's machine to the realm of low RPM and hence low efficiency. (Such rotors are so inefficient that they do not even appear on the chart of FIG. 38) This inefficient theory of operation represents 2000 year-old technology as practiced in the Greek islands, and is directly counter to the modern, industry-standard practice of making blades widest near the root, and narrowest at the tip, known to provide highest efficiency and best performance.

No preferred aim cited: Harburg makes no provision for advantageous directional placement; he states that his machine "is not sensitive to wind direction", always turning in the same direction regardless. No mention is made of best aiming position relative to a predominantly unidirectional wind resource for maximum energy capture.

There is no acknowledgement, or evidence of recognition that one rotor may tend to block the wind from reaching the next rotor, reducing output, if the assemblage is aligned directly with the wind;

Similarly, Harburg asserts that his apparatus will continue to produce energy even when oriented directly across the wind, due simply to turbulence, whereas experience tells us that such an orientation would reduce output to zero or nearly zero.

Again there is no recognition of, nor provision for, an optimal orientation, but rather an implicit assumption that all orientations will provide equal performance.

McCauley U.S. Pat. No. 5,328,334 teaches multiple rotors mounted on a series of rigid rods, linked end to end. Each rotor is comprised of 2 offset spars with a sail stretched between, to comprise a triangular blade that, again, is widest at the tip, again mandating low RPM, and low efficiency (Such rotors are so inefficient that they do not even appear on the chart of FIG. 38)

Again, the notion that a sail made of flexible sheet material is somehow superior to a modern, relatively rigid wind turbine blade with a shaped airfoil shows a lack of even rudimentary knowledge of modern wind energy technology. It was 1000 years ago that flexible cloth sails (Greek Islands, etc.) were superceded by blades with a defined airfoil shape (Europe, including the Netherlands). This shift in blade shape formed a large portion of the transition from drag-based machines to lift-based machines.

The idea that a blade tip should be the widest part of a blade, when it is well known in the art that the tip should be the narrowest part of the blade for best performance is, once again, further evidence of a merely fanciful invention, based on no practical experience. McCauley's wide-tipped sails would have low efficiency and additionally, would provide a poor choice for generating electricity due to their low speed rotation (low RPM).

McCauley requires in all claims that the connectors between individual rods permit relative angular movement between the rods—meaning that each rod can rotate a certain amount independently before it engages the next rod in the line. No reason is given for such loose attachment.

Non-optimal aim: McCauley requires in all claims that the wind vector be substantially parallel to the rods, and cites means for moving one end of the apparatus, to insure that this aim, exactly parallel to the wind, is maintained at all times. His presumption that aiming the rods parallel to the wind would result in highest output shows a lack of knowledge of wind shadow and wake effects. His implication that this incorrect, literalist expectation is based on actual experience with a prototype, is evidence that such prototype is merely fictional. Actual experience with real world prototypes quickly teaches a true experimenter (exclusively the present inventor) that driveshaft aim at an optimal offset angle α (alpha), in combination with sufficient rotor spacing, as first proposed and subsequently verified by this inventor, Douglas Selsam, brings the most wind to each rotor, producing the most power. An offset aim increases the frontal exposed swept area (silhouette), as seen by the wind, by bringing downwind rotors out of the wakes of the upstream rotors, so that all rotors are exposed to fresh wind. Direct alignment with the wind, as McCauley requires in all claims, reduces output because rotors are shielded from the full force of the wind by preceding rotors. Data from our 2004 California Energy Commission-sponsored prototype clearly prove this. In fact, this reduction of power by aligning our driveshaft directly with the wind served as our method of overspeed protection to prevent damage in strong winds.

McCauley's citation of 250-300 watts power output from an alleged actual prototype having six rotors 4 feet in diameter, (75 square feet total swept area) in a 10 mph wind, is physically impossible. A high quality turbine such as the Whisper H-80 (now renamed to H-200) from small turbine market leader Southwest Windpower, sweeping 80 square feet, produces less than 50 watts at 10 mph. The combination of wake effects (from erroneously aiming directly into the wind), and inefficient, high solidity blades consisting of cloth sails stretched between spars, make it impossible for McCauley's alleged prototype to even approach the output of the long perfected H-80, let alone exceed it by 500%. In fact the Betz coefficient would allow only about 200 watts to be produced from 75 square feet by a theoretically perfect turbine in a 10 mph wind (See FIG. 38). Power claims exceeding the Betz coefficient are a common, telltale symptom of fanciful, incompletely-developed turbine designs, based on a lack of understanding the prior art, revealing the accounts of measurements taken from prototypes built, as fraudulent. The very best utility-scale turbines often strive to achieve even half of what the Betz coefficient allows. McCauley's power claim is therefore false, and his accounts of an actual prototype are, again, of doubtful veracity.

The requirement that adjacent rotors be mutually offset by 90 degrees after all rotational slack has been taken up, again shows a lack of fundamental experience in wind energy. Like so many "inventions" in this field, there is a consideration only of a static state, as drawn on paper, rather than a dynamic system—with no recognition of the continuing angular displacement of a second, spinning rotor during the time that the wind travels from the first rotor to the second. Such continual angular rotational displacement would make such an angularly offset blade placement, as McCauly suggests, ineffective and irrelevant. This assumption that McCauly's sails should be angularly indexed also contains an implicit assumption that McCaulay's idea of "perfect" aim into the wind could be maintained at all times, with no small scale turbulence or variability in the wind direction. Such "perfect aim" would, unknown to McCauly, provide lower power output than an offset aim, which is preferred, as the present inventor has shown in the present inventor's research and disclosures.

Krolick et al. U.S. Pat. No. 4,708,592 discloses a helicoidal structure having the shape of a twisted ribbon with a twisted rope ladder frame. A close inspection reveals that this nonworking design would simply untwist, rather than turn a generator, since a cable can only transmit a force by tension, not the compression that would be required for the versions illustrated. As the saying goes, "You can't push a rope." Krolick seems to realize this at some point, eventually citing a "counter-helically braced" embodiment. Like previous prior art cited, if actually built, this embodiment could only be a slowly-turning drag-based machine at best. Like the others, Krolick assumes that alignment parallel to the wind produces highest output, with no regard for reduced power due to wake overlap. Krolick erroneously states that modern, high speed turbines must use "reduction gearing" to lower RPM, and therefore cites his low RPM as an advantage. Since gearing is normally used to raise, not lower, RPM, this is a false conclusion based on a false assumption, opposite to reality, revealing no knowledge of the basic facts of wind energy and prior art wind turbines.

Beldimano U.S. Pat. No. 1,876,595 shows a stationary array of horizontal-axis type rotors, arranged in a rectangular grid, suspended by a cable structure. Each rotor is surrounded by a concentrating frame to funnel wind through the disc. Beldimano clearly recognizes that the improved surface area/mass ratio, and higher RPM of smaller rotors advantageously uses less material and allows direct-drive generators. Additionally Beldimano recognizes the superiority of catenary suspension as a support means for his many small, lightweight, high RPM rotors. This concept however has the disadvantage of requiring separate bearings, generators and stationary support for each rotor, altogether requiring a heavy, complicated support structure, with a disproportionate amount of material required for the ducting surrounding each rotor.

Bailey U.S. Pat. Nos. 3,978,345 and 4,151,424, show parallel, elongate, cross-axis type foils suspended from rotating armatures located at two or more generally fixed points. Operating generally on the Darrieus principle, as normally utilized in vertical axis turbines, Bailey's elongate foils span a fluid flow perpendicular to the flow direction. In his article *Energy from Sea and Air from Large-Span Tensioned Foils*—appearing in "Alternative Energy Sources: An International Compendium" Volume 6 (Geothermal and Hydropower) Copyright Hemisphere Publishing Corporation, David Bailey cites the fact that his elongate, suspended cross-axis turbine, being placed in tension, transfers a compressive load to the earth itself.

BRIEF SUMMARY OF THE INVENTION

If the wind resource in a given location rarely changes direction, the ability to aim our co-axial, multi-rotor array of modern, high TSR (tip speed ratio), horizontal axis-type rotors loses its importance. Permanent placement, in the best orientation for overall energy capture, allows support from more than one point, thereby allowing a longer driveshaft with less required stiffness, supporting more attached rotors, and thereby producing more power than our prior art cantilevered versions, at less cost.

In most windfarm locations, permanent directional aim, targeting effective energy capture within the normal, relatively tight directional variance of the wind resource is sufficient to provide nearly full energy capture over time.

Given these facts, in such unidirectional winds, we advantageously trade the ability to aim our driveshaft, for the freedom to reduce its stiffness, and hence its cost, while extending its length, by supporting it from at least two fixed points. Placing the driveshaft under tension then allows greater spans between supports, while raising resonant frequencies and critical speeds, to add stability in lieu of stiffness. Intermediate supports may also be provided, whether or not the driveshaft is under tension, to allow a longer driveshaft. The number of additional rotors that such a longer driveshaft can support overcomes any losses from aiming inaccuracy. The result is a far more powerful turbine that still runs at high RPM to directly drive a generator. The choice of modern, high speed, high aspect ratio, high TSR blades, having a high lift-to-drag ratio, yields a low mass, low solidity rotor that turns at high RPM. The high TSR results in high aerodynamic efficiency, with less energy lost to wake vorticity, and the high RPM allows the resulting high power to be transmitted at relatively low torque, reducing the required torsional stiffness of the driveshaft. If the generator is located at the upwind end of the driveshaft, the tension on the driveshaft may add to the torque and fortunately coincide with the strand orientation of a conventional stranded, twisted, steel cable, so that such can suffice to serve as the driveshaft, depending on the individual configuration. Most blades rotate to the right; most cable is twisted to the right as well. The low cost and ready availability of such a steel cable as a driveshaft material is advantageous. A hollow core can be used to increase cable diameter, adding stiffness and increasing torque transmission capability. Filament-wound composite tubes, such as we have often used, share many characteristics of such a hollow cable, with the added rigidity provided by the composite matrix. Low cost tubes of various other materials and methods of manufacture may also be used, to provide greater stiffness and torque transmission capability for optimal performance. Pultruded composite tubes, incorporating glass, carbon, or other fibers, and welded, extruded, or drawn, metal or plastic tubes are examples.

Tidal and marine currents are other examples of directionally consistent flows suitable for being harnessed by the present invention. Therefore the present invention should be understood to apply to any fluid flow.

A driveshaft supported from more than one point may be oriented at a horizontally or vertically offset angle α (alpha) from the average wind direction, or at an oblique offset angle α (alpha) that is between horizontal and vertical. As with our previous co-axial, multi-rotor turbines of U.S. Pat. Nos. 6,616,402, 6,692,230, 7,008,172, 7,063,501 and International (PCT) Patent Application Serial Numbers WO 2002/103200 PCT/US02/19181, filing date 14 Jun. 2002, publication date 20 Feb., 2003, this slightly off-axis orientation in relation to the air flow maximizes power output by allowing fresh wind to reach each rotor.

Locating the generator at a relatively low level, with the driveshaft extending upward to a higher support located at some distance downwind, (FIG. 16) provides a vertically offset angle α (alpha) to the wind direction, while eliminating, or reducing the height required of, one support tower, but with the disadvantage of lowering the average rotor height, and introducing wind speed differentials along the series of rotors due to surface-induced wind shear. Such a vertically offset angle α (alpha) has also been used in the cantilevered versions we have built for the California Energy Commission.

An alternate orientation is a catenary suspension of the driveshaft between two points of similar elevation, with an imaginary line between these two points aligned with the average wind direction in the horizontal plane, with a component of the offset angle α (alpha) provided for most rotors by the gravity-induced sag in the driveshaft. (FIG. 9) In this case the offset angle α (alpha) will vary along the length of the driveshaft.

In the latter two cases, further offset aim from the wind direction is provided by the natural variability in the wind direction and large-scale turbulence.

These three aiming strategies—horizontal offset, vertical offset, and sagging catenary suspension, may also be combined to arrive at intermediate configurations. The idea is to have the most wind possible hit the majority of the rotors of the series, at the best angle for optimum power generation, as much of the time as possible. The lack of ability to constantly re-aim the turbine in response to changes in wind direction is overcome by the ability to present more swept area for less cost, due to the simplicity of the configuration and optimal use of materials.

The structure of wind turbines places some parts in tension and others in compression, to span the greatest distance and thereby sweep the most area. For example a horizontal-axis rotor has the windward surfaces in tension and the downwind surfaces generally in compression, to span a diameter. Multiple smaller rotors accomplish this more efficiently per unit mass than a single larger rotor with equivalent total swept area. Placing a driveshaft carrying such smaller rotors in tension puts the underlying support member—in this case the earth—in compression. Using the earth in its natural state as a compression member against which to suspend a driveshaft under tension, is a cost-efficient use of materials to span a given distance, since the earth is capable of bearing huge compressive loads, has a surface parallel to the wind, and is ready-made, requiring no manufacturing. Application of co-axial, multi-rotor technology to this driveshaft then becomes a cost-efficient way utilize the tension of a driveshaft or cable, and the compression of the earth itself to sweep a given area of the atmosphere, extract the power from the flow and convert it to high RPM mechanical rotation, and transmit the resulting rotational power to a load such as a generator. This advantage of placing the earth in compression has also been noted by cross-axis wind turbine inventor David Bailey, as noted in the preceding "prior art" section of this disclosure.

Another method of providing tension on a catenary driveshaft or driveshaft otherwise suspended between towers, is to lean the towers outward from the center, so that the weight of the towers acts to place the driveshaft in tension. This can also be effective even using only a single leaning tower, if it leans away from the driveshaft, it will place the driveshaft in tension by its weight.

The possibility of multiple driveshafts sharing the same support structure greatly multiplies the potential advantage to our novel concept.

A cantilevered end extension section, projecting from one or both ends of a stationary driveshaft supported from more than one point, adds further length, thereby supporting more rotors, adding power.

Mounting on a roof may elevate the turbines. With strategic placement, such as along a ridgeline, or projecting endwise or upward from a ridgeline, the slope of the roof may additionally focus wind into the rotors, acting as an upwind concentrator, augmenting power, and create a slight vacuum for the wind leaving the rotors, acting as a downwind diffuser, further augmenting power.

This combines the three most effective known methods to increase the power of a wind turbine of a given diameter—adding multiple rotors, a concentrator, and a diffuser.

Components that are eliminated over a conventional, single-rotor turbine include the large blades, the gearbox, the yaw bearing, and the tail or yaw mechanism. Advantages over our previous, cantilevered configuration include reduced requirement for driveshaft stiffness, thereby reducing driveshaft and bearing diameter and cost, reduced requirement for inherent driveshaft straightness, increased driveshaft length to support more rotors, elimination of the yaw bearing, and reduced cost of the supporting structure, resulting in greater power gathering ability at lower cost.

The ability of smaller blades to gather more power per unit mass greatly reduces blade expense, making the number of rotors that can be supported a more important cost driver for our design than the specific efficiency of each rotor. This reduced requirement for maximizing rotor efficiency may favor a synchronous generator utilizing slip for future grid tied applications, reducing costs by eliminating the requirement for an inverter, and allowing stall control to be used for overspeed protection.

Using Hills, Mountains, Canyons, Buildings Etc. for Support, Elevation, and to Focus the Wind:

Utilization of the elevation differentials naturally present in the terrain presents the possibility of reducing or eliminating the requirement for towers to support the driveshaft. For example, a single driveshaft spanning the San Gorgonio pass near Palm Springs in California, at an oblique angle α (alpha), might produce power equal to an entire wind farm. Valleys between mountains, canyons between ridges, and flatlands between mesas, buttes, mountains, and hills offer high winds in a focused flow between elevated potential support points. Such natural landforms also serve to guide the wind, producing a unidirectional wind resource by defining the direction that the wind must flow to pass through a given region. The San Gorgonio Pass, again, is a good example—the wind in this area almost always comes from the West and the West-Northwest (FIG. 39). In addition to aiming the wind, such regions make the wind more powerful: The same elevated landforms that provide support for the ends of a suspended turbine act to block the wind, forcing it to pass through the regions between the landforms where the turbine is located. The net effect is that all of the wind that would blow across the entire region is instead forced to blow through the portion of the region that is not blocked by landforms, greatly accelerating the wind through such a pass. Indeed, windfarms today are preferentially located in such passes between elevated landforms.

Buildings and Bridges:

Manmade structures such as buildings, bridges, etc. can also be advantageously employed as supports for a driveshaft, and proper orientation of their surfaces to the prevailing wind direction may preferentially focus additional wind energy through the array, as both an incoming concentrator, and an outgoing diffuser, both proven methods of power enhancement. The resulting configuration combines the 3 most effective ways found to increase the power output of a wind turbine of a given diameter—concentrator, diffuser, and adding rotors to a lengthened driveshaft with an offset aim—the co-axial, multi-rotor array. Then this result is further multiplied, by installing multiple parallel turbines. The result is substantial energy capture using inexpensive components.

Separating Forces in the Driveshaft:

The driveshaft may be constructed with an inner, stationary core under tension, for overall support, and an outer, rotating shell that rides on bearings over the inner core. The lighter, spinning, outer shell need only transmit torque, while the strong, heavy, stationary inner core supports the weight of all suspended components. This eliminates the requirement for heavy-duty thrust bearings to support a rotating shaft with rotors, under a large amount of tension.

Reversible Airfoils: Airfoils with sufficient symmetry to work in reverse may be employed to provide power to any of the above-described types of stationary configuration when wind flow direction reverses. Such airfoils may exhibit complete symmetry about 2 axes, or 1 axis, and may be relatively straight (symmetrical) or may be somewhat S-shaped. Such rotors will reverse direction when the wind reverses direction. Alternatively, a single direction of rotation may be maintained, regardless of wind direction, by using hinged blades, responsive to a flow from either direction with a constant, unchanging direction of rotation, as previously known in the art of some reversible propellers, impellers, hydro turbines, and fans.

Two types of sites where reversible blades would be advantageous are:
1. A location where the wind normally comes from one of two opposing directions, such as a canyon for example. This is known as a bi-directional wind resource.
2. A location where the wind comes from many different directions at different times—an omnidirectional wind resource—the extra length possible in a stationary, non-aiming version may still offer enough extra rotors to capture more total energy per unit cost, over time, than an aiming version.

The type of chart that graphically illustrates the amount of annual wind energy coming from the various directions is a circular bar chart called a "wind rose". In most windfarm locations, and many others as well, such a "wind rose" chart will clearly show the strong directional predominance of the prevailing winds of the area. Example "wind-rose" charts for windfarm locations are included in FIG. 39.

Incorporation of Cross-Axis Blades: As with the previously disclosed co-axial, multi-rotor turbines of U.S. Pat. No. 6,616,402 issued to this inventor, the incorporation of cross-axis blades, operating on the Darrieus principle, referred to in that patent as vertical-axis type blades, may also be incorporated into our designs when adapted to a stationary configuration. As with our previously disclosed aiming versions, the cross-axis blades may be discrete or continuous, straight or helical, twisting in either or both directions, and may structurally comprise part or all of the driveshaft. As in U.S. Pat. No. 6,616,402, the horizontal-axis (normal propeller) type rotors may serve as armatures to support the cross-axis blades.

As in U.S. Pat. No. 6,616,402, a cylinder comprised of a structural lattice or mesh incorporating the cross-axis (vertical-axis-type, or Darrieus-type) blades as structural members can replace the driveshaft itself, making a central driveshaft unnecessary. Even the armature function of the horizontal axis-type rotors becomes unnecessary if the mesh or lattice has sufficient resistance against centrifugal force and gravity to maintain a basically round, cylindrical shape. In such a case the central driveshaft may be eliminated along most of the length of the turbine.

A spinning tube comprised of a mesh of cross-axis blades is the result. Centrifugal force helps it to hold its form, which is a desirable characteristic for a wind turbine.

Pultrusion is one good technique to produce such a continuous blade.

BRIEF DESCRIPTION OF THE SEVERAL VIEWS OF THE DRAWING

46 Figs. on 46 sheets

FIG. 14 vertical arrays of turbines supported by guyed towers (wind fences), offset angle α in horizontal plane.

FIG. 46. perspective, longitudinal view from within rotating cylindrical cross-axis turbine of FIG. 31, woven of interconnected, continuous, longitudinal and helical blade elements, suspended across a canyon, showing direction of rotation.

Figure 1:
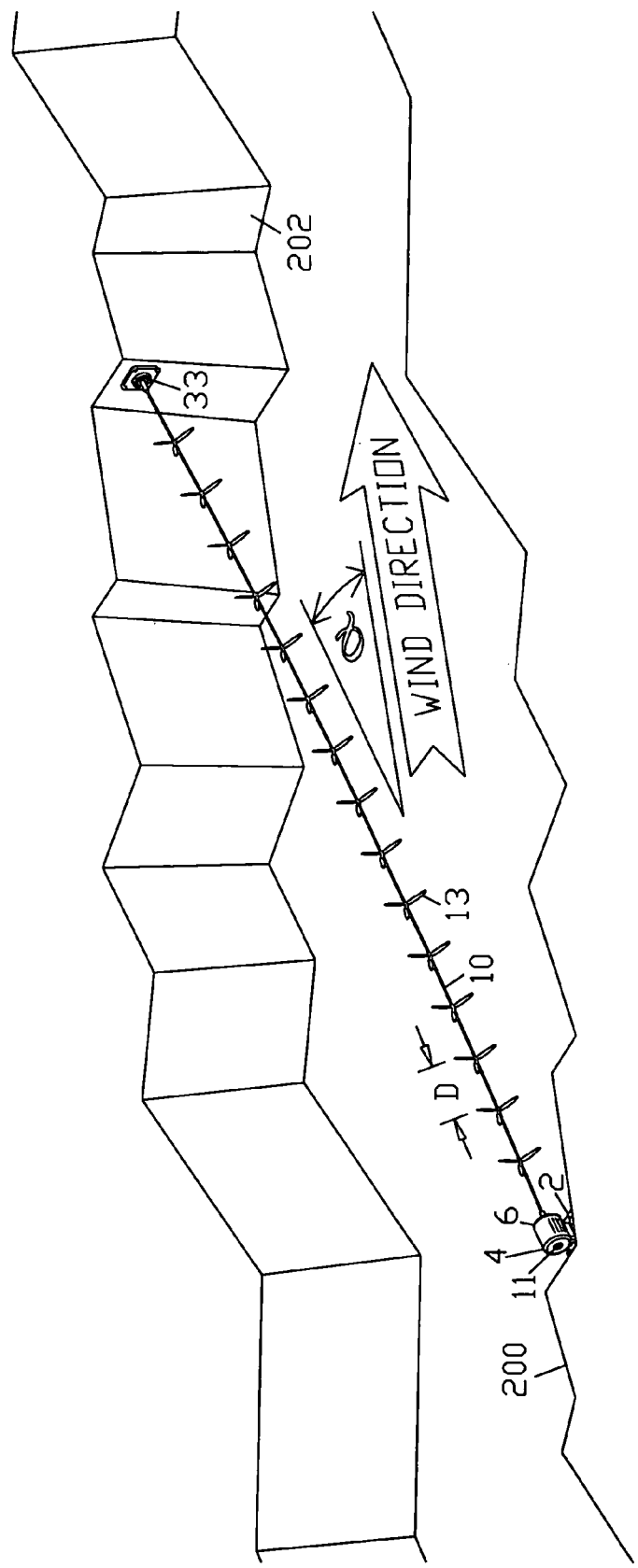
FIG. 1 oblique aerial view of a co-axial multi-rotor wind turbine in catenary suspension, spanning a canyon at a horizontally offset angle α to a unidirectional wind resource.
Figure 2:
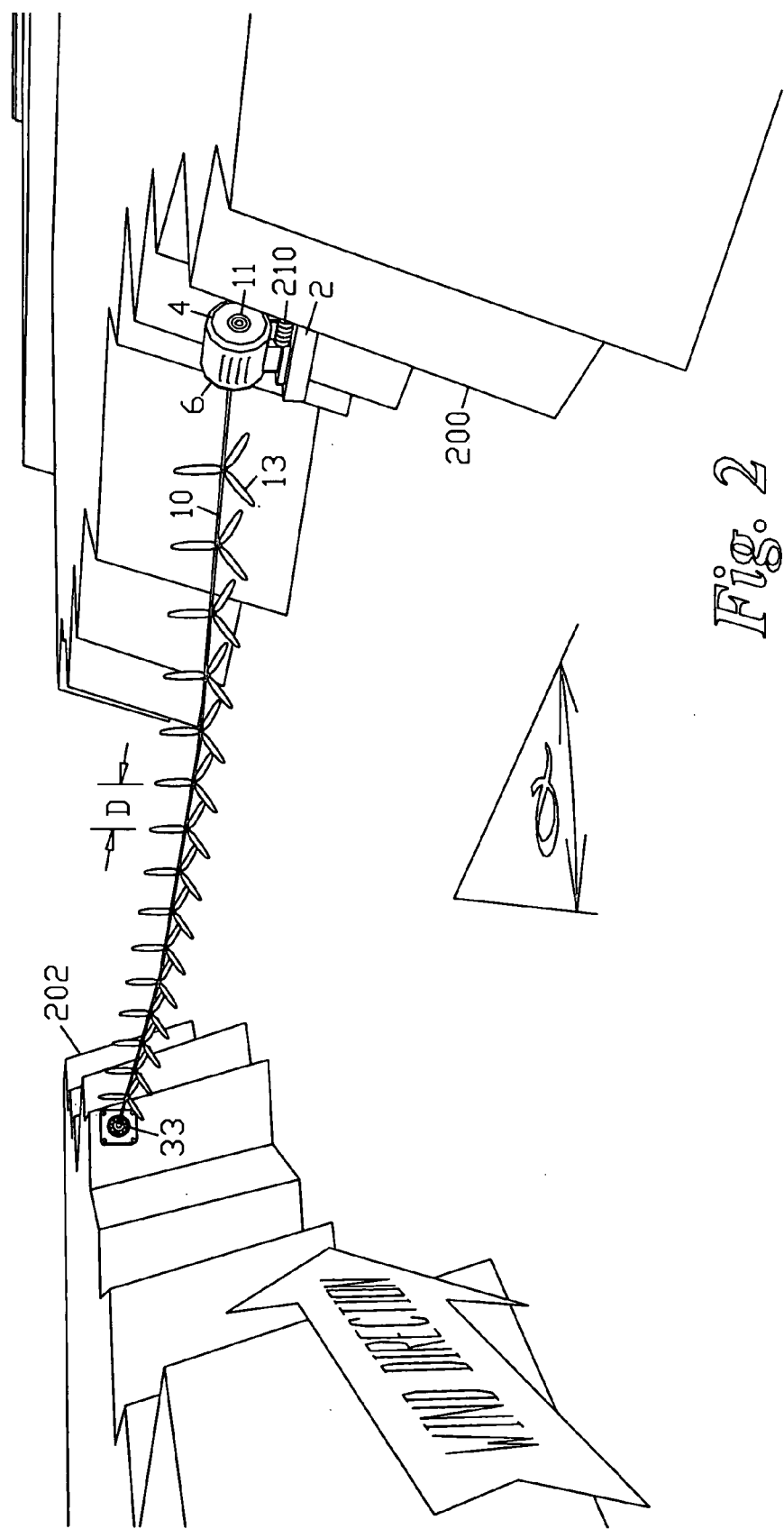
FIG. 2 upwind aerial view of same co-axial multi-rotor wind turbine spanning a canyon at a horizontally offset angle α to a unidirectional wind resource.
Figure 3:
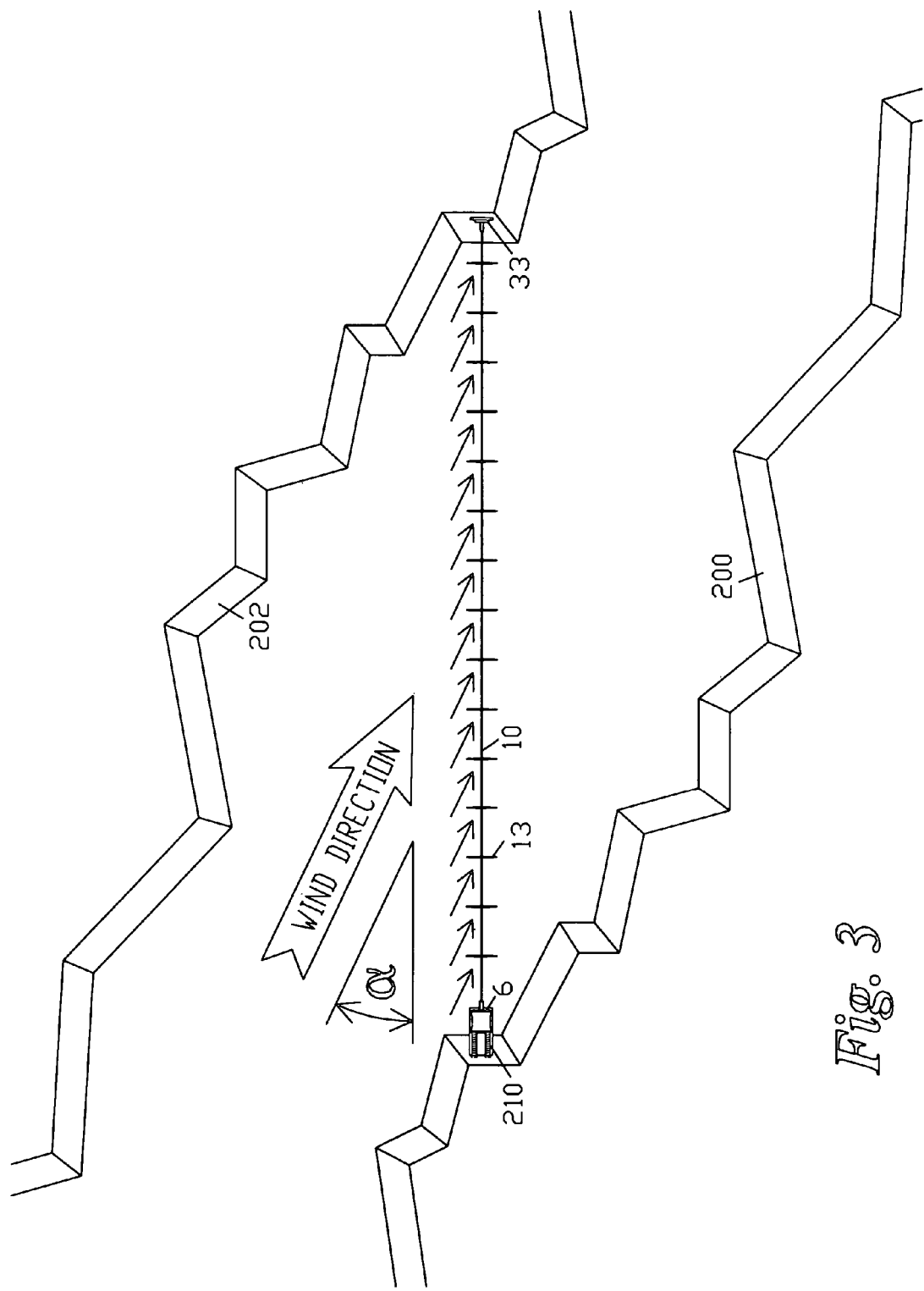
FIG. 3 plan view of same co-axial multi-rotor wind turbine spanning a canyon at a horizontally offset angle α to a unidirectional wind resource.
Figure 4:
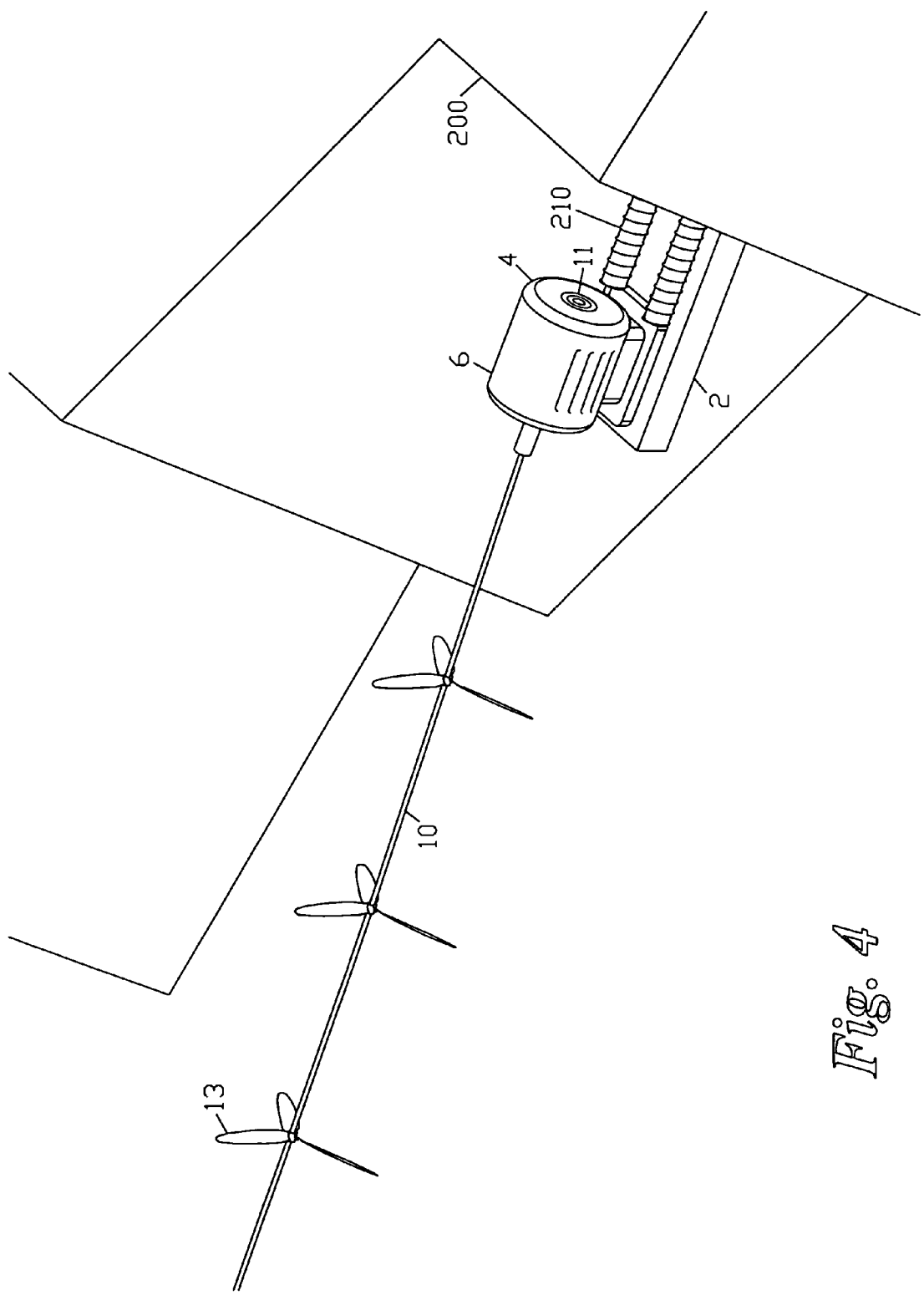
FIG. 4 base of turbine spanning canyon, including generator, adjustable tension means.
Figure 5:
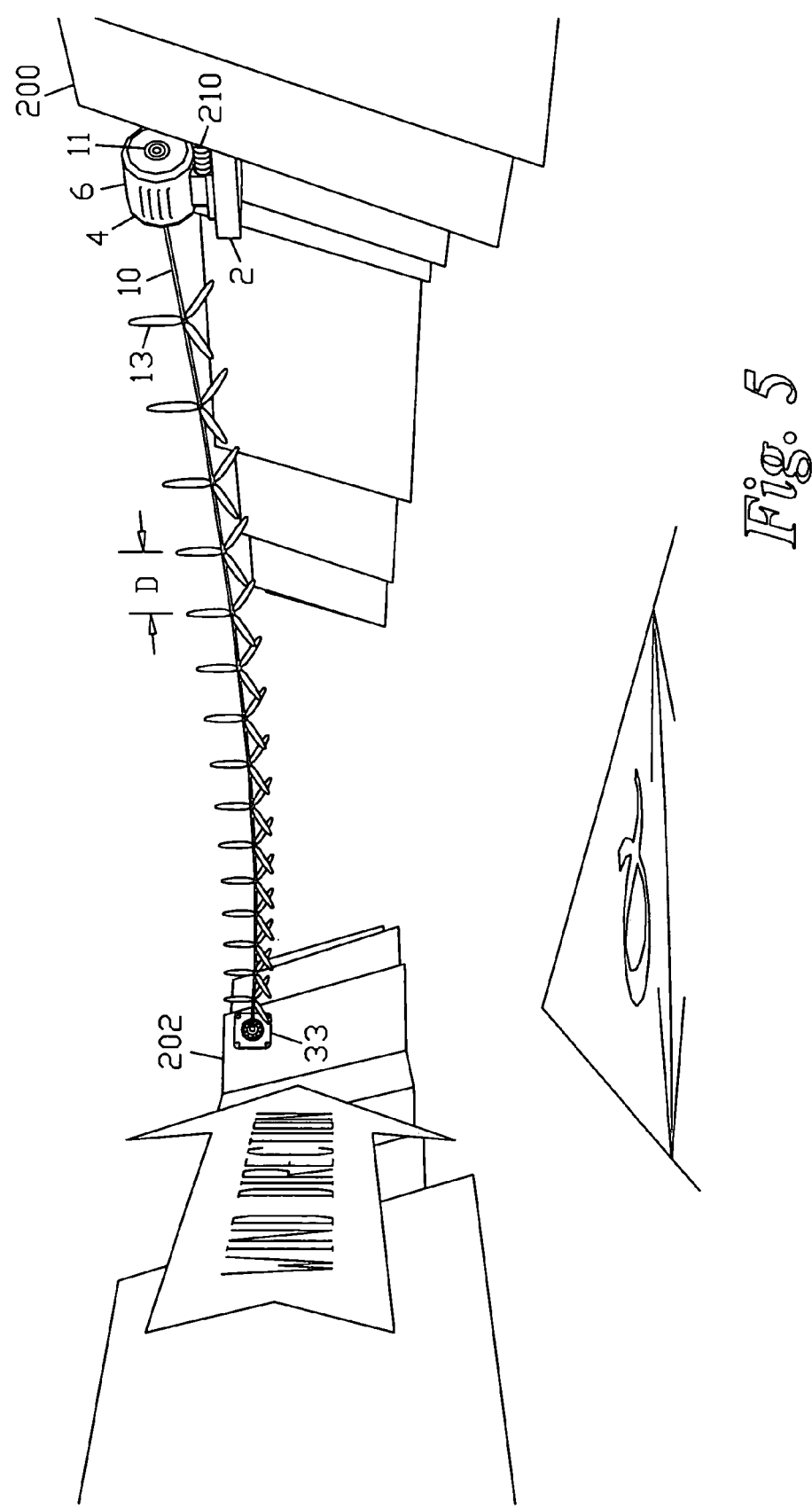
FIG. 5 upwind view from canyon floor, of co-axial multi-rotor turbine spanning canyon.

LIST OF REFERENCE NUMERALS 1. surface
2. base
4. bearing support means
6. load (such as an electrical generator)
10. driveshaft
11. bearing
13. rotor
16. armature means
33. suspension bearing means
35. yaw bearing
41. continuous longitudinal cross-axis (Darrieus-type) blade element
42. continuous cross-axis blade element helically wrapped in the direction of rotation
43. continuous cross-axis blade element helically wrapped opposite the direction of rotation
49. upwind section of driveshaft
50. downwind section of driveshaft
52. a cylindrical tube comprised of a geometric mesh of interconnected struts, shaped as airfoils oriented to function as cross-axis blades
54. strut comprising cylindrical, tubular, geometric mesh of interconnected struts, shaped as airfoils oriented to function as cross-axis blades
55. slanting guy wires
57. horizontal guy wires
58. interconnection means for interconnected struts
66. continuous power conduit means (such as an electric cable)
80. building
90. tower
93. collective turbine support members
122. tail
200. elevated wall of natural landform such as canyon, hill or mesa
202. opposing elevated wall of natural landform such as canyon, hill or mesa
204. bridge
210. adjustable tension means
212. adjustable attachment length means
220. intermediate support for driveshaft
222. non-rotating inner core or mandrel
256. sleeve for mounting rotor
260. longitudinal strand
262. helical strand
282. bearing sleeve or other means for bearings to fitably engage the inner core.
288. integral attachment means (for attaching driveshaft sections together)
334. upwind concentrator
336. downwind diffuser
444. generally Y-shaped frame having arms
446. upwind arm of generally Y-shaped frame
448. downwind arm of generally Y-shaped frame
555. common support frame
556. means to raise and lower and/or to tilt and/or aim the common support frame T=aggregate cumulative rotor force α (alpha)=total offset angle α (alpha) from the wind direction β (beta)=additional contribution of a horizontal component, from normal instantaneous deviations in the horizontally prevailing wind direction, to total instantaneous offset angle α (alpha), to be used when the turbine configuration nominally places angle α (alpha) predominantly in the vertical plane.

DETAILED DESCRIPTION OF THE INVENTION

1. First Embodiment

Suspended Catenary Co-Axial, Multi-Rotor Turbine Spanning a Canyon; FIGS. 1-5, 29, 30, 39, 40-43

A canyon provides both a unidirectional wind resource (FIG. 39) and mounting points located on its elevated walls 200 and 202. A single driveshaft 10 spans the canyon at an offset angle α (alpha) to the wind direction. A series of horizontal axis-type rotors 13 are co-axially mounted on the driveshaft at spaced intervals, here denoted as rotor spacing distance D. The rotors combine to rotate the driveshaft, all together as a single unit. As in similar embodiments from previous patents issued to this inventor, the spacing D between rotors, in combination with orientation at offset angle α (alpha) to the wind direction, allows fresh wind to reach each rotor, enabling all rotors to effectively harness the wind energy and contribute power to the system. The rotors should optimally feature modern, high speed, high-efficiency, lightweight blades with high efficiency airfoils that operate at an optimal tip speed ratio for maximum energy extraction. The resulting high RPM allows the aggregate power to be transmitted by the driveshaft at lower torque, lowering the required torsional stiffness of the driveshaft. High RPM also requires less gearing or no gearing to drive a generator, which is preferred for lower maintenance.

Figure 29:
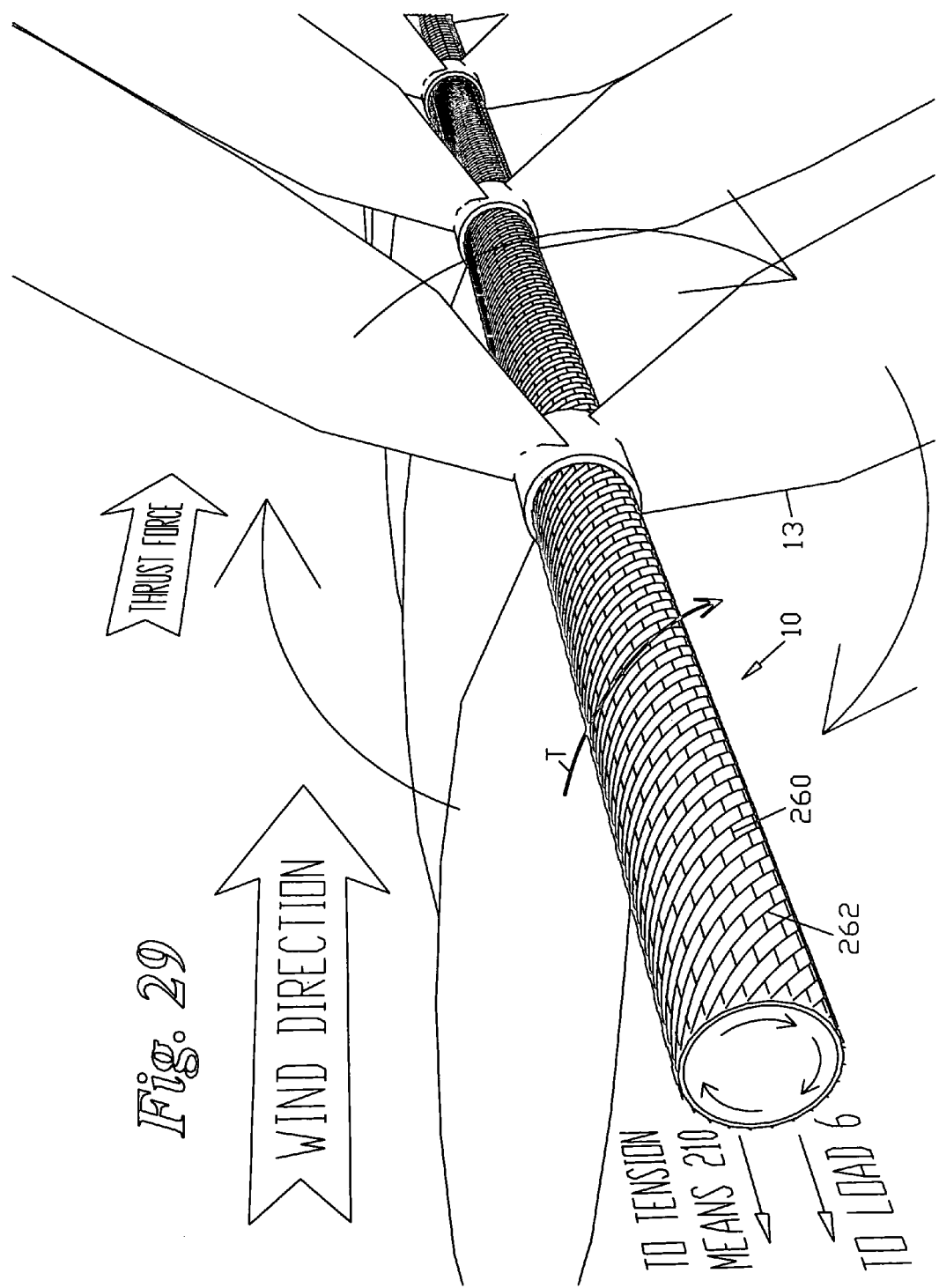
FIG. 29 rotating driveshaft constructed from longitudinal and helically wrapped strands.

The driveshaft is suspended between two stations anchored to opposing canyon walls 200 and 202. At the upwind end, as in previous embodiments, is base 2, bearing support means 4, and load 6, which is driven by the driveshaft rotation. In this case, load 6 is an electrical generator, with the generator housing functioning as bearing support means 4, holding bearings 11. Bearing support means 4 and bearings 11 may alternatively be located exterior to load 6. At the downwind end of driveshaft 10 is suspension bearing means 33. The bearings must be of a type able to withstand the thrust loading of the driveshaft tension, as well as the extra thrust loading of the wind on the rotors, as transmitted through the driveshaft to the bearings. Side thrust on the rotors will also increase driveshaft tension. Adjustable tension means 210 may be configured to help regulate driveshaft tension. This embodiment is similar to the 60th embodiment of U.S. Pat. No. 6,616,402, illustrated in FIGS. 80 and 75 of that patent, where a similar driveshaft with rotors extends from a generator at ground level up to a second station supported by a buoyant lifting body, such as a blimp, floating in a downwind direction from the ground station, in that the driveshaft 10 is suspended at an offset angle α (alpha) to the wind direction, between a generally upwind base 2 where load 6, bearing support means 4, and at least one bearing 11 are located, and a generally downwind station, supporting suspension bearing means 33. As in this previous embodiment, the combination of this offset aiming angle α (alpha), and the intervals D at which the rotors are spaced, allows fresh wind to reach each rotor, allowing a substantially full complement of power to be contributed by each rotor. In that previous embodiment, the thrust force of the wind on the lifting body and rotors provided a source of driveshaft tension. In this embodiment we include adjustable tension means 210, which in this case acts to force bearing support means 4 in a direction generally away from suspension bearing means 33, (tending to increase the distance between these two stations), thereby additionally keeping the driveshaft in tension. Here the tension means 210 is adjustable, so that driveshaft tension may be increased or decreased as necessary. FIG. 29 shows a closeup view of the spinning driveshaft with attached rotors. As known in the art of driveshafts, a larger diameter and high stiffness relative to mass, both act to raise critical speeds, adding stability. Each spinning rotor acts as a node of stability, like a spinning top or gyroscope, at the point where it is attached. Sufficient stability must be provided for regions of the driveshaft between rotors. Placing the driveshaft under tension is a method to raise critical speeds, and lowers the required driveshaft stiffness as compared to our cantilevered co-axial multi-rotor turbines.

The wind exerts a thrust force, and a torque against each rotor, which is then cumulatively transferred to the driveshaft, rotor by rotor, approaching the load. The combination of this aggregate thrust force and torque force on the driveshaft is illustrated as arrow T, aggregate rotor force, which proceeds along the length of the driveshaft in a generally helical manner. This force is best borne by a tension member such as a strand, fiber, or filament, directionally aligned with the force, to best transmit the force in tension, such as helical strand 262 (FIG. 29). Strands, fibers or filaments running parallel to the driveshaft axis such as longitudinal strand 260 serve best to maintain longitudinal stiffness and bear the tension of catenary suspension as applied by tension means 210. The driveshaft may be of any appropriate construction—solid or hollow, a metal tube, a wire rope or cable, or combination thereof, such as a solid tube wrapped in strands, or a hollow cable. Hollow, filament-wound carbon fiber/epoxy tubes are preferred for strength, stiffness, light weight, and torsional strength as of the date of this filing, however both pultruded, filament-wound, and table-rolled carbon and fiberglass tubes, aluminum, steel and plastic tubes, and even commonly available twisted steel cable have been used effectively by this inventor as in FIG. 30. Such cable or wire rope may be regular lay or lang lay as described in that art. Driveshafts of rope, cable, filament-wound composites, and other such constructions using oriented strands can preferentially have the strands wound in the direction of rotor rotation as in FIG. 29, helical strand 262, so the combination of torque, thrust, and tension loading will tend to wind such a cable or stranded construction tighter, rather than loosening it. The same principal applies in general to filament-wound and other driveshafts with oriented strands, although the inclusion of other orientations, such as circumferential or "hoop" windings as well as reverse helical windings have an important place in providing overall stiffness, strength, and structural integrity. Pultruded driveshafts may function effectively with all fibers oriented longitudinally, or may be wrapped with a veil of omnidirectional or other cloth, or wound with oriented strands. Lattice construction of the driveshaft is also possible, as in U.S. Pat. No. 6,616,402 issued to the present inventor. Advances in materials science will expand this list of possible driveshaft construction. Advantages over conventional turbines include vastly higher power per unit diameter, lighter total blade weight and higher RPM than a single rotor of the same swept area, replacement of many smaller generators by a single larger generator, and elimination of the tower, yaw system, and gearbox.

The natural sag of the driveshaft, or a deviation in general aim from a completely horizontal orientation, resulting in a sloping driveshaft, may also contribute to providing an offset angle α (alpha) to the wind direction.

It should also be realized that such a driveshaft that is sufficiently stiff in relation to its length, and/or provided with intermediate supports, may span such a canyon or other gap between landforms without being specifically placed under tension.

Though a canyon is used as an example, this design may span the gap between any landforms, or other manmade and/ or natural structures, including but not limited to spanning a valley suspended from attachment points on mountains, spanning the gap between mesas (FIG. 40), extending from a flat area such as a desert floor, up to a mountain or mesa (FIGS. 41, 42), from the floor of a canyon sloping up to a bridge 204 spanning the canyon (FIG. 43), spanning the gaps between the towers of a suspension bridge, spanning the gap between a tower and a hill, etc. The number of potential sites is huge.

2. Second Embodiment

Figure 7:
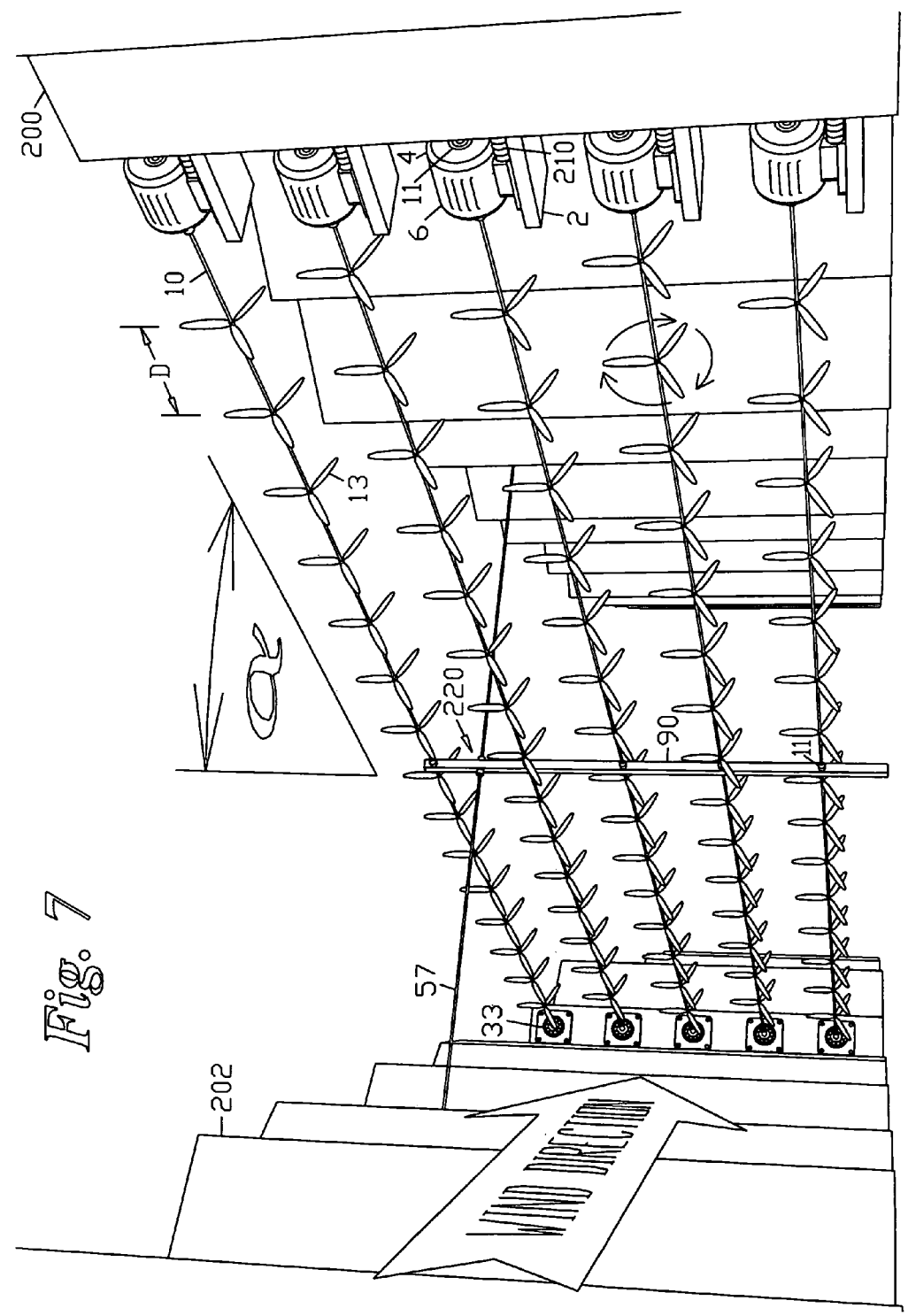
FIG. 7 upwind view from canyon floor: vertical array of 5 turbines spanning canyon, rotors are staggered, driveshafts are provided with an intermediate support.

Stationary Co-Axial, Multi-Rotor Turbine Spanning a Canyon, Supported from Three or More Points; FIG. 7

The second embodiment is similar to the first embodiment, with the addition of one or more intermediate supports 220 for the driveshaft, such as a tower 90 supporting bearing 11 of FIG. 7, added to help elevate and stabilize the driveshaft, and reduce or even replace the required driveshaft stiffness and/or tension, Such intermediate supports may be additionally include one or more stabilizing structures such as horizontal guy wires 57, of FIG. 7. Slanting guy wires 55 could also be used as in FIG. 14. Such intermediate supports may also stabilize the driveshaft against the aggregate side thrust force exerted by the wind on the rotors. Guy wires 57 greatly aid in stabilizing the side-to side position of the driveshaft, and may prevent unwanted oscillations. Alternatively, such intermediate supports may be suspended from above (not illustrated). For example the intermediate supports may depend from one or more separate, catenary cables in the manner of a suspension bridge, a technique also commonly used to suspend a pipeline across a river gorge.

3. Third Embodiment

Figure 6:
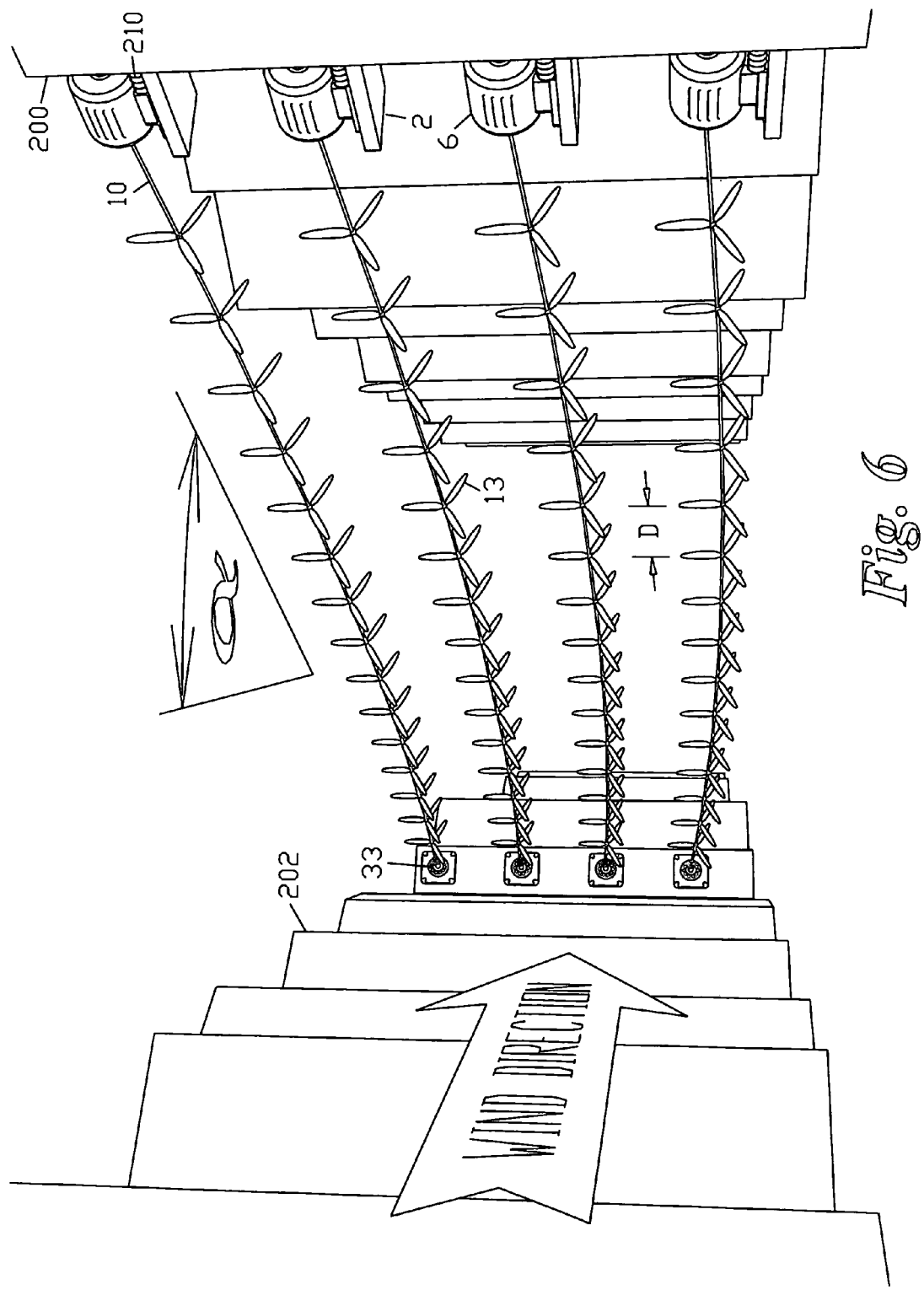
FIG. 6 upwind view from canyon floor: vertical array of 4 turbines spanning canyon.

Multiple Suspended Catenary Co-Axial, Multi-Rotor Turbines Spanning a Canyon; FIG. 6

Multiple turbines similar to that of the first embodiment, may be placed across the same canyon. FIG. 6 shows such a multiplicity of turbines placed in a vertical array, in effect forming a wall of rotors through which the winds must pass to continue transit through the canyon. The result is a further multiplication of the total power output.

4. Fourth Embodiment

FIG. 7: Similar to the third embodiment, multiple turbines span the canyon in a vertical array, but with staggered rotor spacing between adjacent driveshafts, allowing the driveshafts to be placed in closer mutual proximity, while yet avoiding blade strikes between adjacent turbines, which allows more driveshafts to be included in the array. The result is an increase in the total number of rotors, an increase in the aggregate solidity of the "wall of rotors", and an increase in total power output.

5. Fifth Embodiment

FIG. 7: Similar to the fourth embodiment, with the addition of one or more intermediate supports 220 for the driveshafts, such as tower 90 supporting bearings 11, illustrated. Such intermediate supports act to:

help in elevating the driveshafts against gravity;
help stabilize the driveshafts against sideways wind thrust, vibration, swinging, oscillations, etc.;
help in maintaining mutual separation between the driveshafts, to avoid contact or blade strikes between adjacent turbines;
reduce the required driveshaft tension and/or stiffness, by virtue of the above 3 functions.

Such intermediate supports 220 may alternatively, or additionally, comprise one or more stabilizing structures such as guy wires 57, also illustrated in FIG. 7, which may be attached to the canyon walls, or if slanted, to the canyon floor, for example.

6. Sixth Embodiment

Figure 8:
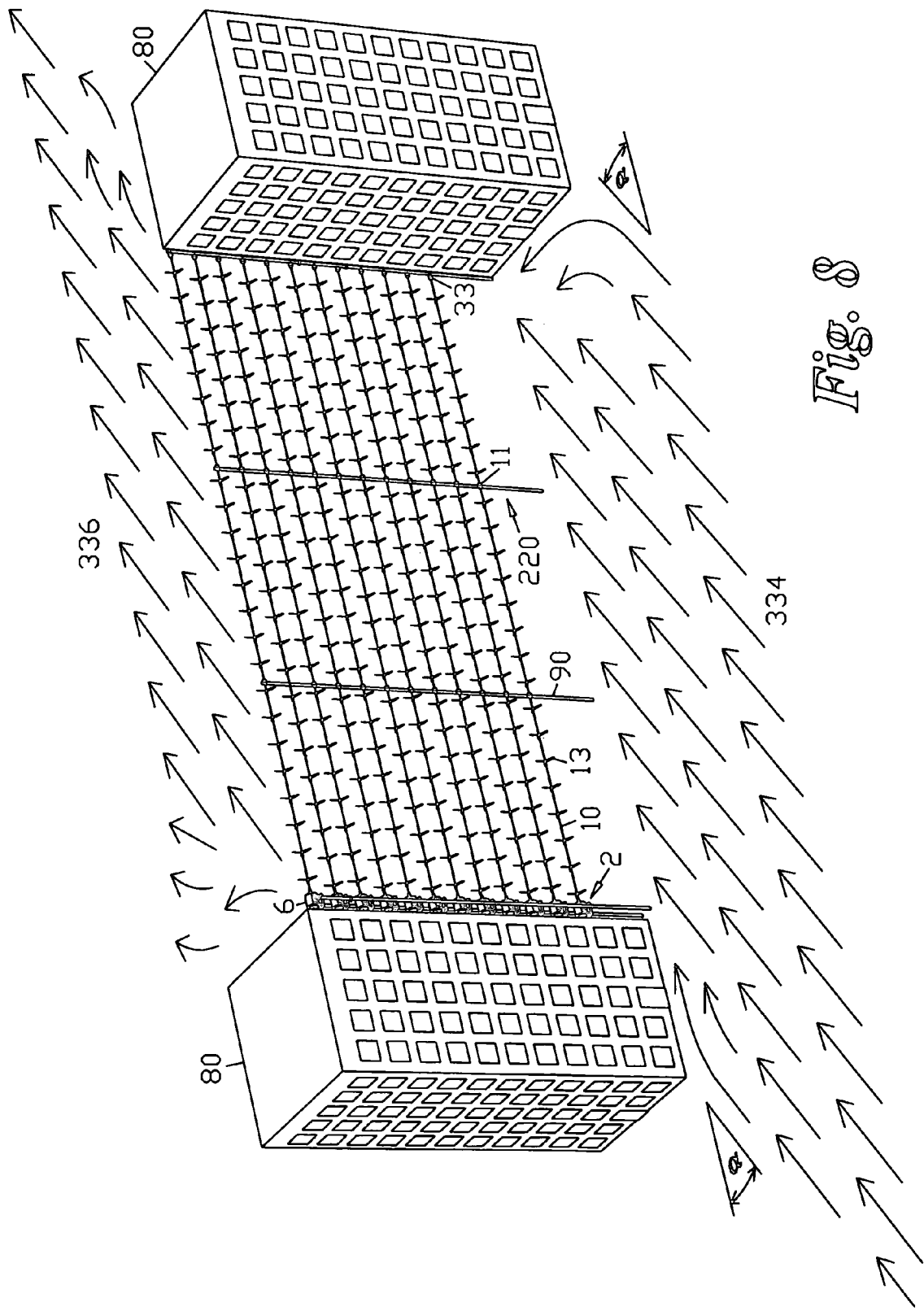
FIG. 8 oblique aerial view: vertical array of turbines spans gap between hi-rise buildings.

Multiple Suspended Catenary Co-Axial, Multi-Rotor Turbines Spanning Gap Between Buildings; FIG. 8

This embodiment is similar to the fifth embodiment, a stationary, vertical array of co-axial, multi-rotor turbines, with rotors 13 staggered from one driveshaft 10 to the next, and intermediate supports 220, comprising tower 90, and bearings 11 to help elevate and stabilize the driveshafts, allowing closer driveshaft spacing while avoiding blade strikes, for a higher density of turbines, yielding more power. Instead of a canyon, this array spans the gap between two buildings 80, strategically placed so that wind is focused or concentrated between them, with a line between a corner of each building falling at offset angle α (alpha) to the wind direction. The vertical array of coaxial, multi-rotor turbines extends between these two corners. The buildings are angled so that the exterior side surfaces of the buildings serve as a narrowing funnel 334, to concentrate the wind before it reaches the turbines, and as a widening funnel 336 to diffuse the wind after it passes through the turbine array. The buildings thus function as both an upwind concentrator 334 and a downwind diffuser 336, two known methods to increase the output of a wind turbine. Such an arrangement then combines the three most effective known methods to increase the power of a wind turbine:

adding a concentrator 334 upwind of the turbine;
adding a diffuser 336 downwind of the turbine;
increasing driveshaft length and adding rotors at spaced intervals, with placement of the driveshaft at angle α (alpha) to the wind direction.

Stacking multiple turbines in a vertical array further multiplies output, and takes full advantage of the concentrated wind resource focused in the space between the buildings. The structure of the buildings may also be used to help to support the turbines. Guy wires 55 having a similar function to horizontal guy wires 57 of the second embodiment may be added to help stabilize intermediate supports 220 as in FIG. 7 or FIG. 14.

7. Seventh Embodiment

Figure 9:
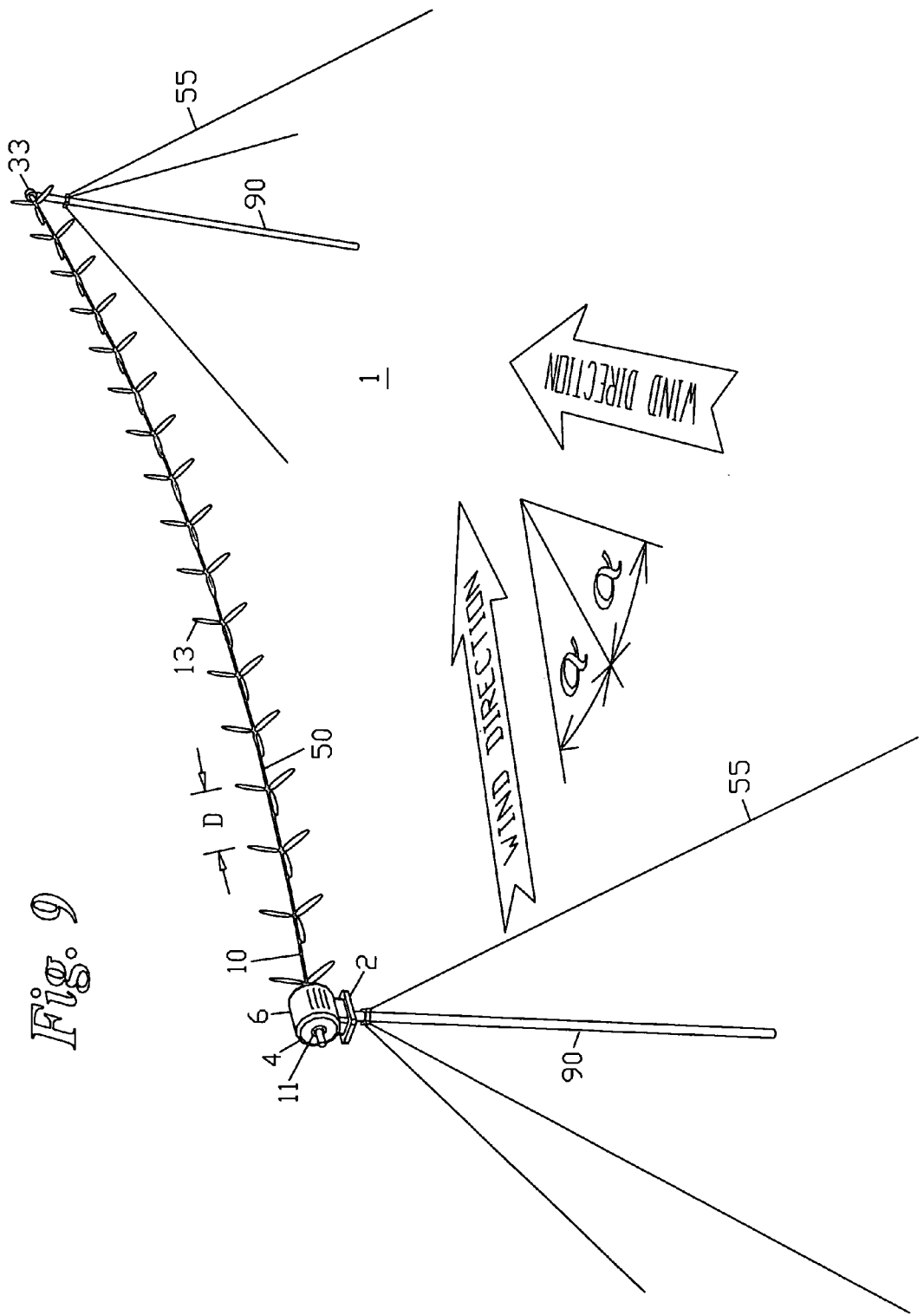
FIG. 9 oblique view: co-axial multi-rotor wind turbine, at an offset angle α to the wind direction, in catenary suspension between two guyed towers.
Figure 40:
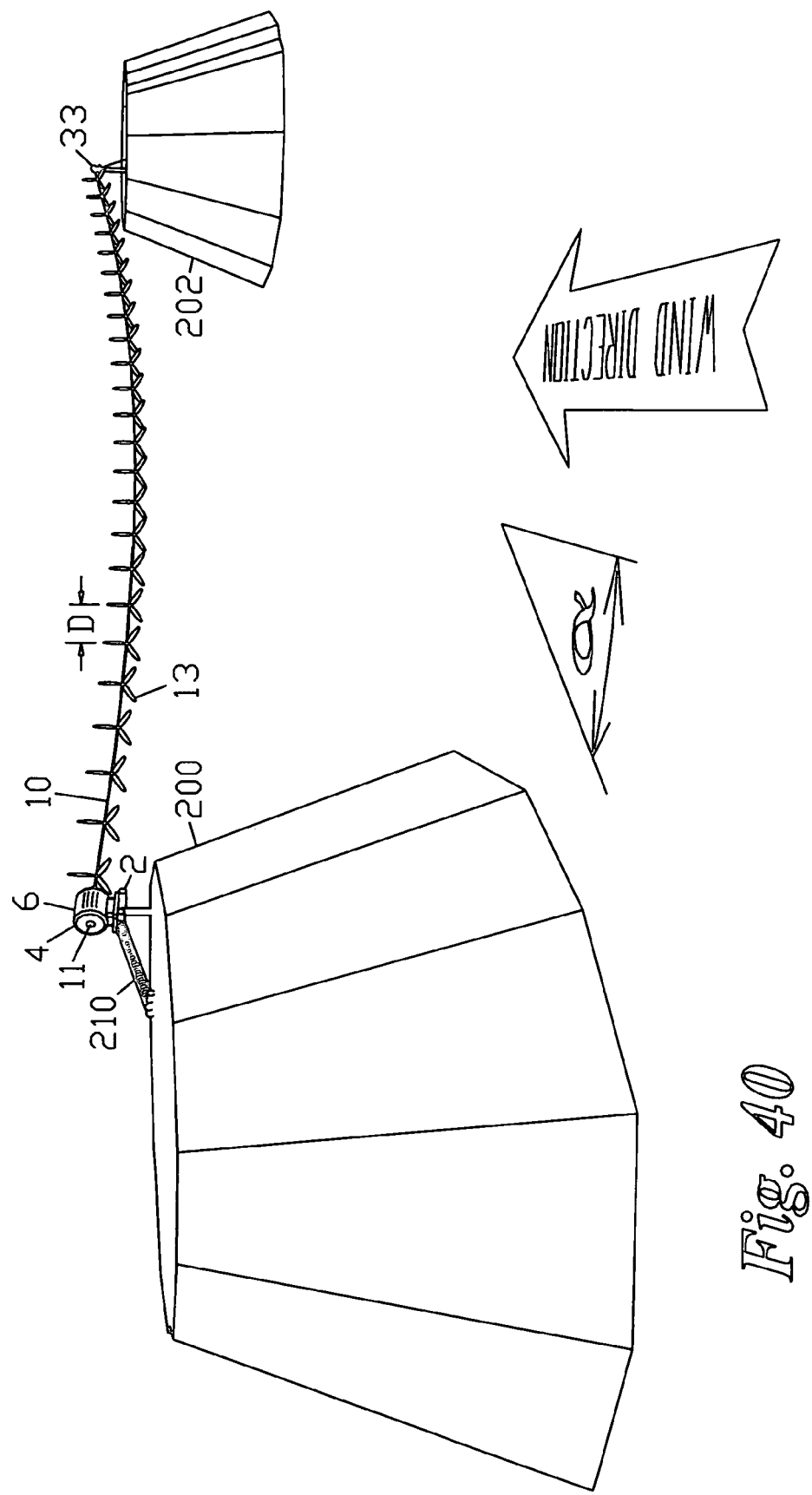
FIG. 40. coaxial multirotor wind turbine in catenary suspension between 2 desert mesas at horizontal offset angle α to the wind direction.
Figure 41:
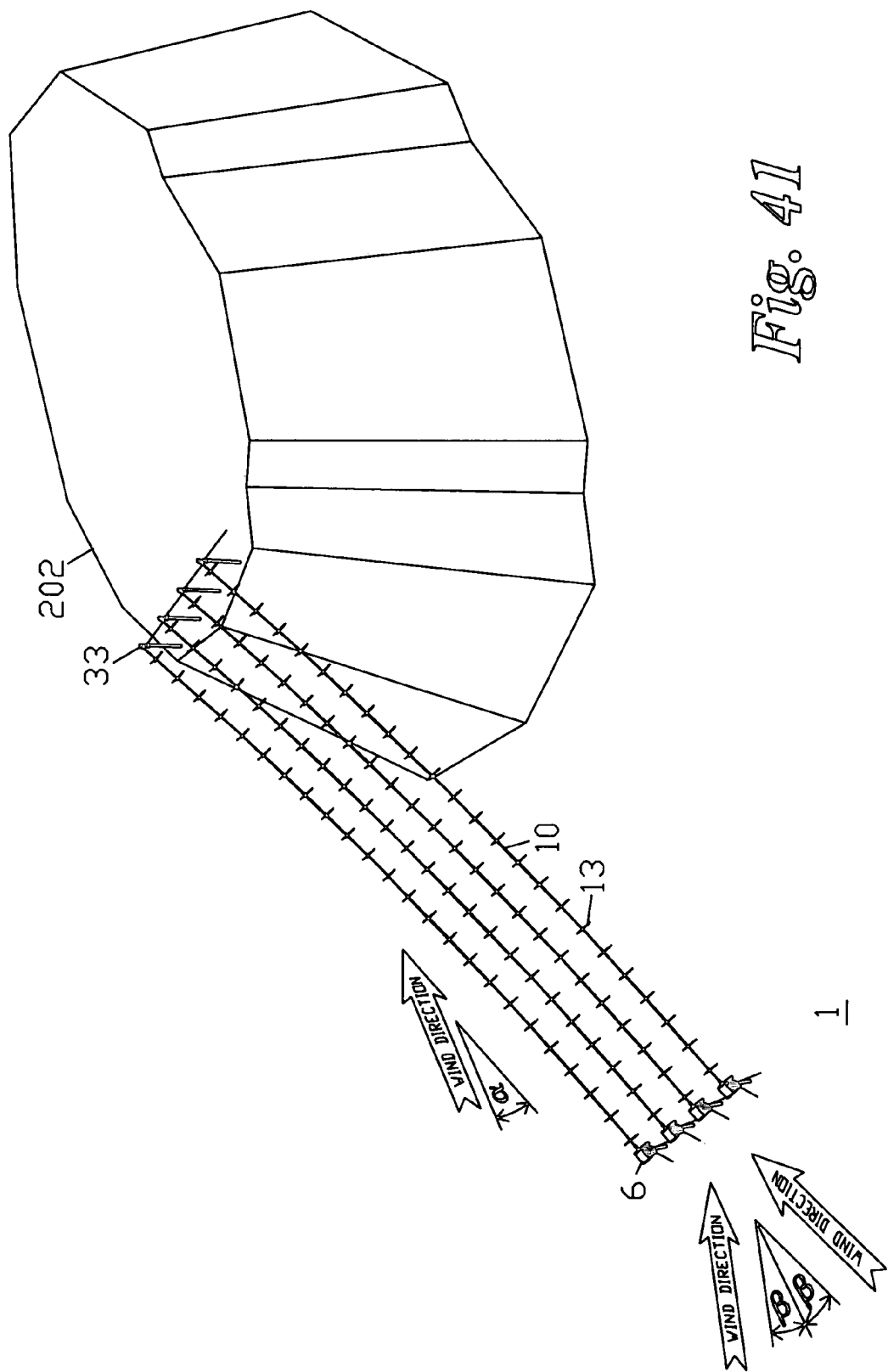
FIG. 41. lateral array of 4 parallel, coaxial multirotor turbines in catenary suspension between a desert floor and a desert mesa, offset angle α in vertical plane, offset angle β in horizontal plane.
Figure 42:
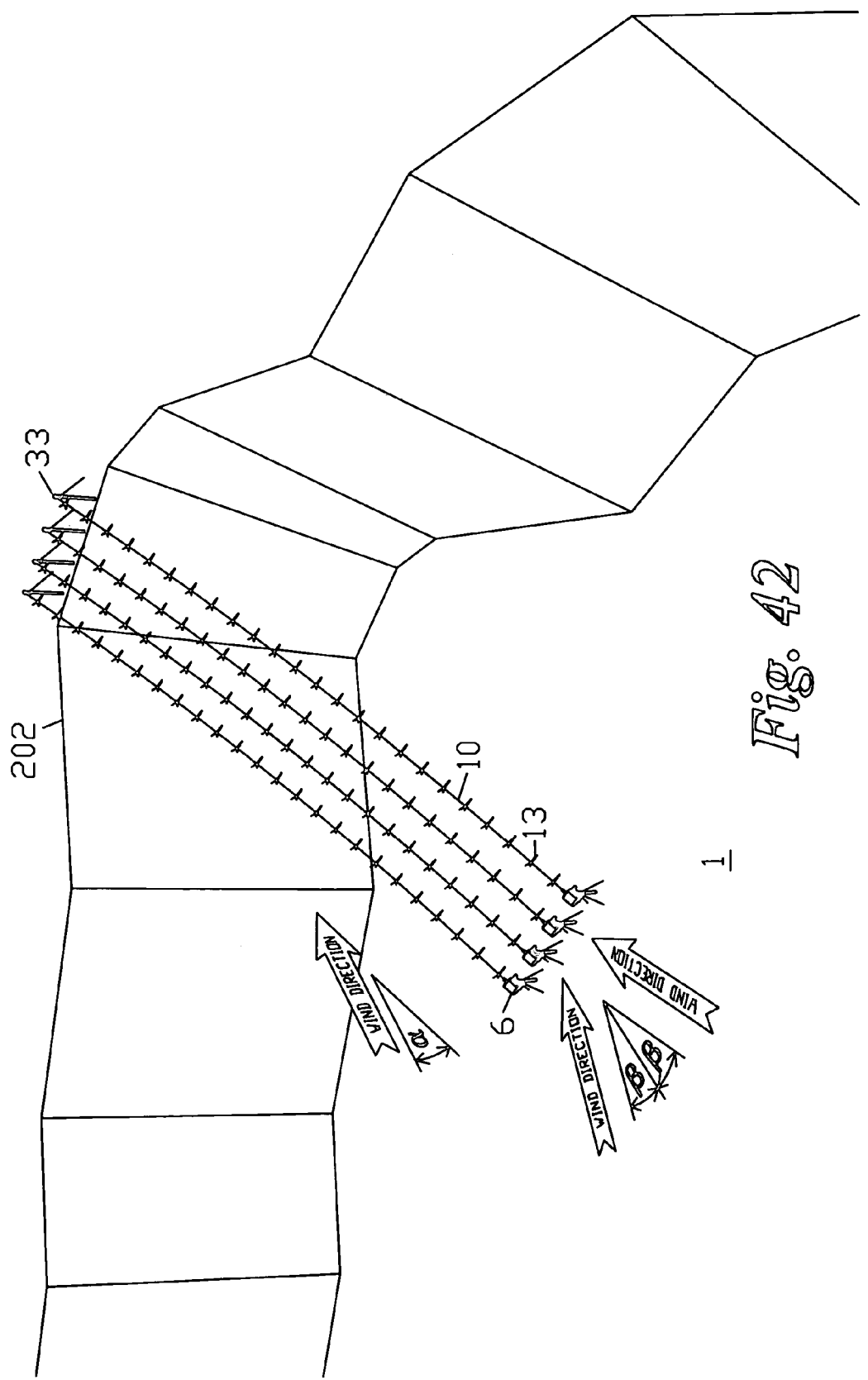
FIG. 42. lateral array of 4 parallel, coaxial multirotor turbines in catenary suspension, between a desert floor and a higher level of a ravine, offset angle α in vertical plane, offset angle β in horizontal plane.
Figure 43:
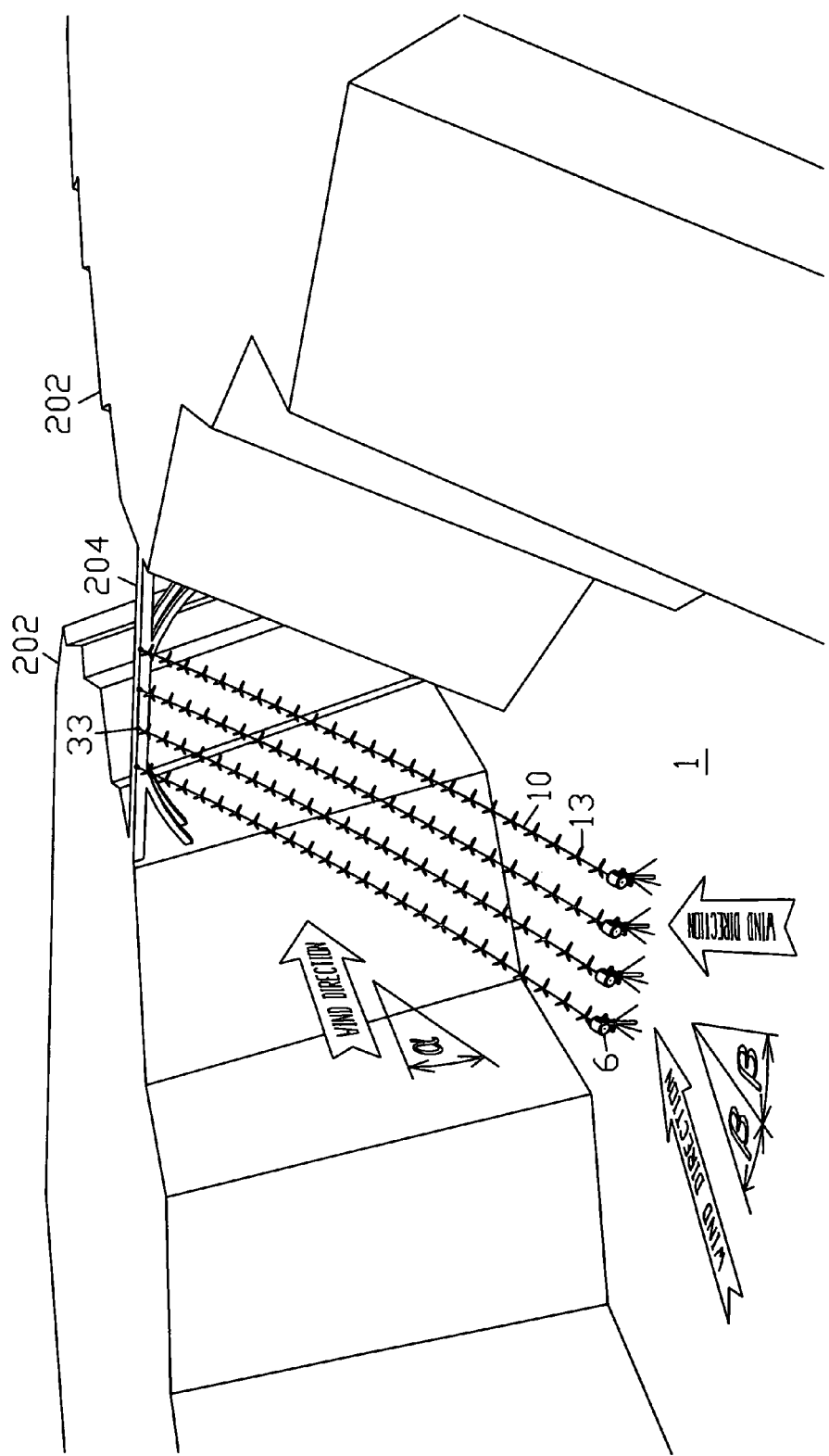
FIG. 43. lateral array of 4 parallel, coaxial multirotor turbines in catenary suspension, between the floor of a canyon and a bridge spanning it, offset angle α in vertical plane, offset angle β in horizontal plane.
Figure 44:
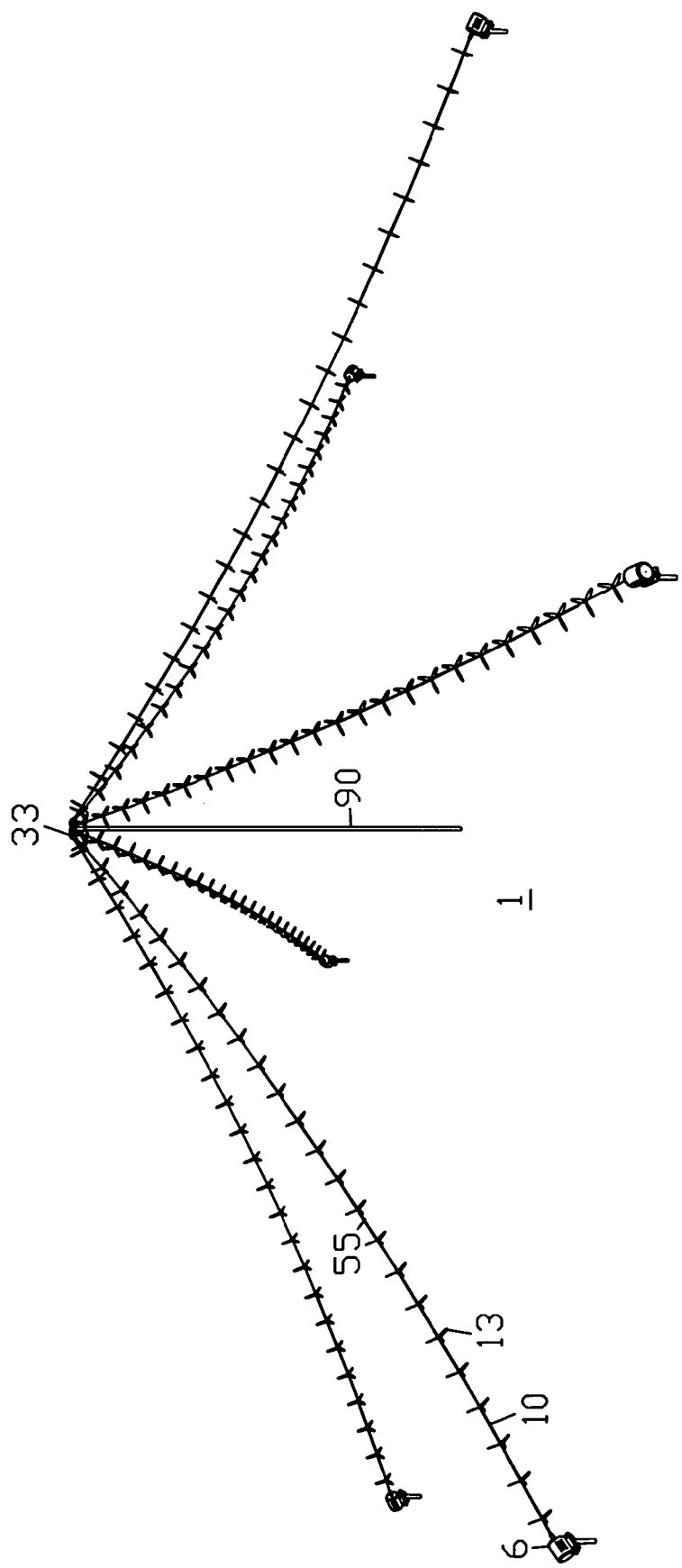
FIG. 44. radial array of 6 coaxial multirotor turbines in catenary suspension, between a horizontal surface and a central tower.

Catenary Co-Axial, Multi-Rotor Turbine Suspended Between Two Elevated Supports; FIGS. 9, 40

The seventh embodiment is similar to the first embodiment, except instead of spanning a canyon, this turbine spans the distance between two elevated supports such as towers (FIG. 9), hills, or mesas (FIG. 40). The load 6 is located at the top of one support, and suspension bearing 33 is at the top of the other support. Such a turbine is ideal for use in a region having a predominantly unidirectional wind resource. In FIG.

9, the towers 90 are optimally placed so that the driveshaft 10 is oriented at offset angle α (alpha) to the direction of the wind. In FIG. 9, a choice of two possible such prevailing wind directions, in relation to the driveshaft aim, that would produce maximum power, is illustrated—the directional character of the wind resource at any given location will suggest the best positioning for maximum energy capture over time. Rotor spacing distance D, combined with offset angle α (alpha), in general serve to allow fresh wind to reach each rotor, so that all rotors effectively harness the energy of the wind and contribute to overall power output. In FIG. 9, guy wires 55 serve to maintain the towers in an upright position, and also serve to maintain tension on the driveshaft, transmitting it ultimately to a compression force in the earth itself. Adjustable tension means 210 may optionally be applied to the appropriate guy wire(s) or elsewhere in the structure to help maintain desired driveshaft tension, and may also aid in erecting the structure or lowering it for service by providing a means to tilt both towers simultaneously, provided that both towers are provided with a hinge at the base or are otherwise tiltable. The driveshaft itself, being in tension, acts to pull the towers toward each other, so the driveshaft also acts as a guy wire, and may lessen or eliminate the need for the towers to have guy wires that pull inward toward the other tower. This use of the earth or supporting surface, as a structural member of the turbine in compression, is a key factor in the economical superiority of this design. Other factors are lighter total blade weight and higher RPM, to directly drive a generator, requiring no gearbox, so that the entire turbine comprises a single moving part. Placement of the generator at the upwind end of the turbine favorably allows the thrust force of the rotors to be transmitted in tension along the driveshaft to the bearings 11 at the upwind end of the shaft. The driveshaft additionally transmits the cumulative torque force from all rotors to the load 6, a generator with its electromagnetic resistance to turning. Both of these forces, together progressively increase along the driveshaft, proceeding toward the upwind end, from the cumulative force added by each rotor, so that as torque increases, tension also increases, helping to keep the driveshaft straight.

An alternative aiming strategy is to intentionally allow the driveshaft to sag in the middle as illustrated in FIG. 9, but to a greater degree, by providing low driveshaft tension, then rely on the sag in the driveshaft to define an offset angle α (alpha) in the vertical plane. This would allow placement of the first tower, with the generator, more directly upwind of the second tower. However angle α (alpha) would then vary along the length of the driveshaft, with the rotors near the center having an offset angle α (alpha) equal to zero or near zero, so the middle section would experience more mutual wake interference between rotors, and therefore produce less power. Combinations of these two aiming strategies to establish the best chance of optimizing angle alpha for the majority of the rotors, to capture the most energy over time, are possible.

8. Eighth Embodiment

Figure 10:
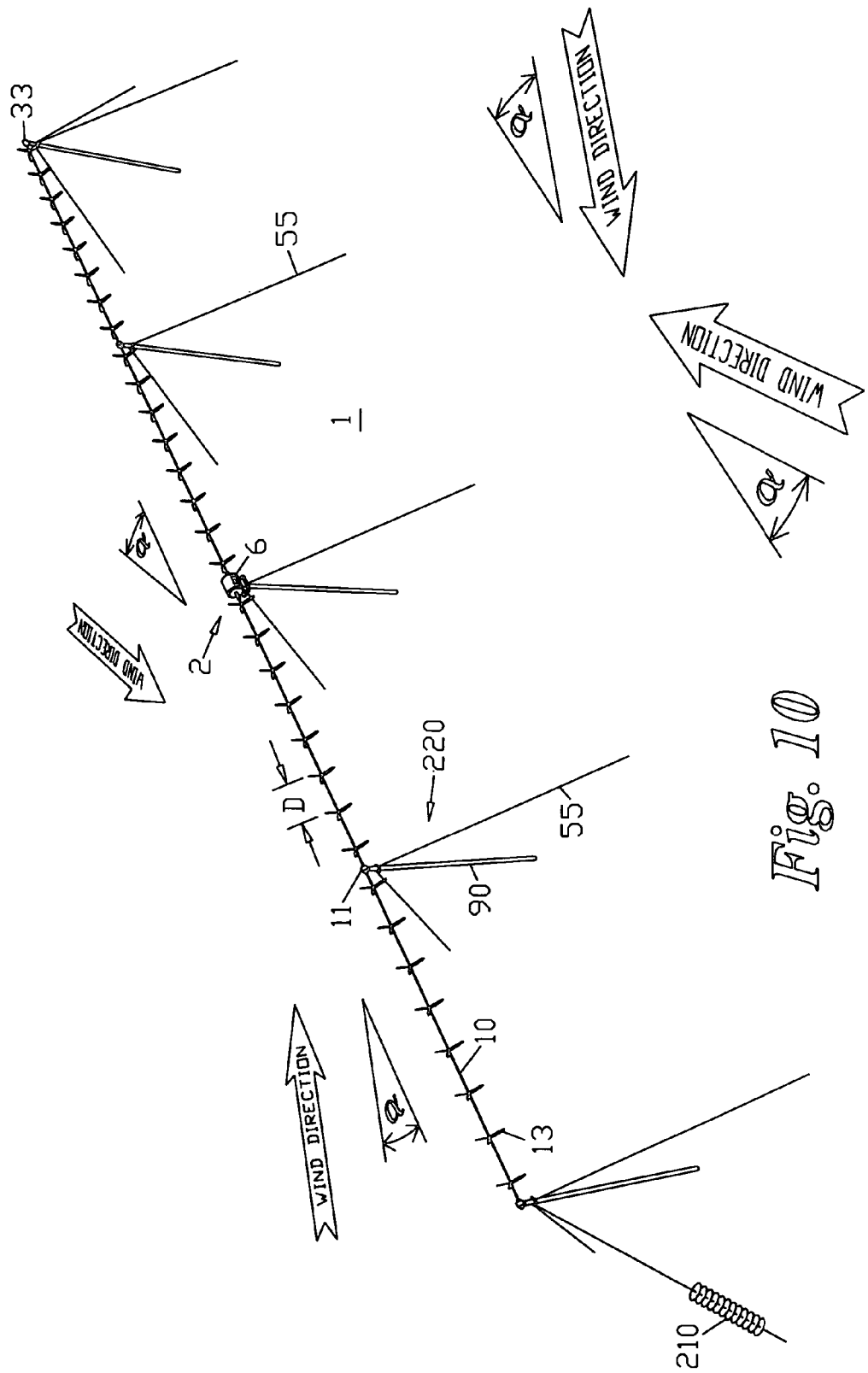
FIG. 10 coaxial multirotor turbine, supported at horizontal offset angle α to the wind direction, by multiple guyed towers, generator located at midpoint.
Figure 11:
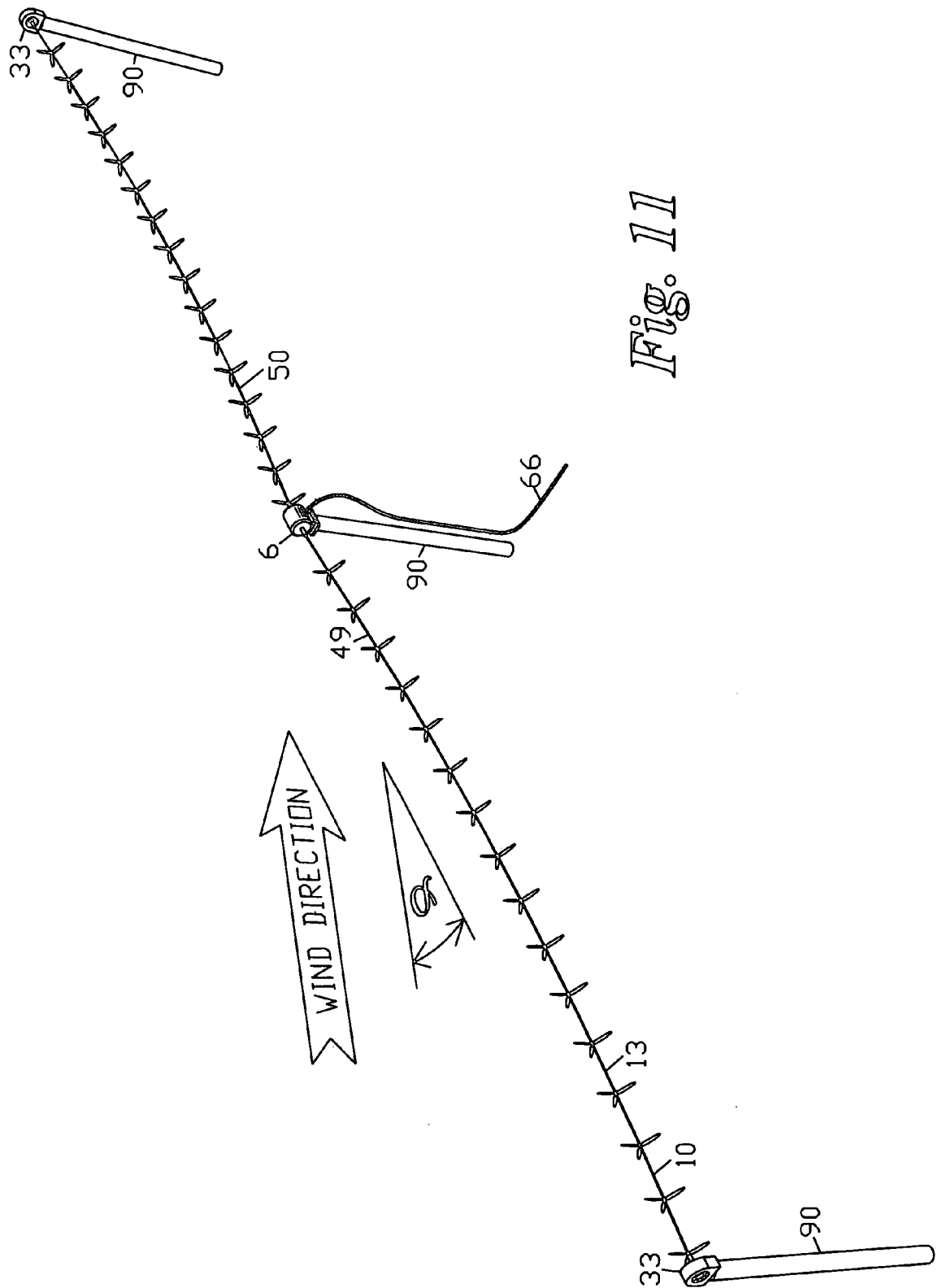
FIG. 11 coaxial multirotor turbine supported by multiple freestanding towers at horizontal offset angle α to the wind direction.

Catenary Co-Axial, Multi-Rotor Turbine Suspended Between Multiple Towers; FIGS. 10 and 11

The eighth embodiment is similar to the seventh, with the addition of one or more intermediate supports 220, in this case taking the form of towers 90, stabilized by guy wires 55, supporting bearings 11 to help elevate the driveshaft as in the second embodiment. The intermediate supports allow a longer driveshaft, to support more rotors, thereby increasing swept area and hence increasing power output. Alternatively such intermediate supports may be used in lieu of driveshaft tension and/or stiffness, to whatever extent is appropriate for a given installation, as simply an alternate method of supporting the driveshaft over its length. The generator may be located proximate the upwind end of the driveshaft, as in the seventh embodiment of FIG. 9, at the downwind end, or at an intermediate location, as shown in FIGS. 10 and 11. Placing the generator at the upwind end of the turbine results in the thrust force of the wind adding to driveshaft tension, helping to raise critical speeds during strong winds when faster rotation will occur. Adjustable tension means 210 is optionally applied to one end guy wire to keep the driveshaft taut at an appropriate tension. As in the seventh embodiment, the entire assembly may be lowered and raised, tilting all towers simultaneously, by extending or retracting one of the end guy wires, and adjustable tension means 210 may be so configured to also be used for this purpose. The towers of either the seventh or eighth embodiment may alternatively be shaped as an A-frame (not shown), eliminating the need for the side guy wires, while preserving the ability to tilt all towers together. The guyed turbine of FIG. 10 may also be lowered sideways by loosening all guy wires on one side. Alternatively, freestanding towers of sufficient strength may require no guy wires as in FIG. 11.

9. Ninth Embodiment

Figure 12:
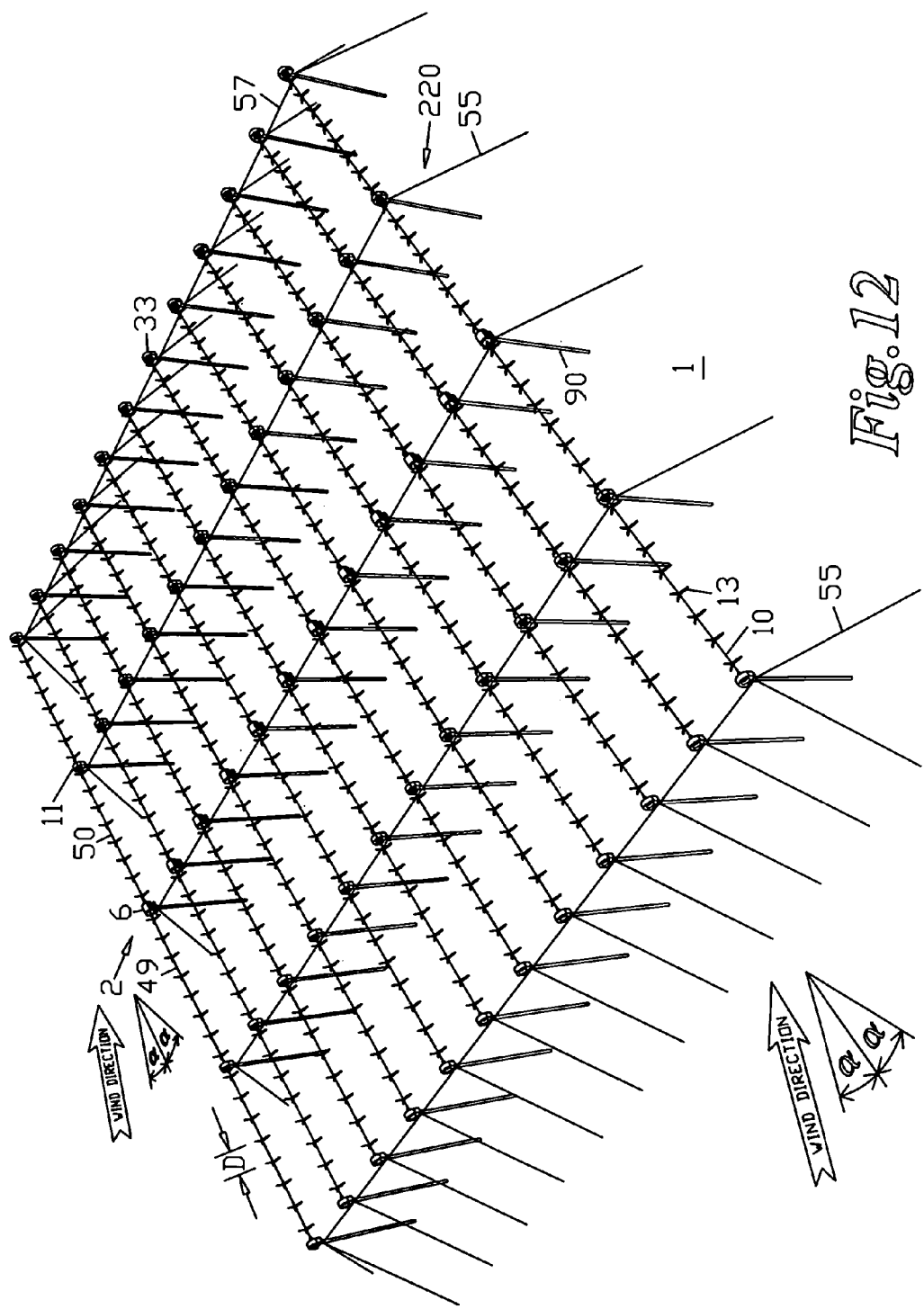
FIG. 12 horizontal array of coaxial multirotor turbines sharing guyed support.
Figure 13:
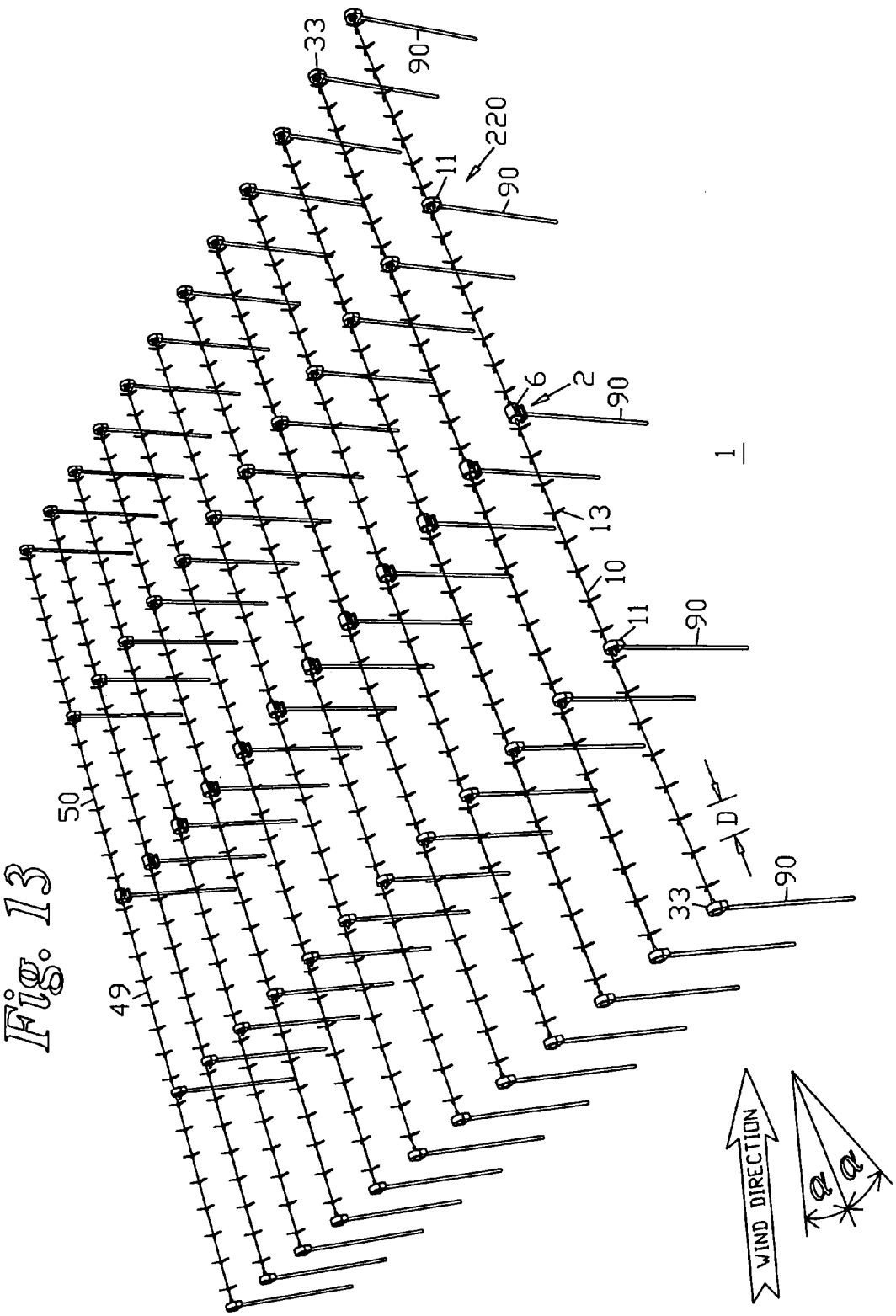
FIG. 13 horizontal array of coaxial multirotor turbines on freestanding towers.

Horizontal Planar Array of Stationary Co-Axial Multi-Rotor Turbines; FIGS. 12 and 13

Multiple turbines of the seventh or eighth embodiment may be installed side-by-side. Horizontal guy wires between units 57 may be used to help support all but the peripheral towers of the array, preserving the space below the array for other uses without the intrusion of guy wires. An example would be a parking lot below the turbines, in which case the towers could also serve as supports for the parking lot lights. Another example would be farming. Spacing between turbines should be sufficient to allow fresh wind to reach each line of rotors. This grid of turbines sharing horizontal guy wires 57 of FIG. 12 is similar to the 31st embodiment of U.S. Pat. No. 6,616,402, illustrated in FIG. 42 of that patent, issued to this inventor. Alternatively, freestanding towers of sufficient strength may require no guy wires as in FIG. 13.

10. Tenth Embodiment

Vertical Planar Array of Stationary Co-Axial Multi-Rotor Turbines; ("Windfence") FIG. 14

Multiple turbines of the seventh or eighth embodiment may be stacked in a vertical array, sharing the same towers, forming a virtual wall of rotors similar to that of the third embodiment. Rotors of adjacent driveshafts may be staggered to allow closer spacing as in the fourth embodiment. Such towers may or may not require guy wires, depending on construction. A multiplicity of such vertical arrays may be placed side-by-side (illustrated), in which case sufficient spacing should be provided to allow fresh wind to reach each turbine array.

11. Eleventh Embodiment

Figure 15:
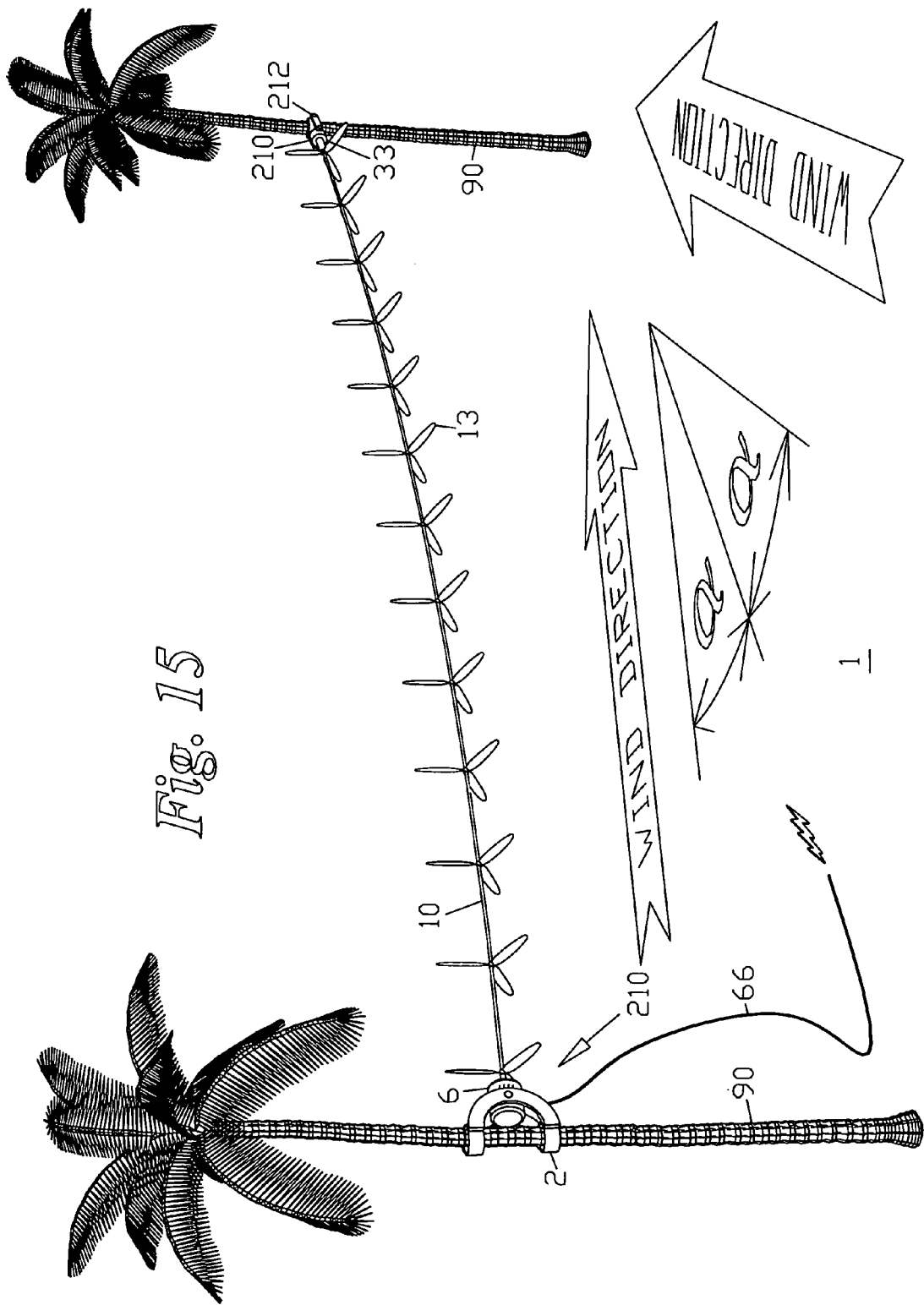
FIG. 15 coaxial multirotor turbine in catenary suspension between two palm trees, offset angle α in horizontal plane.

Catenary Co-Axial, Multi-Rotor Turbine Suspended Between Two Trees; FIG. 15

Similar to the seventh embodiment, in this embodiment trees act as towers 90. Means to attach the turbine to any such convenient support are included at each end station of the turbine. And like the previous embodiments, an adjustable tension means 210 may be included. To add to versatility, such a turbine should also feature an adjustable attachment length means 212, such as a cable winch. This will allow attachment to various support means without requiring a specific exact distance between them. Such placement may be ideal for small turbines in remote locations, for temporary, portable turbines for camping or extended missions in wilderness, and for use in developing countries. Power is extracted through a continuous power conduit means 66 such as the electric cable illustrated. For small versions, a simple and lightweight, yet powerful turbine may be rolled up and carried virtually anywhere. Any available support means may be used in lieu of either or both trees, such as a hill, rock, post, barn, truck etc.

12. Twelfth Embodiment

Figure 16:
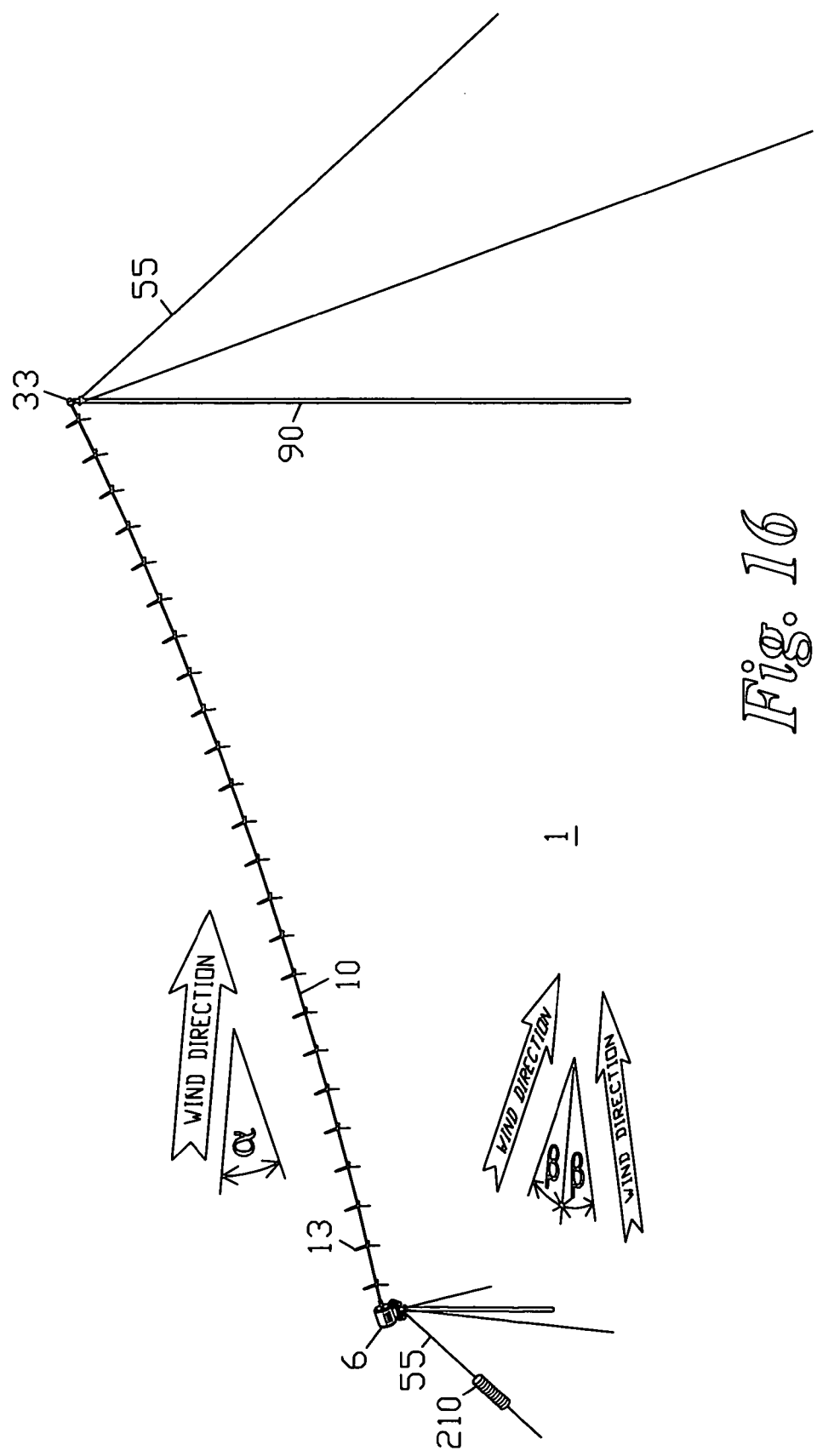
FIG. 16 coaxial multirotor turbine in catenary suspension between two guyed towers of different height, offset angle α in vertical plane, offset angle β in horizontal plane.
Figure 17:
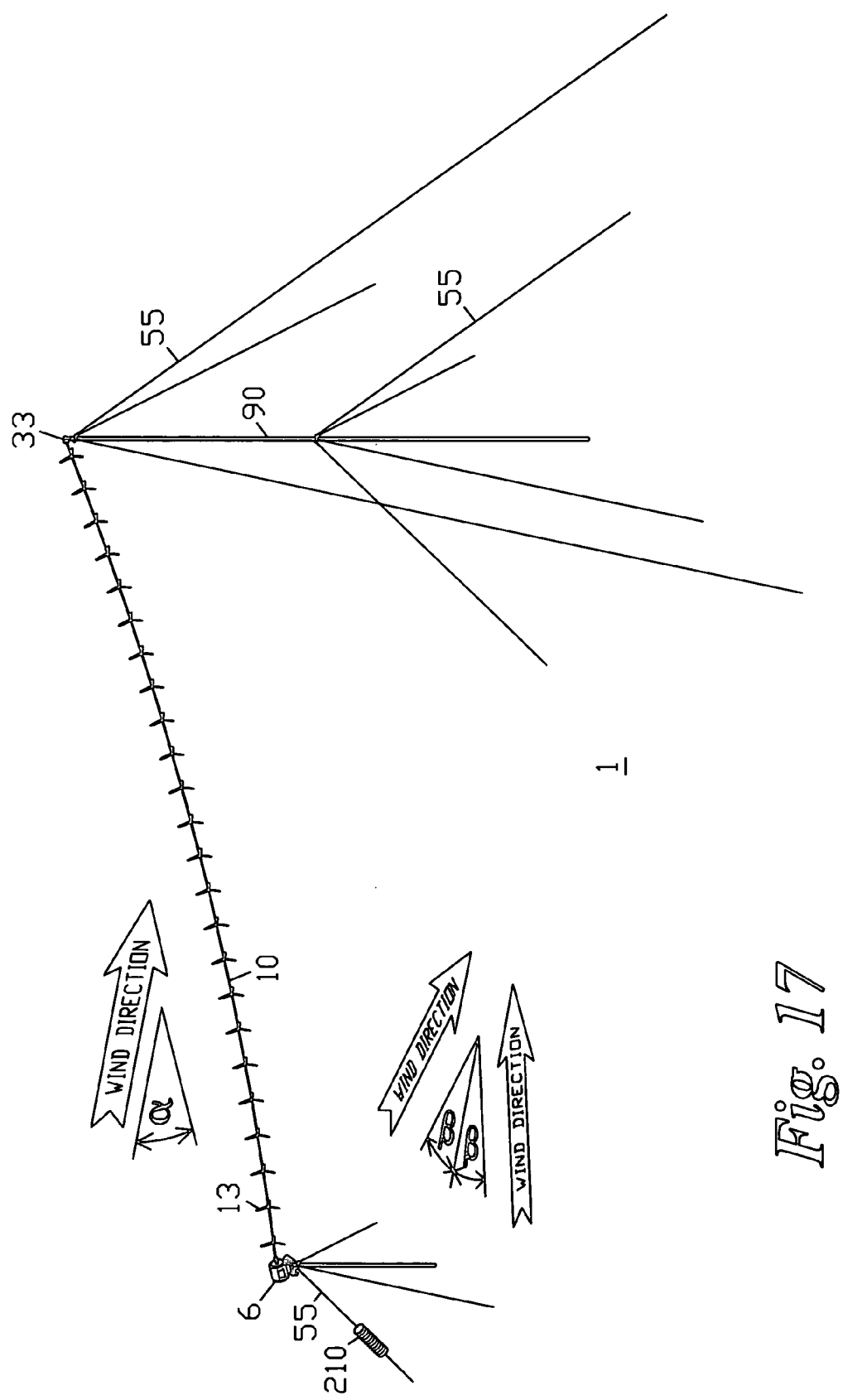
FIG. 17 coaxial multirotor turbine in catenary suspension between two guyed towers of different height, higher tower has guy wires at 2 levels, offset angle α in vertical plane, offset angle β in horizontal plane.
Figure 45:
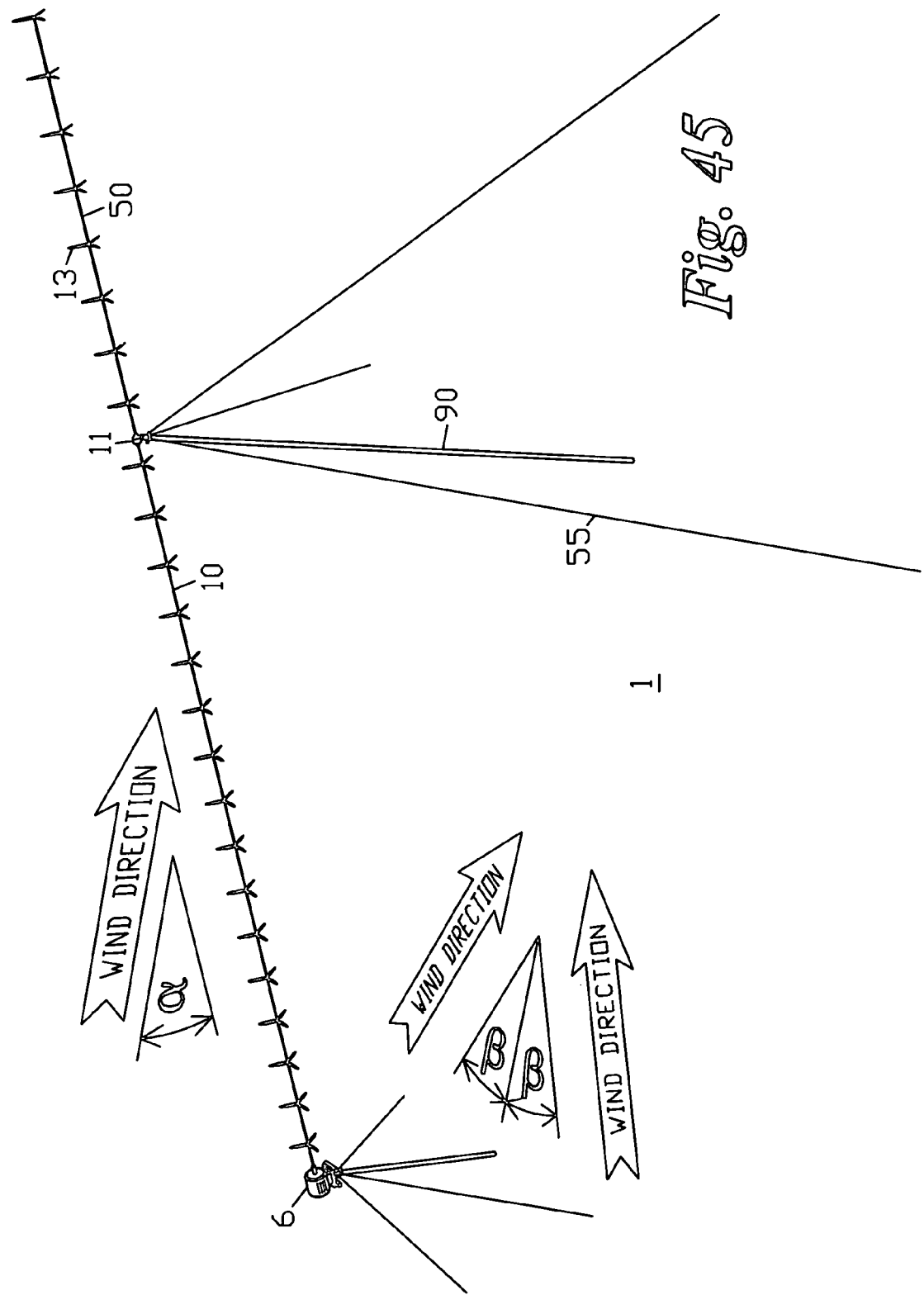
FIG. 45. coaxial multirotor turbine supported between two guyed towers of different height, driveshaft projecting past higher tower, offset angle α in vertical plane, offset angle β in horizontal plane.

Catenary Co-Axial, Multi-Rotor Turbine with Offset Angle α (Alpha) in Vertical Plane; FIGS. 16, 17, and 45

Similar to the seventh embodiment, except that the offset angle α (alpha) is defined largely by the difference in height between the ends of the driveshaft, in this case as a result of a difference in height between two supporting towers. The load, in this case a generator, is at the lower station for ease of support, installation, and service, and to minimize the length of electrical conductor needed to transmit the electrical power. Here the generator is mounted on a relatively low tower, with, the driveshaft extending to a suspension bearing 33 located at the top of a higher tower located directly downwind, relative to the direction of the average prevailing winds in the area. Normal deviations of the instantaneous wind at any moment from this average prevailing wind direction (labeled as angle β (beta)) contribute to the total offset angle α (alpha) from the wind direction as illustrated. This variation in wind direction should be taken into account when determining the relative heights of the towers, as it may suggest a more horizontal orientation than would be optimal in a strictly unidirectional wind resource. Configurations that combine the aiming strategies of the seventh embodiment and this embodiment are also possible, resulting in an aggregate offset angle α (alpha) in an oblique plane, depending on terrain, support means, and wind characteristics for any given site. The driveshaft length over the span may be supported against gravity and vertical or side thrust exerted by the wind, by either its own stiffness, by being placed in tension, or both. Adjustable tension means 210 may optionally be included. Note that this embodiment is similar to the 60th embodiment of U.S. Pat. No. 6,616,402 issued to this inventor, as illustrated in FIGS. 80 and 75 of that patent, except that we have replaced the blimp or lifting body with a tower. A driveshaft having sufficient stiffness may project past the higher support in a cantilevered manner (FIG. 45) in a similar manner to the roof-mounted turbine of the sixteenth embodiment (FIG. 22), and to the projecting driveshaft of U.S. Pat. Nos. 6,616,402, 6,692,230, 7,008,172, and 7,063,501 previously issued to this inventor. This cantilevered driveshaft projection allows more rotors to be supported, placing more swept area higher into the sky, producing more power, without increasing tower height.

13. Thirteenth Embodiment

Figure 18:
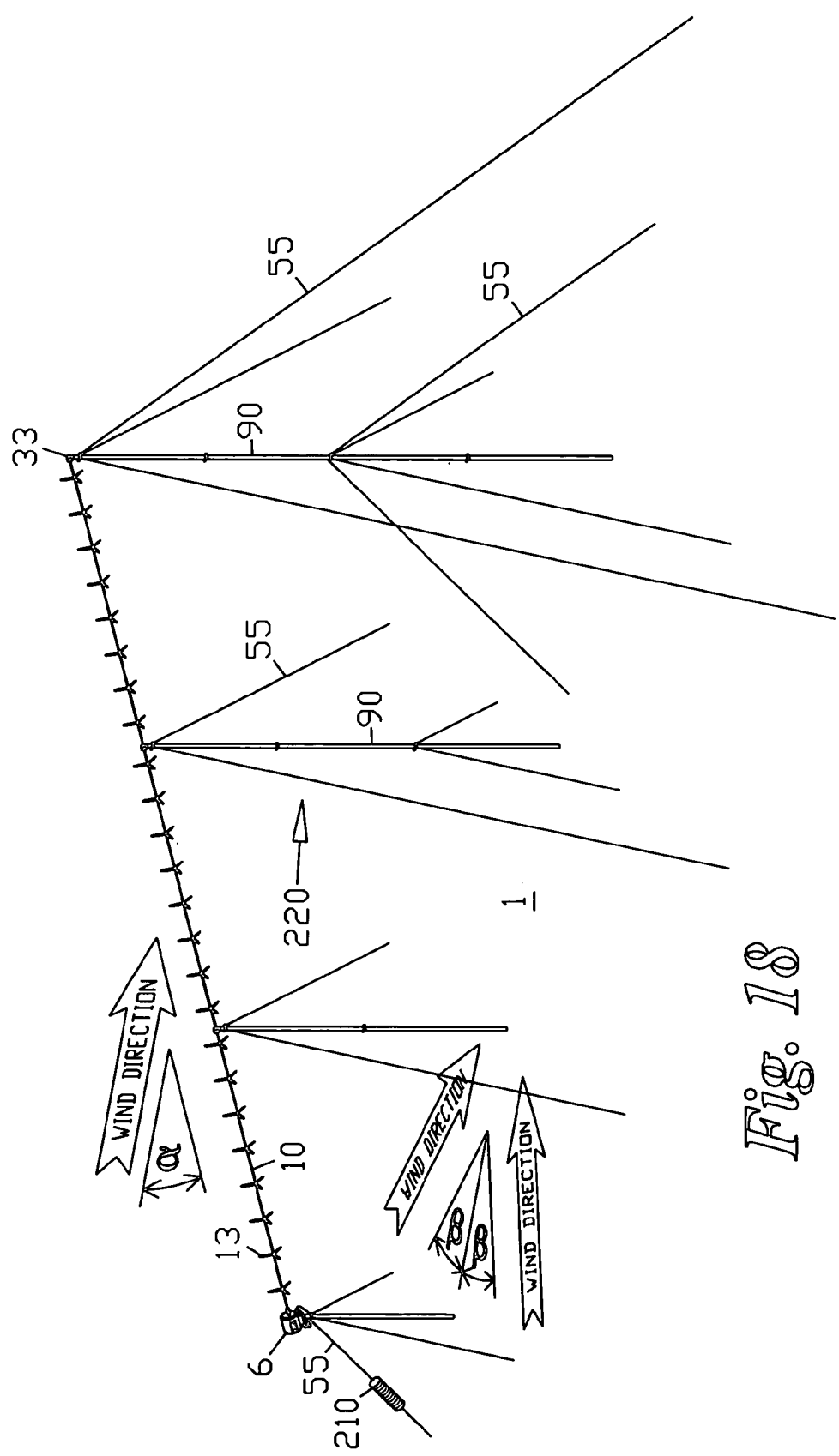
FIG. 18 coaxial multirotor turbine supported by 4 successively higher guyed towers, offset angle α in vertical plane, offset angle β in horizontal plane.
Figure 19:
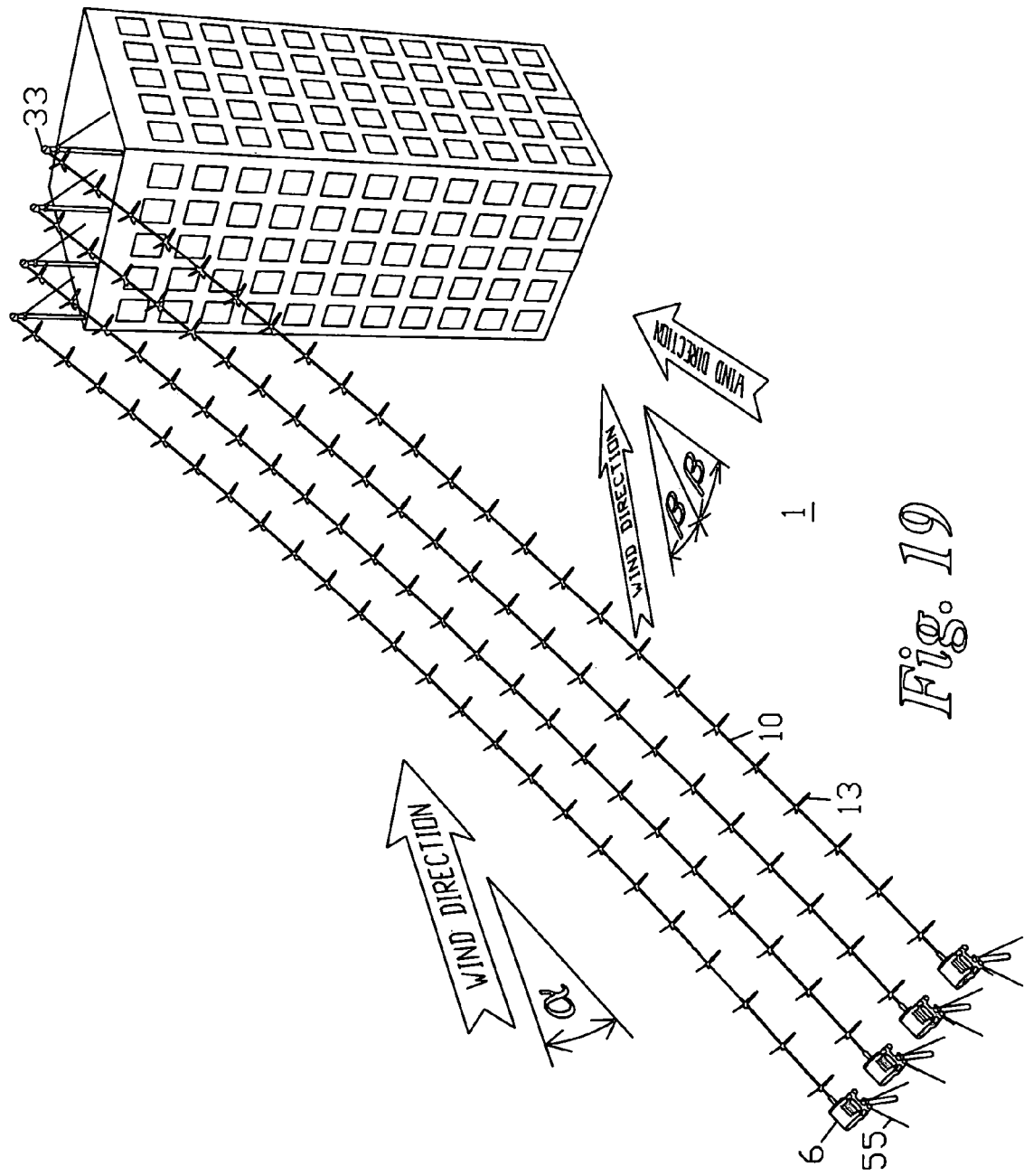
FIG. 19 lateral array of four parallel, coaxial multirotor turbines in catenary suspension between ground level and a high rise building, offset angle α in vertical plane, offset angle β in horizontal plane.

Co-Axial, Multi-Rotor Turbine with Offset Angle α (Alpha) in Vertical Plane Supported by Multiple Towers; FIG. 18

This turbine is similar to the twelfth embodiment, with the addition of one or more intermediate supports 220, in this case taking the form of towers 90 and guy wires 55, to help elevate the driveshaft as in the second and eighth embodiments. The intermediate supports allow a longer driveshaft, to support more rotors, thereby increasing swept area and hence increasing power output.

Alternatively such intermediate supports may be used in lieu of driveshaft tension and/or stiffness, as simply an alternate method of supporting the driveshaft. As in the previous embodiment, a cantilevered driveshaft extension, projecting past the upper bearing, may also be included.

14. Fourteenth Embodiment

Multiple Co-Axial, Multi-Rotor Turbines with Offset Angle α (Alpha) in Vertical Plane, with Higher Stations Sharing Common Support Structure Such as a Building; FIGS. 19, 41, 42, 43, 44

Multiple turbines similar to the twelfth embodiment may share a common means of support for their upper station. This common means of support could be any natural or manmade structure. Examples would be a cliff (FIG. 42), mountain, hill (FIG. 41), tower (FIG. 44), bridge (FIG. 43), building (FIG. 19) etc. The turbines could be parallel (FIGS. 19,41,42,43) to all capture winds from within the same directional range, or could splay Outward in different directions (FIG. 44) so that different turbines are best oriented to capture winds from different directional ranges.

15. Fifteenth Embodiment

Figure 20:
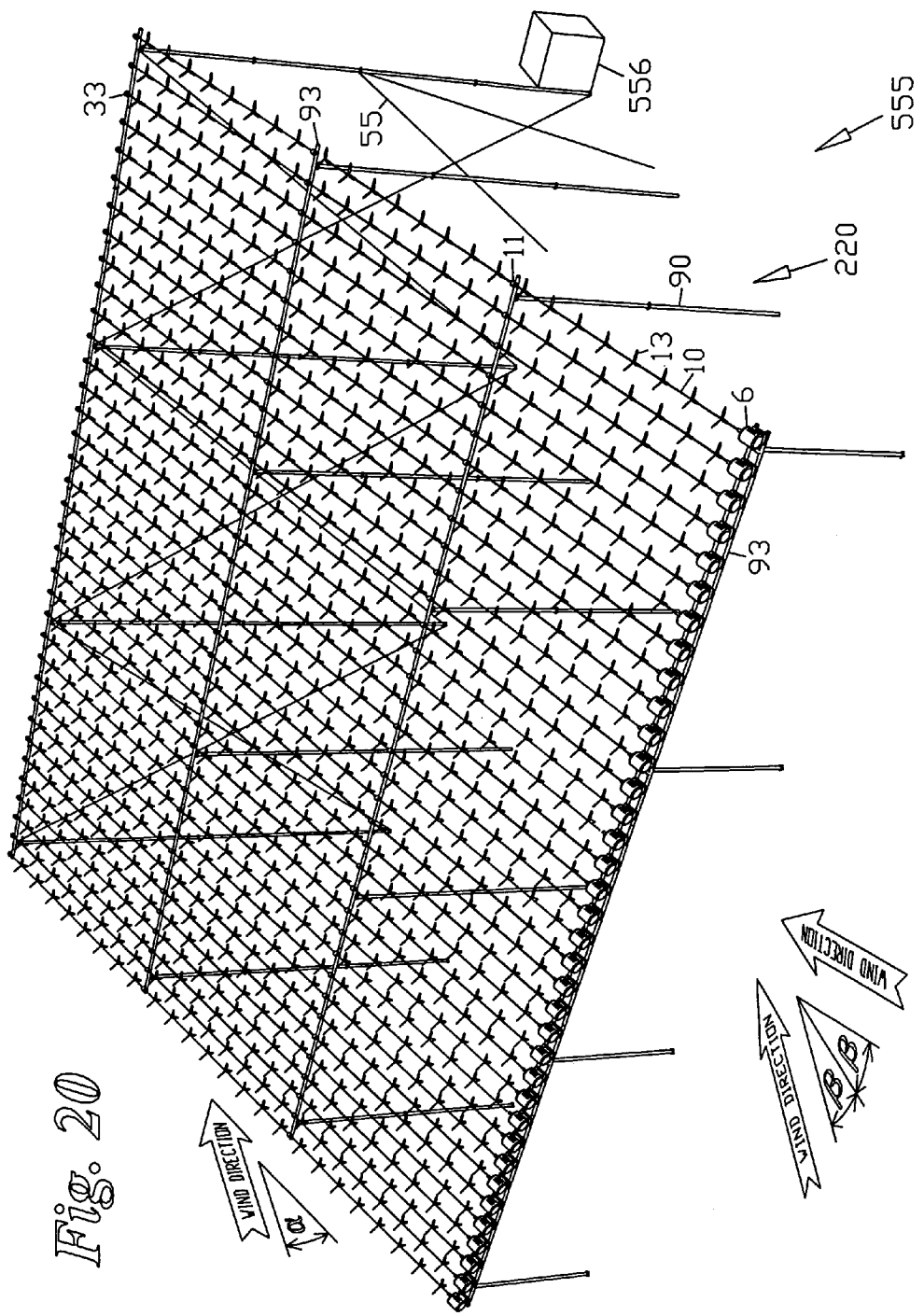
FIG. 20 lateral array of multiple, parallel, coaxial multirotor turbines supported in sloping orientation by common frame, offset angle α in vertical plane, offset angle β in horizontal plane.
Figure 21:
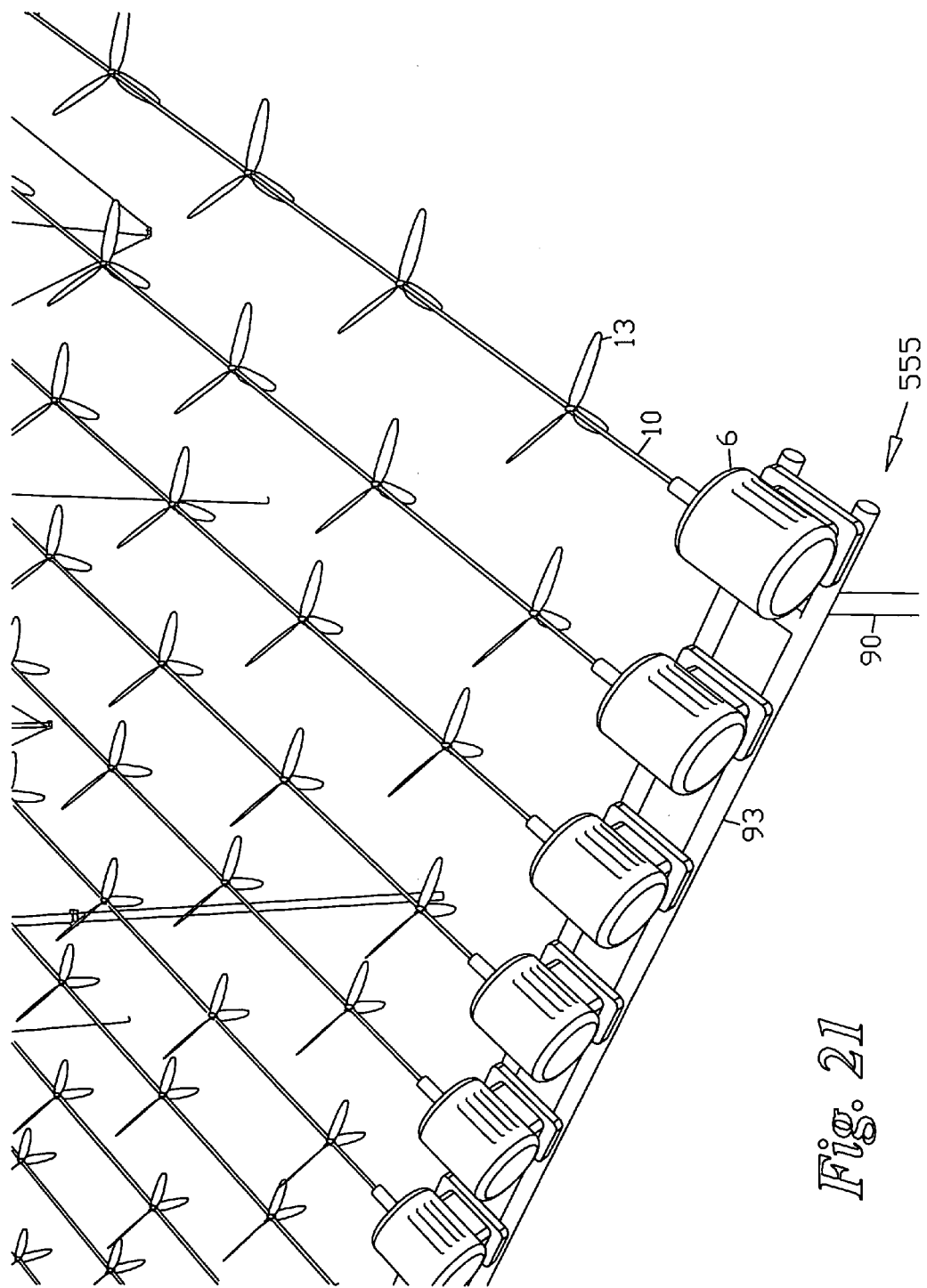
FIG. 21 close-up view of generators of multiple turbines mounted on common frame.

Multiple Co-Axial, Multi-Rotor Turbines with Offset Angle α (Alpha) in Vertical Plane, Supported by a Common Framework Structure; FIGS. 20 and 21

Multiple turbines similar to the twelfth or thirteenth embodiment, may be mounted in parallel, side by side on a common support frame 555, forming a sloping virtual surface of rotors with offset angle α (alpha) in the vertical plane. In the support frame illustrated, collective turbine support members 93 span the lateral gap between towers 90, and support the turbines at spaced intervals over that span. The rotors may be staggered to allow closer spacing (illustrated). The spans of driveshaft between supports may be supported by the driveshaft stiffness, by placing the driveshafts under tension, by the number of intermediate supports 220, or any combination of these. Guy wires 55 may be used to stabilize the structure, and may project outward from the structure (not illustrated) to aid in applying tension to the driveshafts, by transferring that tension to a compression force in the Earth itself. The turbine illustrated could produce approximately 1 megawatt using blades about 1 meter long, which can be produced by injection molding. The structure may additionally be provided with means 556 to raise and lower the structure, and/or to tilt and/or aim the entire structure.

16. Sixteenth Embodiment

Figure 22:
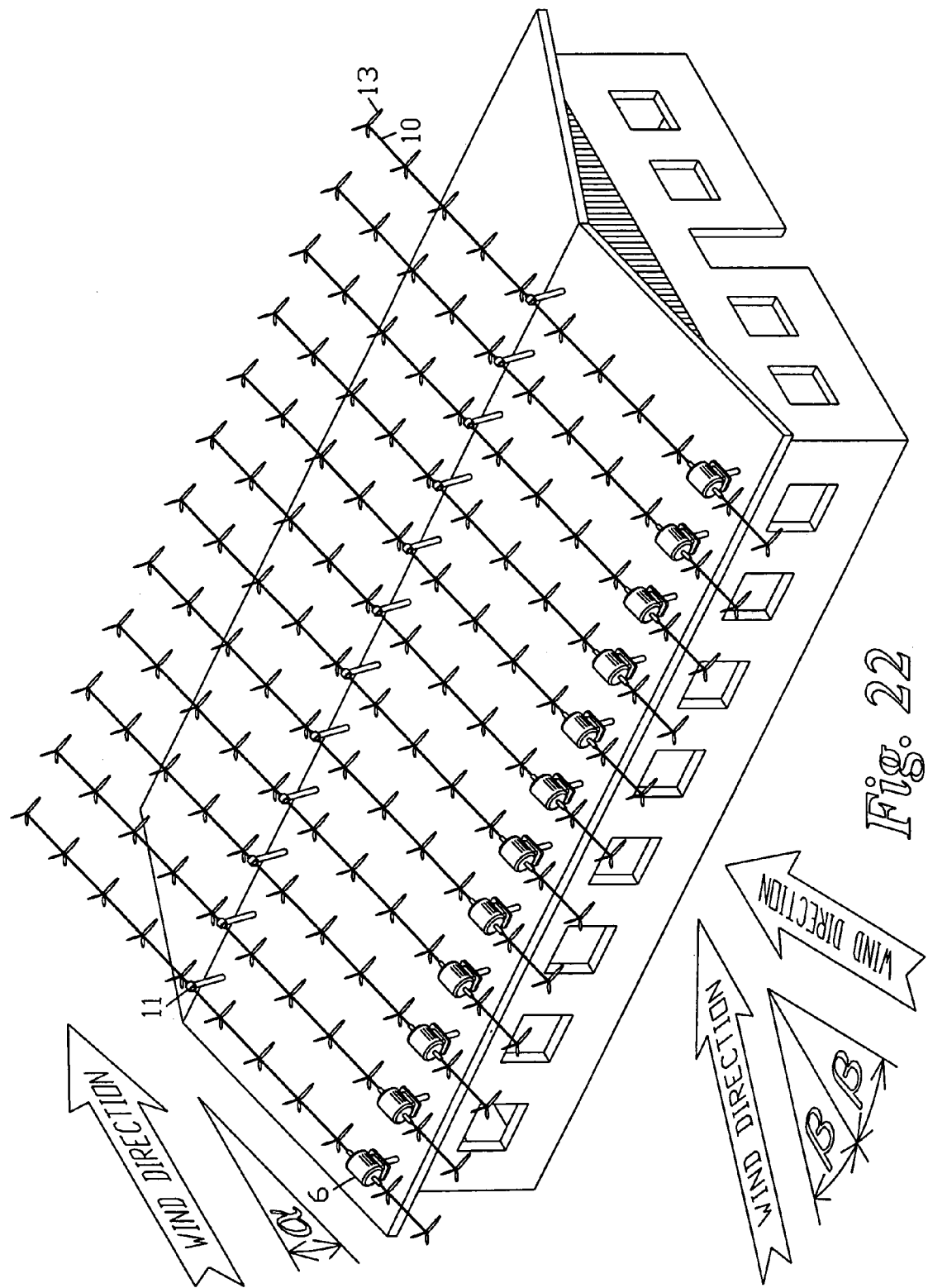
FIG. 22 lateral array of multiple, parallel, coaxial multirotor turbines supported by a gable roof, projecting past ridge, perpendicular to ridge, offset angle α in vertical plane, offset angle β in horizontal plane.

Multiple Co-Axial, Multi-Rotor Turbines with Offset Angle α (Alpha) in Vertical Plane Supported by a Sloping Roof; FIG. 22

Similar to the fifteenth embodiment, multiple co-axial, multi-rotor turbines are mounted in parallel at an upward slope, using a slanted roof as a convenient mounting structure. The roof optimally faces generally toward the prevailing wind direction. Each turbine has a load 6 at the lower end, and a bearing 11 at the upper end. The driveshafts may optionally extend in a cantilevered manner past the ridge of a gable roof (illustrated) to support more rotors at a height above the roofline, reaching upward to intercept more wind, extracting more power. The slope of the roof acts as a concentrator on the upwind side of the roof, and as a diffuser on the downwind side of the roof, increasing power output.

17. Seventeenth Embodiment

Figure 23:
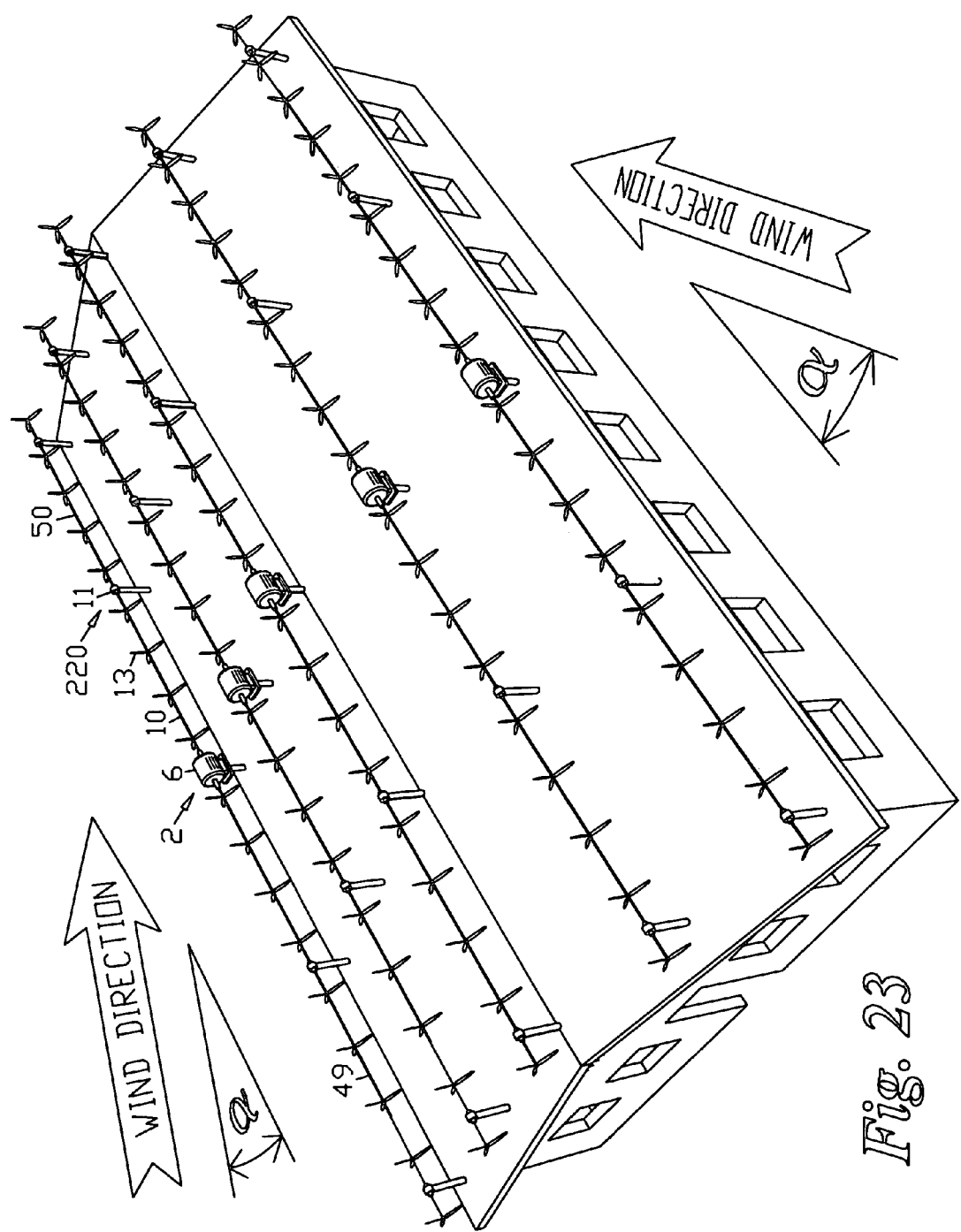
FIG. 23 multiple, parallel, coaxial multirotor turbines mounted over gable roof, parallel to ridge, building oriented at horizontal offset angle α to the wind direction.

Stationary Co-Axial, Multi-Rotor Turbine Mounted Along a Ridgeline; FIG. 23

A co-axial, multi-rotor turbine is mounted above the ridgeline of a gable roof. The building is oriented so that the ridgeline is at angle α (alpha) to the wind direction. The roof serves to elevate the turbine, placing it into the wind resource. Since the wind has a directional component perpendicular to the ridgeline, the slope of the roof acts as a concentrator on the upwind side of the roof, and as a diffuser on the downwind side of the roof, increasing power output. The driveshafts may, or may not, be placed under tension and may be provided with an adjustable tension means (not illustrated). The driveshafts may also project in a cantilevered manner past the periphery of the roof (not illustrated)

While a roof is used as an example, this configuration may alternatively be placed along any ridgeline, such as that of a naturally occurring landform, for example a hilltop or mountain ridge.

18. Eighteenth Embodiment

Multiple, Stationary Co-Axial, Multi-Rotor Turbines Mounted Parallel to a Ridgeline; FIG. 23

Similarly to the Seventeenth Embodiment, a co-axial, multi-rotor turbine is mounted above the ridgeline of a gable roof, with the building oriented so that the ridgeline is at angle α (alpha) to the wind direction. Additional turbines are mounted parallel to the ridgeline, appropriately spaced above and across the surface of the'roof to allow fresh wind to reach each rotor. As in the previous embodiment, the slope of the roof acts as a concentrator on the upwind side of the roof, and as a diffuser on the downwind side of the roof, increasing power output. While a roof is used as an example, this configuration may also be placed along the ridgeline of a naturally occurring landform, such as a hilltop or mountain ridge. The driveshafts may or may not be placed under tension and may be provided with an adjustable tension means (not illustrated). The driveshafts may also project in a cantilevered manner past the periphery of the roof (not illustrated).

19. Nineteenth Embodiment

Figure 24:
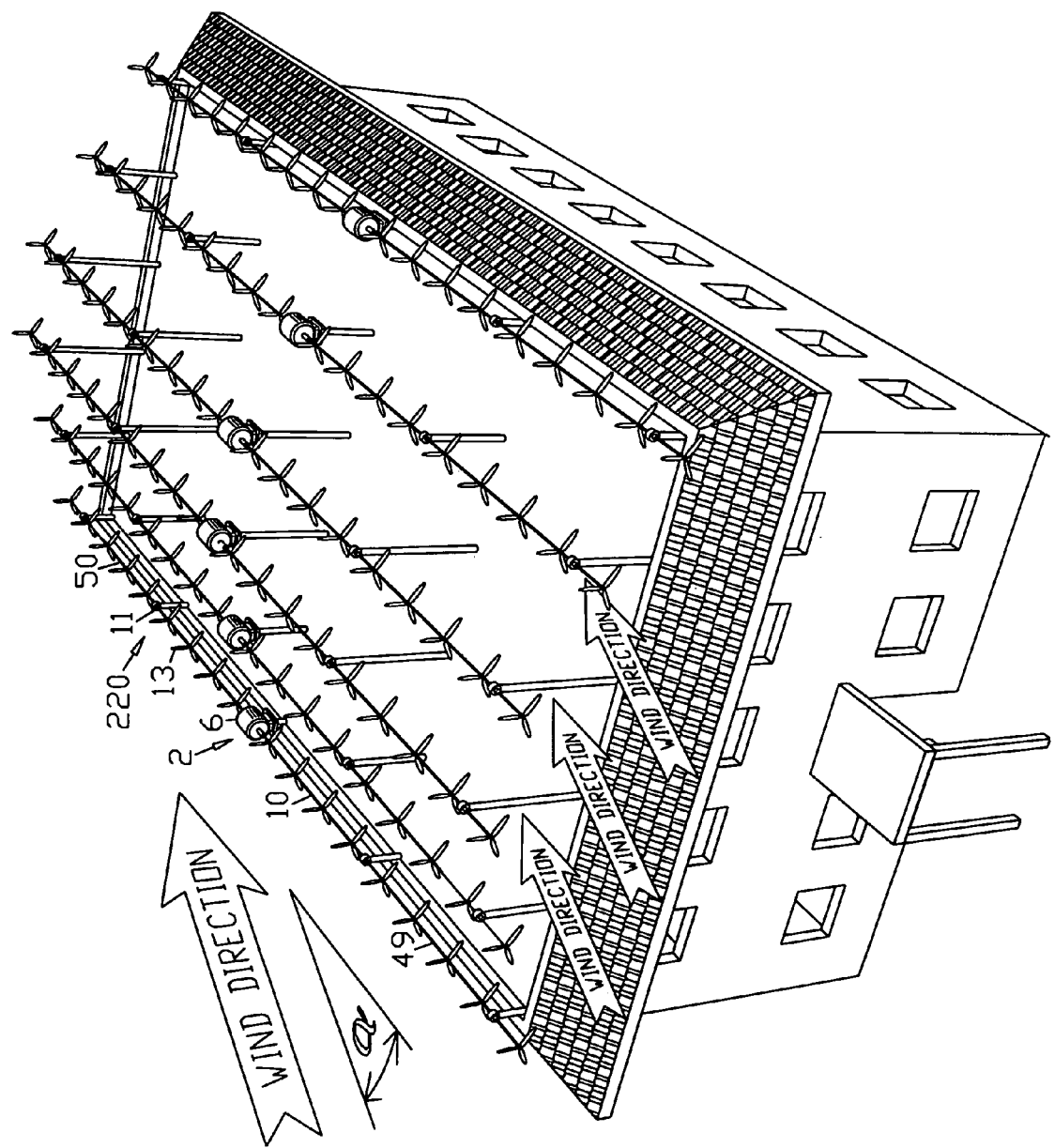
FIG. 24 aerial view: parallel turbines at various heights over commercial flat roof with mansards, building oriented at horizontal offset angle α to the wind direction.

Multiple Stationary Co-Axial, Multi-Rotor Turbines, Mounted at Various Heights Above a Flat Roof; FIG. 24

A flat rooftop is used to elevate a side-by-side array of co-axial multi-rotor turbines, located at various heights above that flat roof in order that each turbine may avoid the wakes of adjacent turbines, thereby intercepting more wind, for maximum energy capture. While many such configurations meet this description, including vertically stacking the turbines as in the 10th embodiment, we have chosen to illustrate a configuration similar to the previous embodiment, with each turbine located progressively higher, approaching the center of the array. The central turbines form a virtual ridgeline. Structure is provided to elevate the turbines above the roof in this configuration. Sloping mansard roofs (illustrated) may optionally surround the perimeter of the flat roof to serve as an upwind concentrator and a downwind diffuser, increasing energy capture. The driveshafts may or may not be placed under tension and may be provided with an adjustable tension means (not illustrated).

20. Twentieth Embodiment

Figure 25:
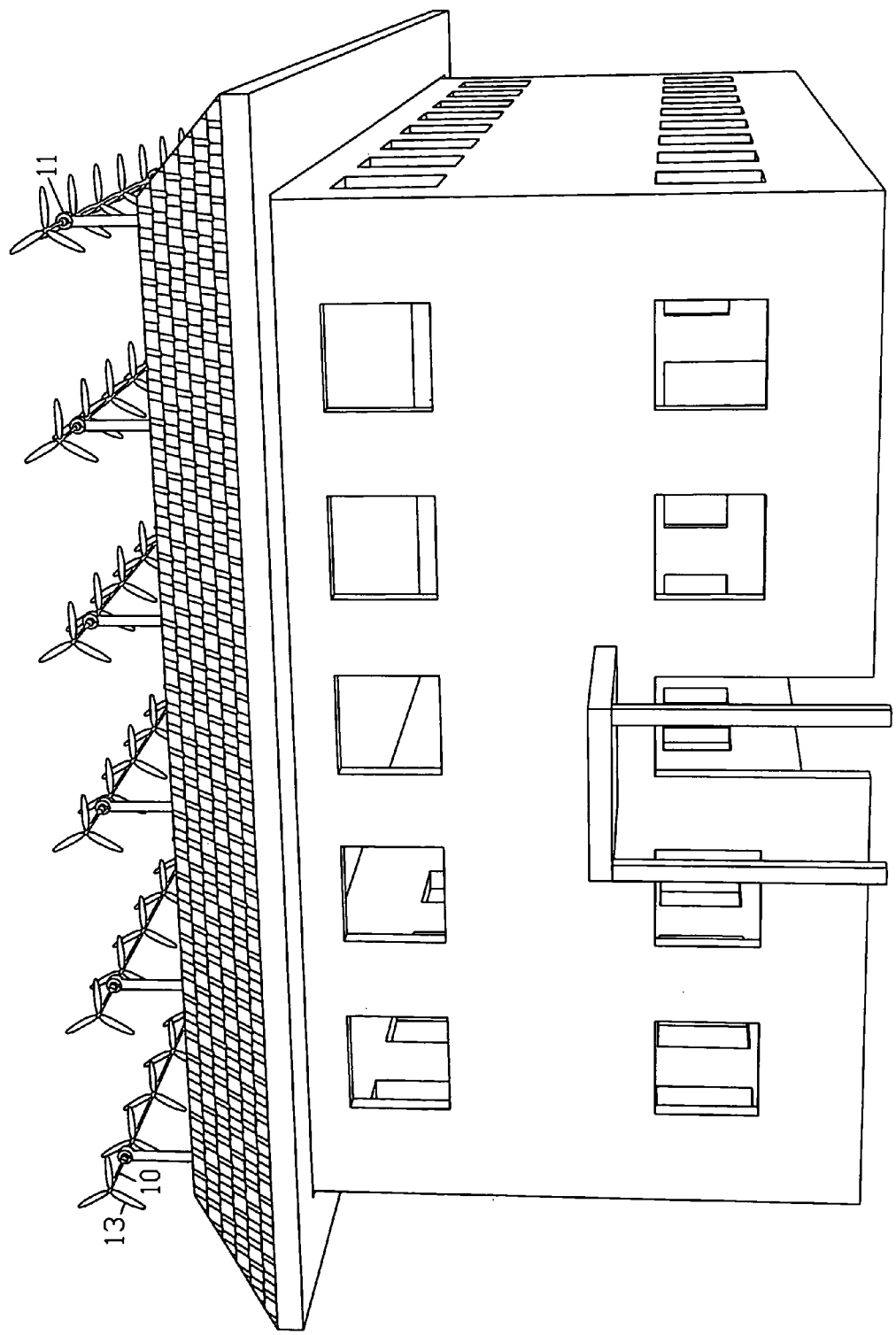
FIG. 25 view from ground: parallel turbines mounted at same height over mansard roof.
Figure 26:
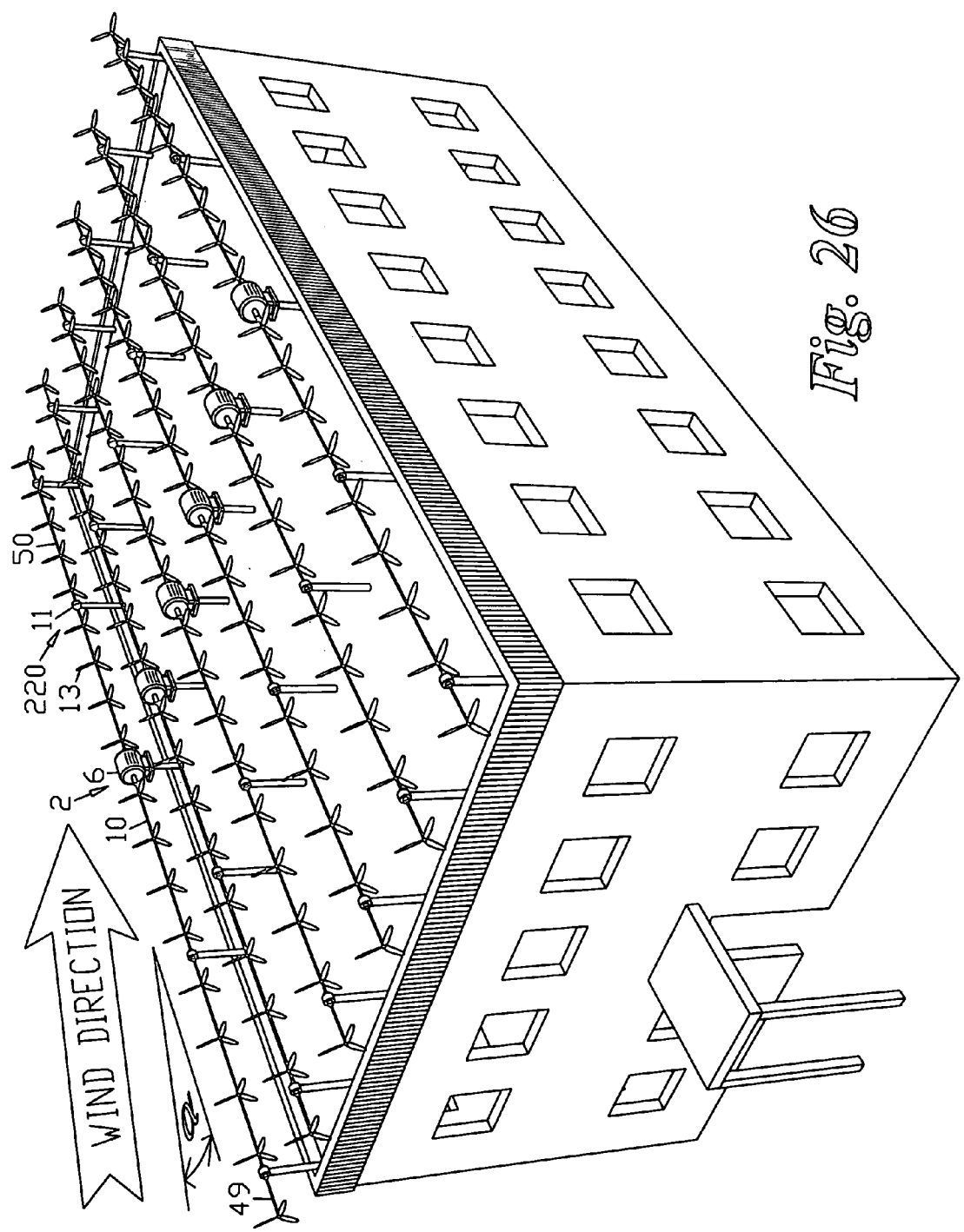
FIG. 26 aerial view: parallel turbines mounted at same height over commercial flat roof, building oriented at horizontal offset angle α to the wind direction.

Multiple Stationary Co-Axial, Multi-Rotor Turbines, Mounted at the Same Height Above a Flat Roof; FIGS. 25 and 26

Similar to the nineteenth embodiment, except that the turbines are located at the same height. Increasing this height will increase energy capture, at the cost of a taller support structure and increased visual impact. Lowering this height will tend to hide the turbines from view as seen from the ground. Sloping mansard roofs surrounding the perimeter and serving as concentrators and diffusers may be included (FIG. 25) or omitted (FIG. 26). The driveshafts may or may not be placed under tension and may be provided with an adjustable tension means (not illustrated).

21. Twenty First Embodiment

Figure 27:
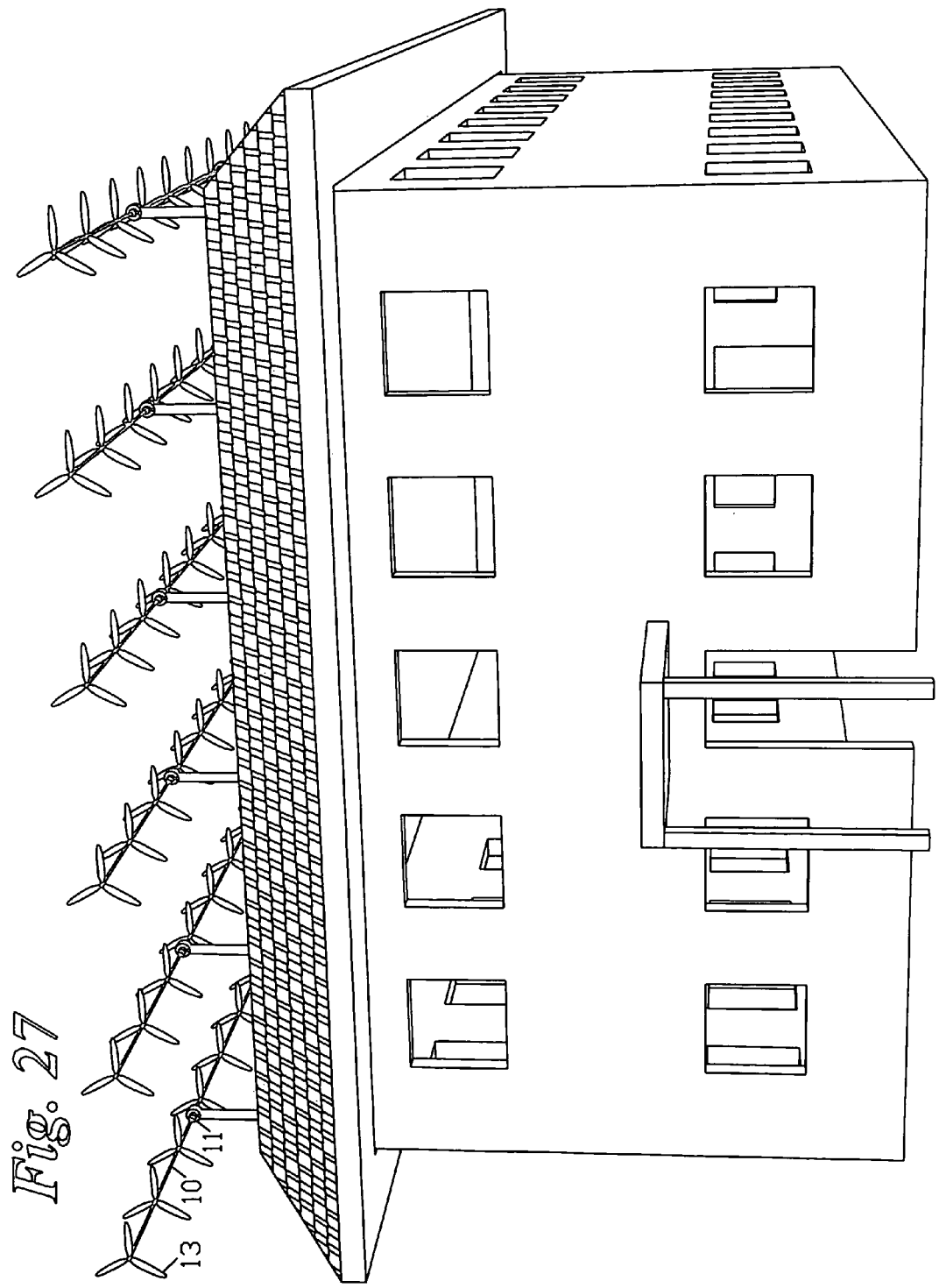
FIG. 27 view from ground: turbines mounted over flat roof, projecting out past mansard roof.
Figure 28:
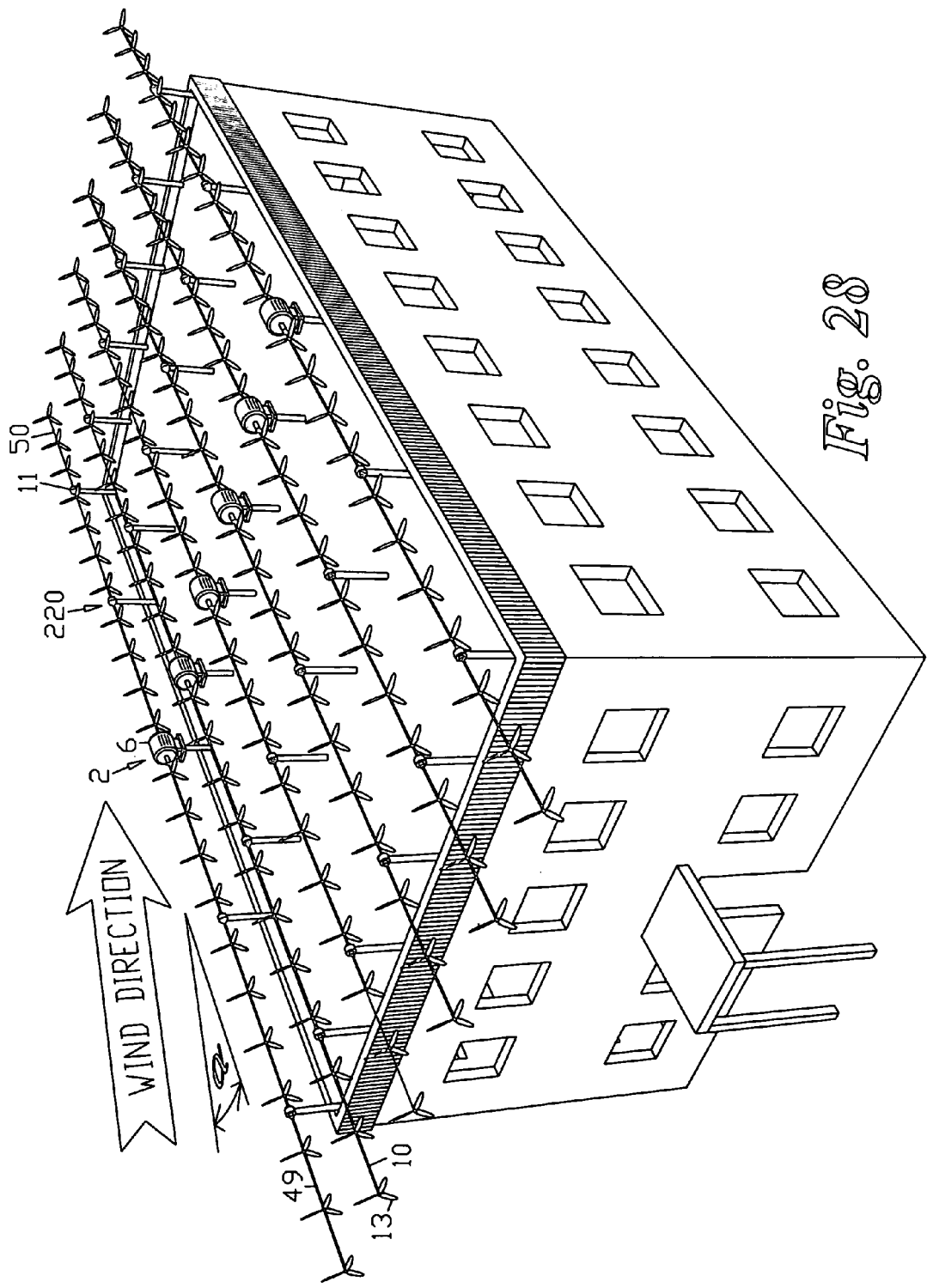
FIG. 28 aerial view: parallel turbines mounted at same height over commercial flat roof, at horizontal offset angle α to the wind direction, project past periphery of building.

Stationary Co-Axial, Multi-Rotor Turbines, Mounted Above a Roof, Projecting in a Cantilevered Manner Past the Periphery of the Roof; FIGS. 27 and 28

Turbines of any of the previous roof-mounted embodiments may extend in a cantilevered manner past the perimeter of the roofline, placing more rotors into the wind stream, thereby intercepting more wind and capturing more energy. FIG. 27 shows such an arrangement utilizing sloping mansard roofs as concentrators and diffusers to further increase energy capture. FIG. 28 illustrates this concept with the mansard roofs omitted.

22. Twenty-Second Embodiment

Figure 30:
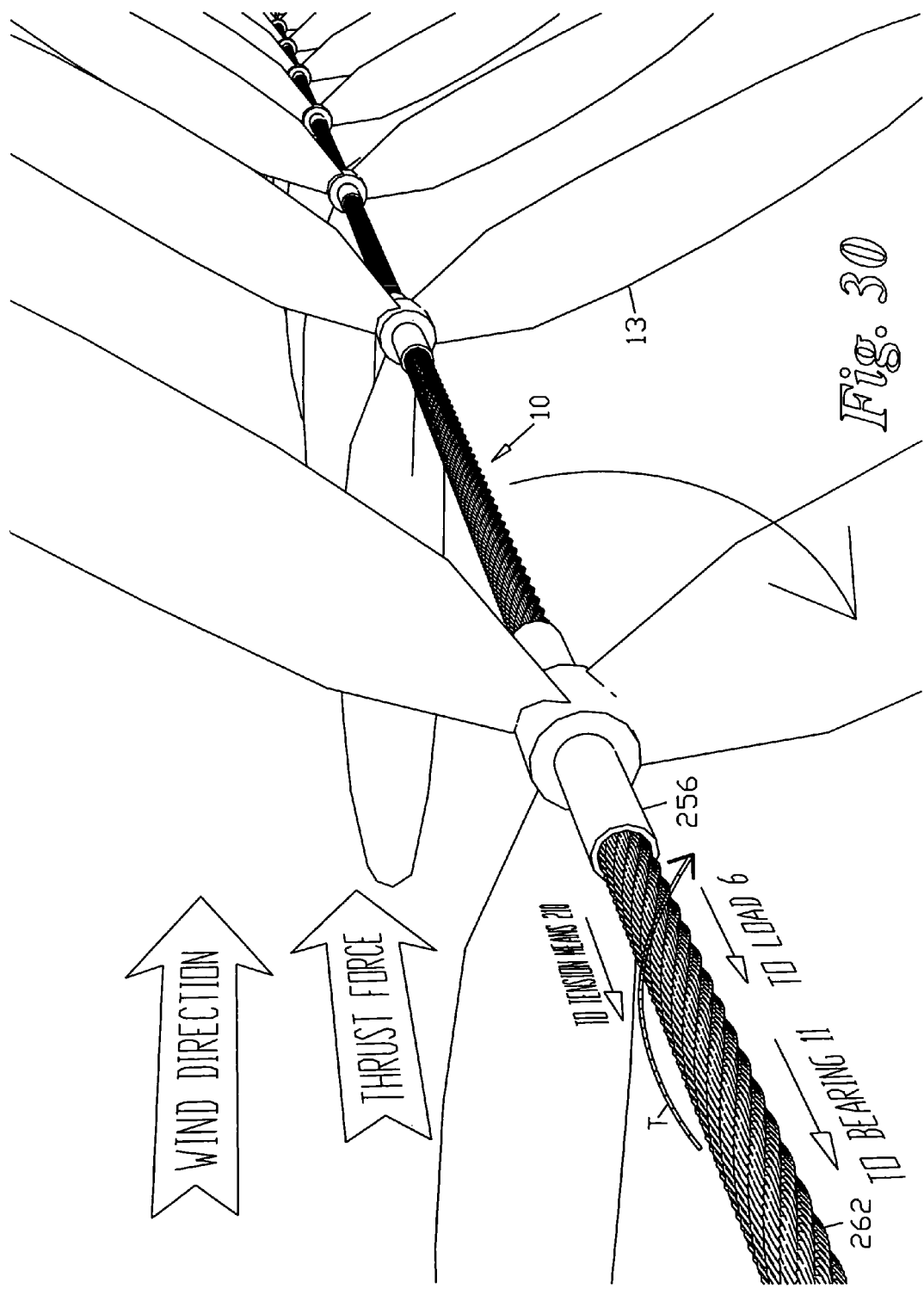
FIG. 30 rotating driveshaft constructed from a steel cable, or wire rope.

Driveshaft Constructed from Oriented Strands; FIGS. 29, 30

Driveshafts made from fibers or strands preferentially oriented to best provide longitudinal stiffness, to bear and transmit the forces of rotor thrust and torque, and of driveshaft tension if the configuration places the driveshaft under tension, have advantages of lower weight and higher performance, compared to driveshafts constructed of homogeneous materials. In our experience to date, filament-wound composite shafts provide optimal high strength, light weight, straightness and stiffness, as well as a consistent bending response when rotated. Longitudinally oriented fibers 260 serve best to impart longitudinal stiffness, while helically wrapped fibers 262, aligned with the aggregate cumulative rotor force T at any location along the driveshaft, serve best to transmit torque from the rotors 13 to the load 6. Such a driveshaft may be supported over a span by its own stiffness, by being placed in tension, or a combination of the two.

For a driveshaft in tension, a structure as simple as a common stranded, twisted steel cable, also called wire rope, or a rope of any sufficiently strong fibrous material (FIG. 30) may suffice. The lay of the strands may be right or lang. Fortunately, wind turbine rotors traditionally rotate to the right (clockwise) when viewed from upwind, and steel cable, wire rope, and other types of rope, is most commonly twisted in a right hand direction, meaning that a common cable has its strands naturally aligned in the proper direction to serve as the driveshaft of a co-axial, multi-rotor wind turbine, transmitting the torque of the rotors to the generator under tension, provided that the generator is located at the upwind end of the driveshaft. A sleeve 256 surrounding the cable may be used to mount each rotor 13.

23. Twenty-third Embodiment

Figure 31:
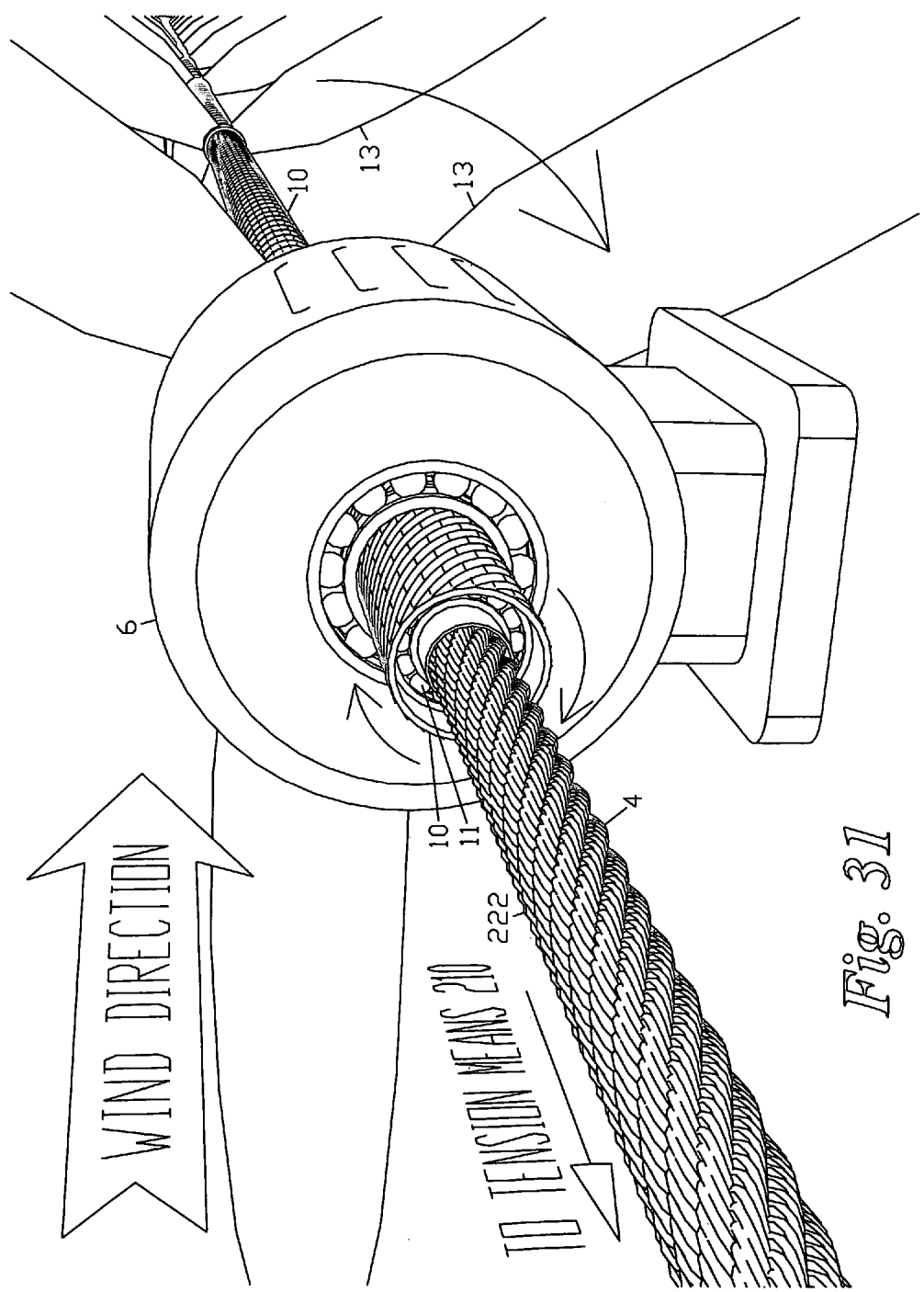
FIG. 31 rotating hollow outer driveshaft rides on bearings over nonrotating inner core constructed of cable or wire rope under tension, both pass through generator.

Driveshaft with Non-Rotating Inner Core; FIG. 31

Especially useful for suspended catenary configurations, a non-rotating inner core 222 under tension may serve as a supporting mandrel over which an outer tubular driveshaft freely rotates on bearings. A stranded steel cable or wire rope, or composite cable or tube, are examples of suitable core materials and construction. Such a configuration allows the turbine to span a long distance under tension without the need for thrust bearings. Additionally, since only the mass of the hollow outer shell rotates, while the core, which may be heavier, does not, less rotating mass means that critical speeds are raised, making the turbine more stable so that it runs more smoothly. For a direct drive generator (illustrated) the inner core may pass directly through the center of the generator, mounted within bearings. The resulting configuration consists in a general sense of 3 layers separated by bearings: The non-rotating inner core under tension, surrounded by bearings, which are surrounded by the rotating outer shell, that transmits the torque of the rotors to the generator, which outer shell, at the generator, is in turn mounted within a larger set of bearings, surrounded by the stationary frame and stator of the generator, which could be said to form the third or outer layer.

24. Twenty-Fourth Embodiment

Figure 32:
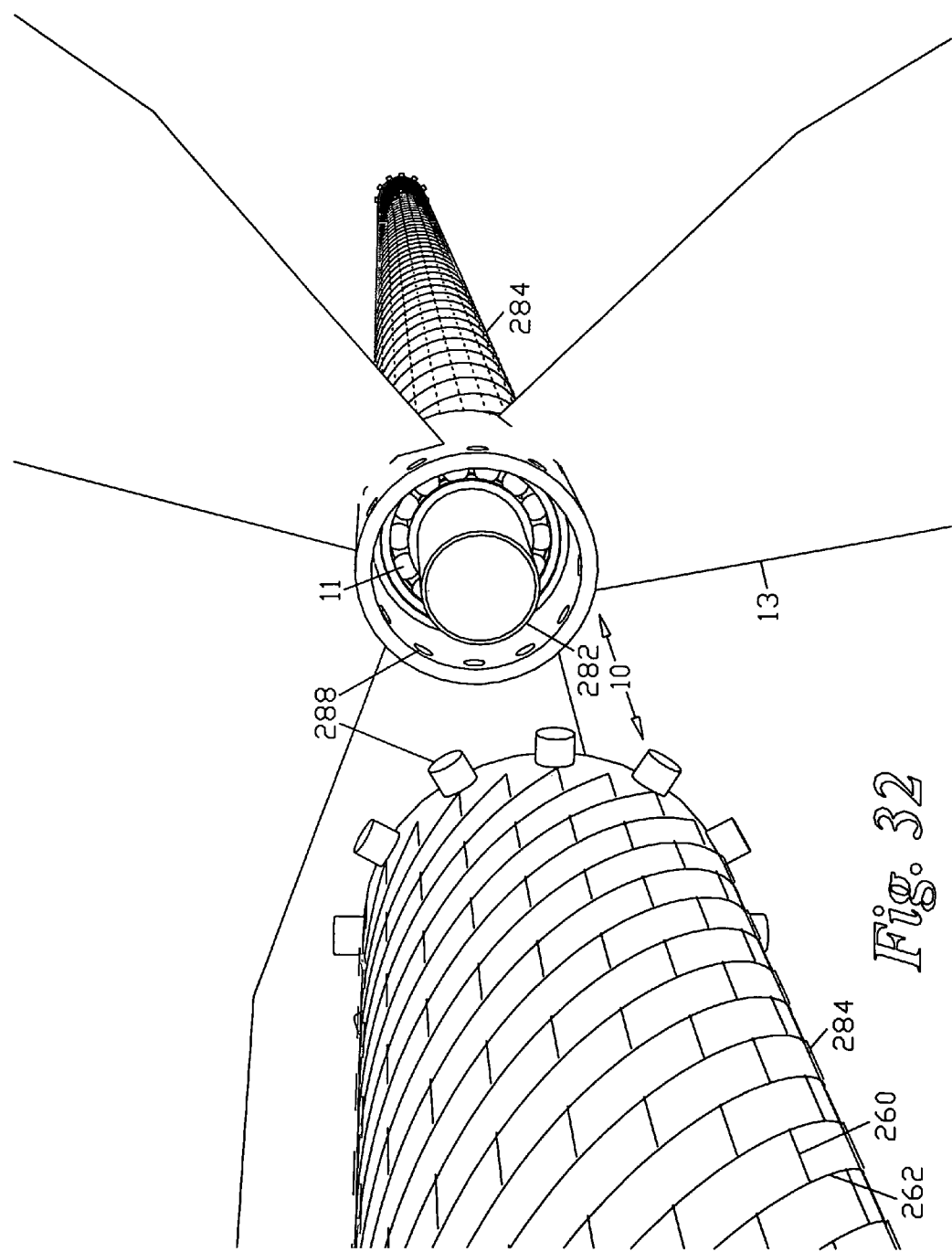
FIG. 32. two sections of hollow outer driveshaft showing attachment means and bearing.

Driveshaft in Modular Sections; FIG. 32

A driveshaft for a co-axial, multi-rotor turbine may be manufactured in modular sections that can be attached together in the field. The driveshaft sections may be provided with integral attachment means 288 for ease of assembly (illustrated). For a turbine of the twenty-third embodiment, the non-rotating core such as a steel cable may be continuous, and shipped on a spool, while the outer shell, may be assembled in sections over the core. Each section of the outer shell may optionally be provided with integral bearings, and sleeves or other means 282 for the bearings to fitably engage the inner core. It may be sufficient to provide a single bearing at one end of each section. Each driveshaft section may also be pre-provided with an integral or attached rotor or hub.

25. Twenty-fifth Embodiment

Figure 33:
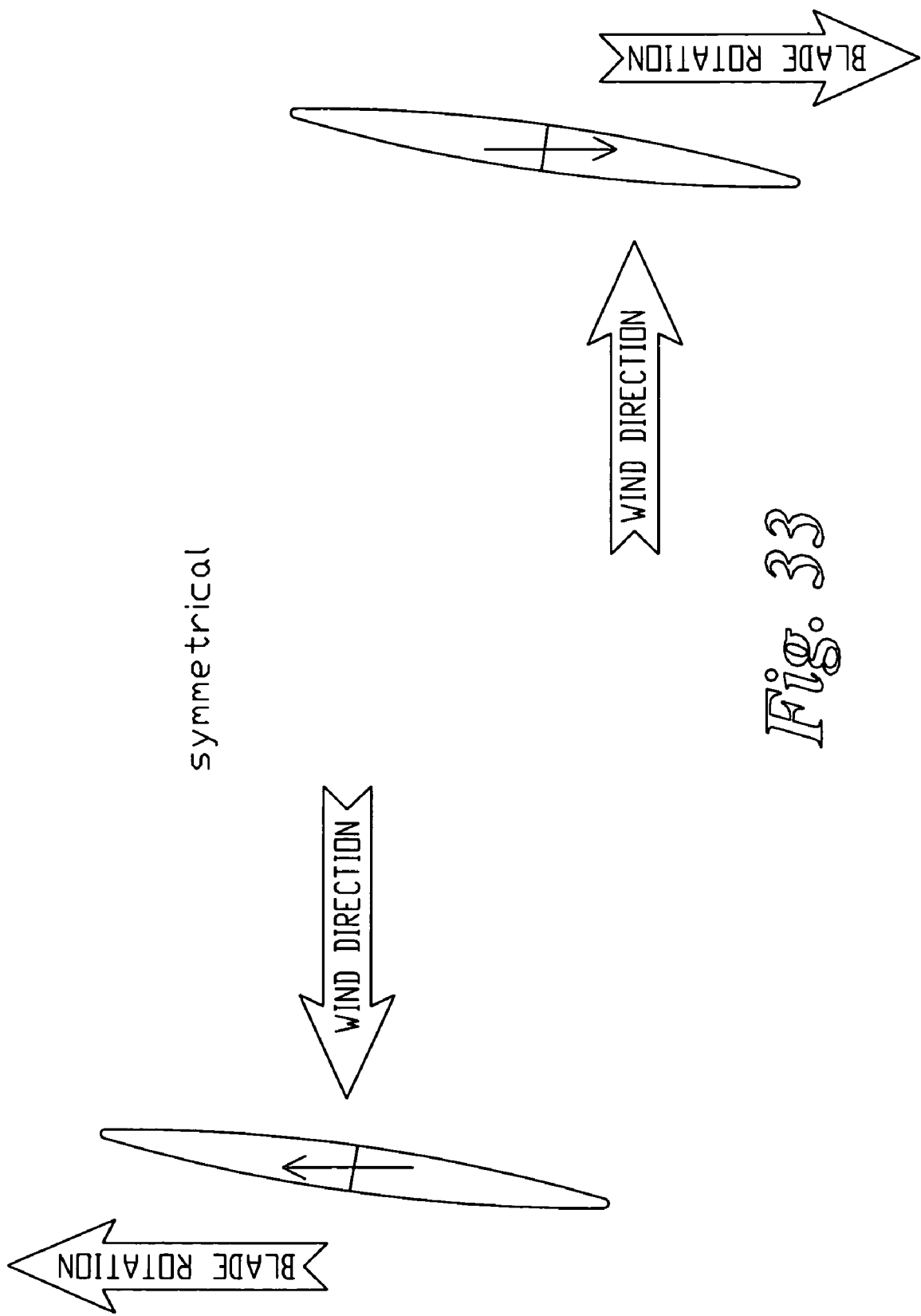
FIG. 33. sectional view of bi-directional airfoil, symmetrical about 2 axes.
Figure 34:
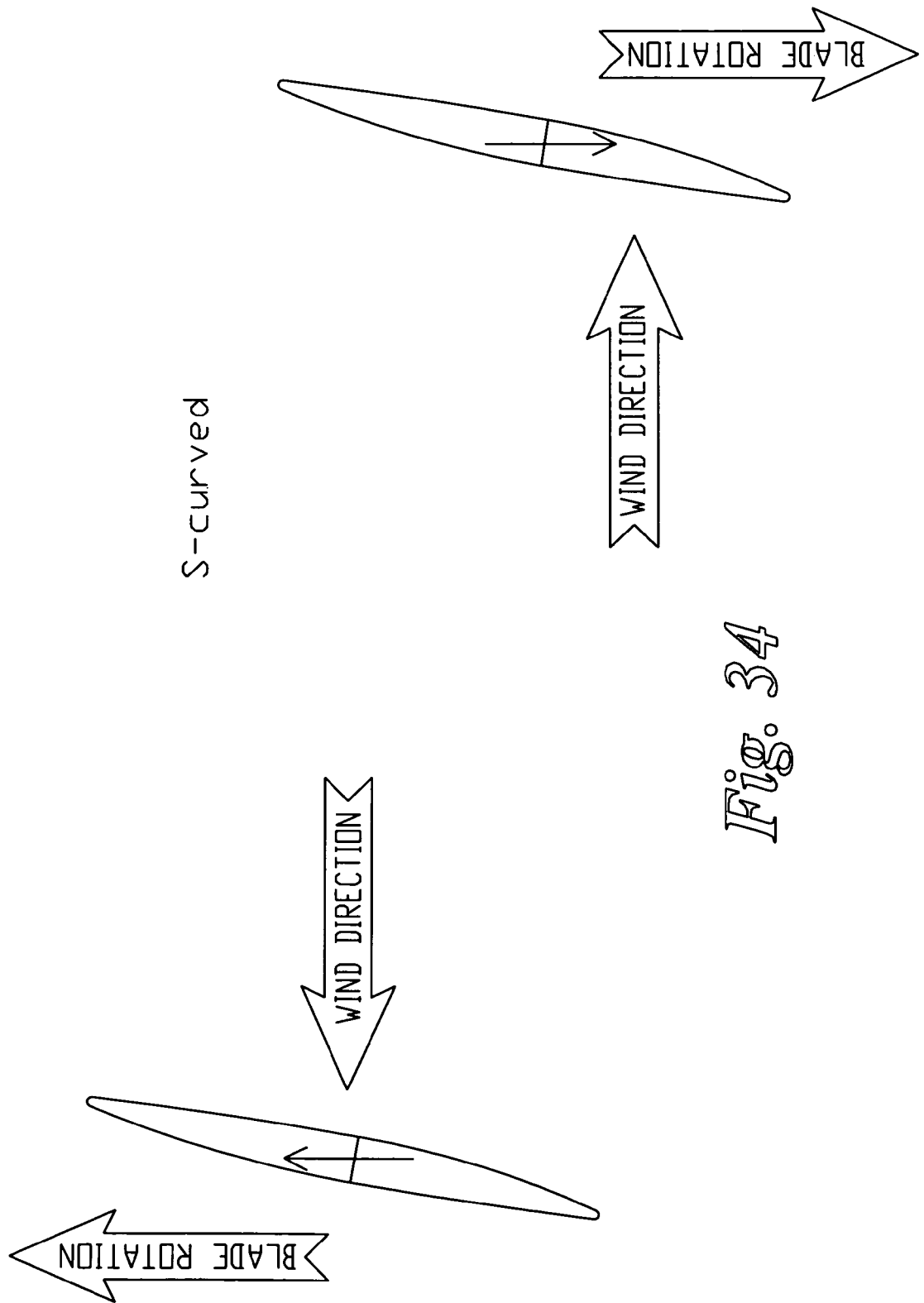
FIG. 34. sectional view of bi-directional S-shaped airfoil.

Reversible Airfoils; FIGS. 33 and 34

The stationary co-axial, multi-rotor turbines disclosed above in this document sacrifice the ability to aim, in exchange for the ability to support a large number of rotors and combine their power to drive a single generator. While the ideal site for such a non-aiming turbine has a predominantly unidirectional wind resource, cost savings for the stationary co-axial multi-rotor design are so overwhelming, and the range of reasonably effective directional aim is so broad, that averaged over time it is possible for such a stationary turbine to provide power at an economical advantage to other turbine types, even in an area with a bi-directional or multi-directional wind resource. FIG. 33 shows a symmetrical airfoil that, when applied to the rotors of a wind turbine, will rotate in one direction when blown by a wind from one direction, and will also rotate in the opposite direction when the wind reverses direction. FIG. 34 shows a slightly S-shaped airfoil that accomplishes the same result. Many electrical generators work equally well in either direction of rotation. Therefore such airfoils may be applied to any of the above disclosed embodiments to advantageously facilitate economical energy capture over time at sites with a bi-directional or omni-directional wind resource.

Alternatively, hinged blades, known in the previous art of fans, blowers, and impellers may be utilized to maintain a constant direction of rotation regardless of the wind direction.

26. Twenty-Sixth Embodiment

Figure 35:
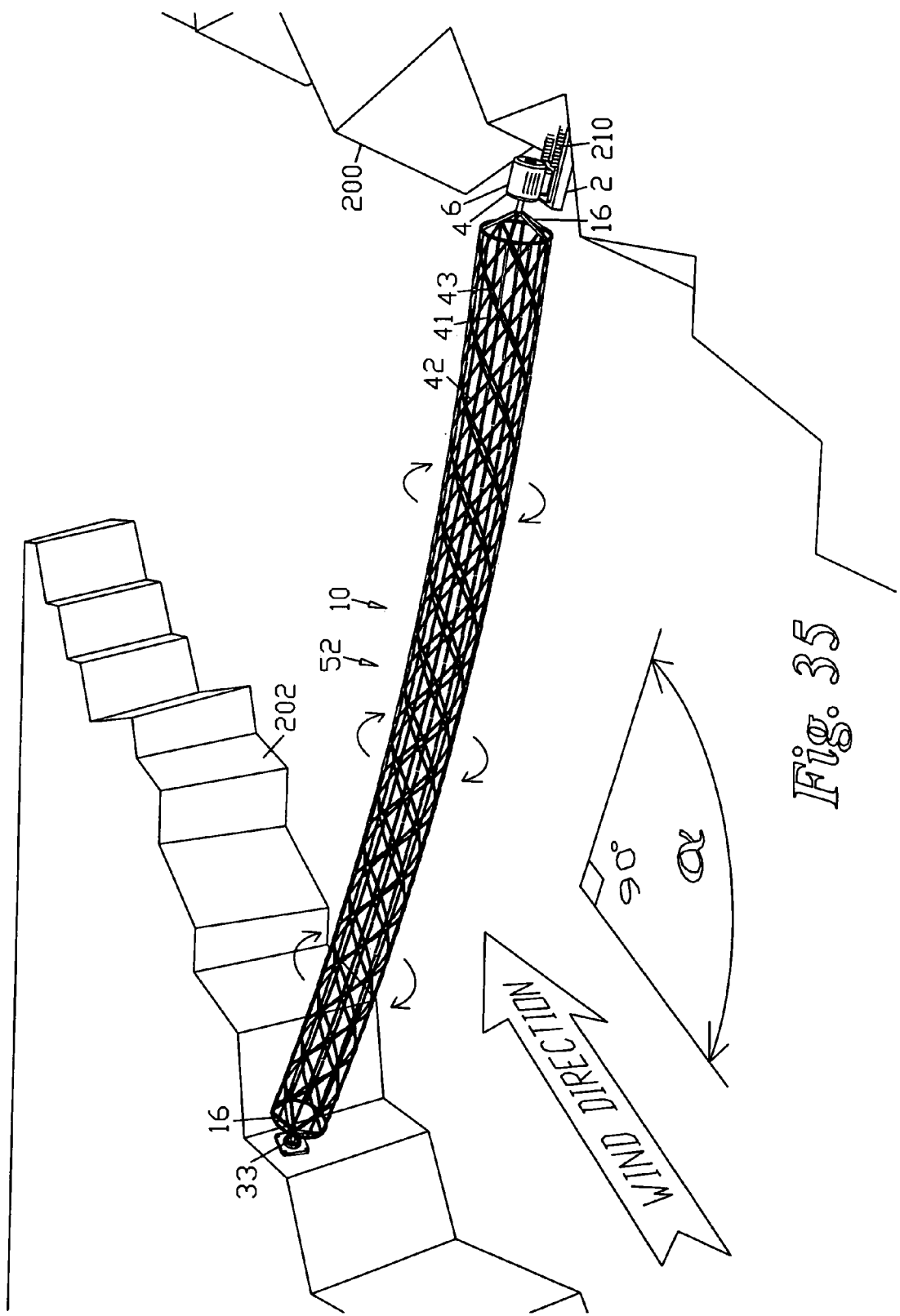
FIG. 35. aerial view of rotating cylindrical cross-axis turbine woven of interconnected longitudinal and helical blade elements, suspended across canyon perpendicular to wind direction.

Geometrical Mesh of Cross-Axis Blades Woven to Comprise a Cylindrical Fluid-Reactive Rotor that Acts as its Own Driveshaft; FIGS. 35 and 46

A cylindrical tube 52 comprised of a geometric mesh of interconnected struts 54, shaped as airfoils oriented to function as cross-axis blades, spans a canyon as in the first embodiment, except that offset angle α (alpha) of the driveshaft to the wind direction is 90 degrees.

Claims 36-43 of U.S. Pat. No. 6,616,402 issued to this inventor reveal a new construction geometry for a cross-axis or Darrieus type turbine rotor, which is a cylindrical tube 52 comprised of a geometric pattern of interconnected struts 54, each strut 54 having an airfoil cross section oriented to act as a cross-axis blade when revolved about the central axis of the cylinder, so that this tube is caused to rotate by a cross-axis wind, wherein this cylindrical tube serves as both an aerodynamically-responsive rotor, and as a driveshaft 10 by virtue of its aggregate elongate cylindrical shape, and the torque-transmitting ability of its continuous, helically-wound constituent elements 42, 43 as illustrated in FIGS. 55-64 and 105 of that patent, and described in the $40^{th}$-$48^{th}$, $80^{th}$ and $81^{st}$ embodiments of that patent. Such an aerodynamically responsive tubular lattice 52 driveshaft 10 may be woven from continuous helically-wound elongate elements 42, 43 having an airfoil cross section. Such helically-wound elements are ideally oriented to transmit torque along their length, serving the purpose of the helically wrapped fibers 262 described in the twenty-second embodiment above: Driveshaft Constructed from Oriented Strands; illustrated in FIGS. 29, 30.

The interconnectedness of the aerodynamic struts gives structural integrity to the tubular shape of the rotor, thereby solving one of the main problems of the Darrieus or cross-axis design—how to maintain the longitudinal shape of the blades against centrifugal force. A spinning tube 52 comprised of a mesh of cross-axis blades is the result. Centrifugal force helps it to hold its form, which is a desirable characteristic for a wind turbine rotor. Pultrusion is one good technique to produce such a continuous blade. Constructing the tube of many thinner aerodynamic struts, as opposed to only a few thicker struts, uses less material and improves the overall surface to mass ratio, an important principle in all of our co-axial, multi-rotor designs. Other geometric configurations for the mesh than simply winding continuous longitudinal struts helically, are possible, and the inclusion of longitudinal cross-axis blades 41 may be included to provide aerodynamic performance and to bear tensile loads. Following the nomenclature of U.S. Pat. No. 6,616,402, a continuous longitudinal blade element of cylindrical tube 52 is numbered 41, blades helically wrapped in the direction of rotation are numbered 42, and blades helically wrapped opposite the direction of rotation are numbered 43. Interconnection means 58 connects elongate blade elements 41, 42, 43 at each intersection thereof, forming a lattice comprising triangles of struts 54. Regardless of the exact construction, such an elongate, cylindrical, tubular, cross-axis rotor/driveshaft construction 52 is ideal for being applied to a generally horizontal, non-aiming, suspended catenary turbine placed across the wind. If applied to the first embodiment, for example, the turbine would span perpendicularly across the canyon, and angle α (alpha) would be 90 degrees.

As discussed in the prior art section, Inventor David Bailey has placed elongate cross-axis rotors horizontally, suspended from each end.

The improvement that the present cylindrical geometrical mesh offers, over such turbines as revealed by David Bailey is the elimination of the requirement for the blades to maintain their longitudinal shape against centrifugal force by virtue of their own stiffness, the elimination of the need for armatures to support the blades, and the elimination of the requirement for a separate, central driveshaft.

A single armature 16 at each end of the elongate cylindrical rotor 52 is sufficient to suspend the entire turbine, with no intermediate armatures nor central driveshaft needed to bear the tensile loading, transmit the torque, and maintain the cylindrical shape against centrifugal force.

Alternatively, horizontal axis rotors may be used as armatures attached to the vertical axis blades, located at spaced intervals within the tubular cylinder as also revealed in that previous patent.

Twenty-Seventh Embodiment

Figure 36:
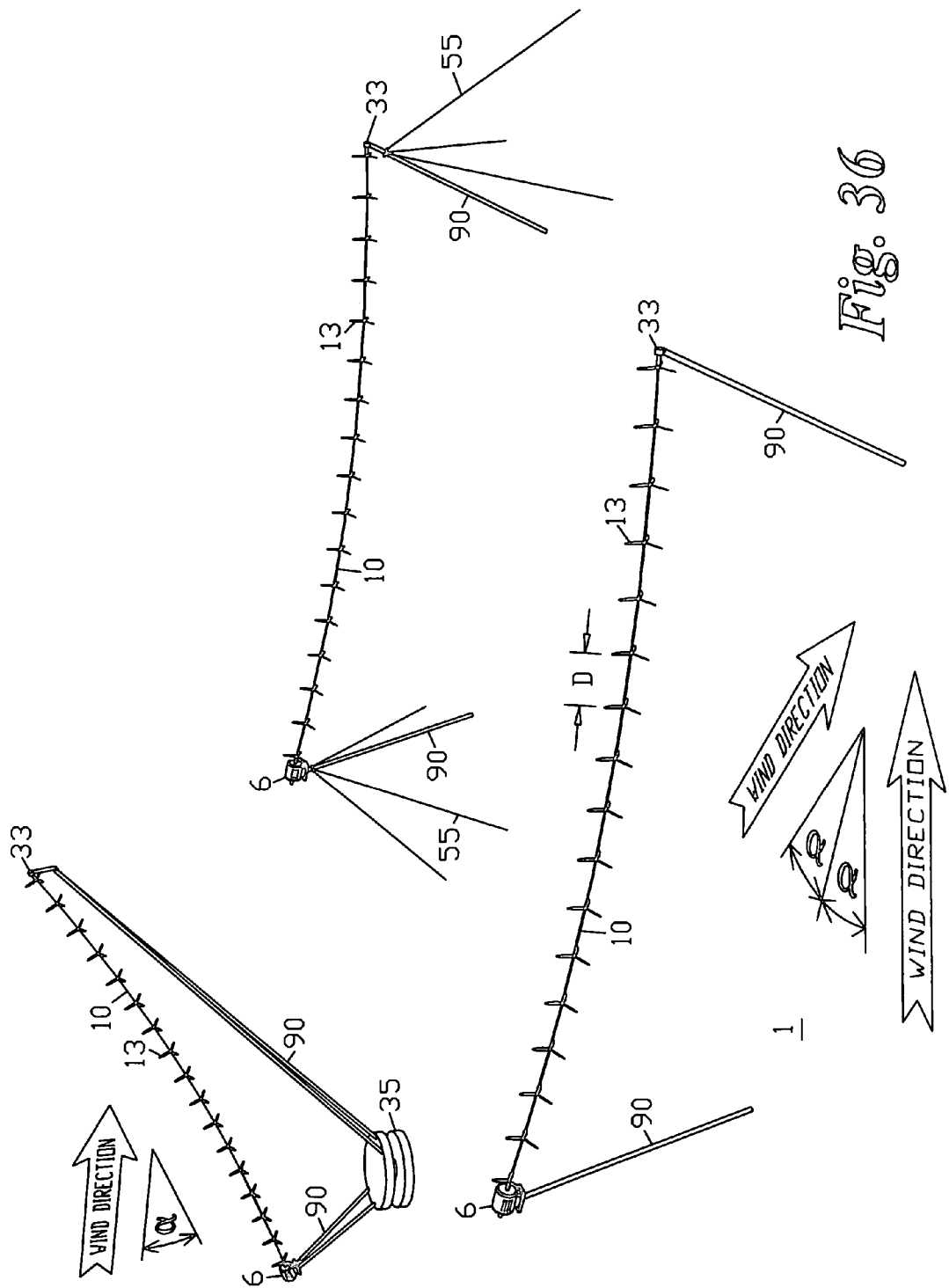
FIG. 36. coaxial multirotor turbines suspended between outward leaning supports

Co-Axial Multi-Rotor Wind Turbine with Driveshaft Under Tension by Weight of Supporting Towers Leaning Outward; FIG. 36

One aspect of placing a driveshaft under tension between two towers is the extra horizontal loading that must be borne by the towers, because the tension on the driveshaft pulls inward on the towers, tending to tip the towers toward each other. This is in addition to the wind thrust force that a turbine tower must already bear. Vertical freestanding towers must therefore be more robust than they would otherwise need to be, and a guyed tower requires that the anchors for the guy wires that transmit the driveshaft tension to the earth be extra robust, to withstand the extra tension. A solution to this is to lean the towers outward from the center. The weight of the towers then tends to want to tip the towers further outward, and this outward force can then be used to apply tension to the driveshaft. The result is that for a freestanding tower, the extra side loading moment on the tower is cancelled so that it can be engineered to a lighter standard. For a guyed tower, the extra strength rating required of the anchors for the guy wires that transfer the driveshaft tension to the ground is lessened or eliminated. The technique is not limited to installations with only 2 towers, as additional towers or other intermediate supports may be added between the two end towers that lean outward. The intermediate towers may or may not also lean outward from the center. The entire assembly may be tilted up into position from the side, rather than endwise, so that the basic geometry of the turbine, towers, and end guy wires is consistent and unchanging from laying on the ground, all the way until the assembly is tilted up into position, making for an easy way to erect the system.

This principle of leaning the towers outward to place the driveshaft under tension may be employed in many of the above disclosed versions that employ towers. This includes versions having only a single tower as well, such as a modification to the 12$^{th}$ Embodiment in FIG. 16 in which the taller tower is configured to lean away from the load 6 or generator, with the weight of that leaning tower exerting tension on the driveshaft through suspension bearing means 33. An example is illustrated in FIG. 36. Such a configuration need not necessarily be stationary, but could be mounted on a yaw pivot to provide directional freedom.

Twenty-Seventh Embodiment

Figure 37:
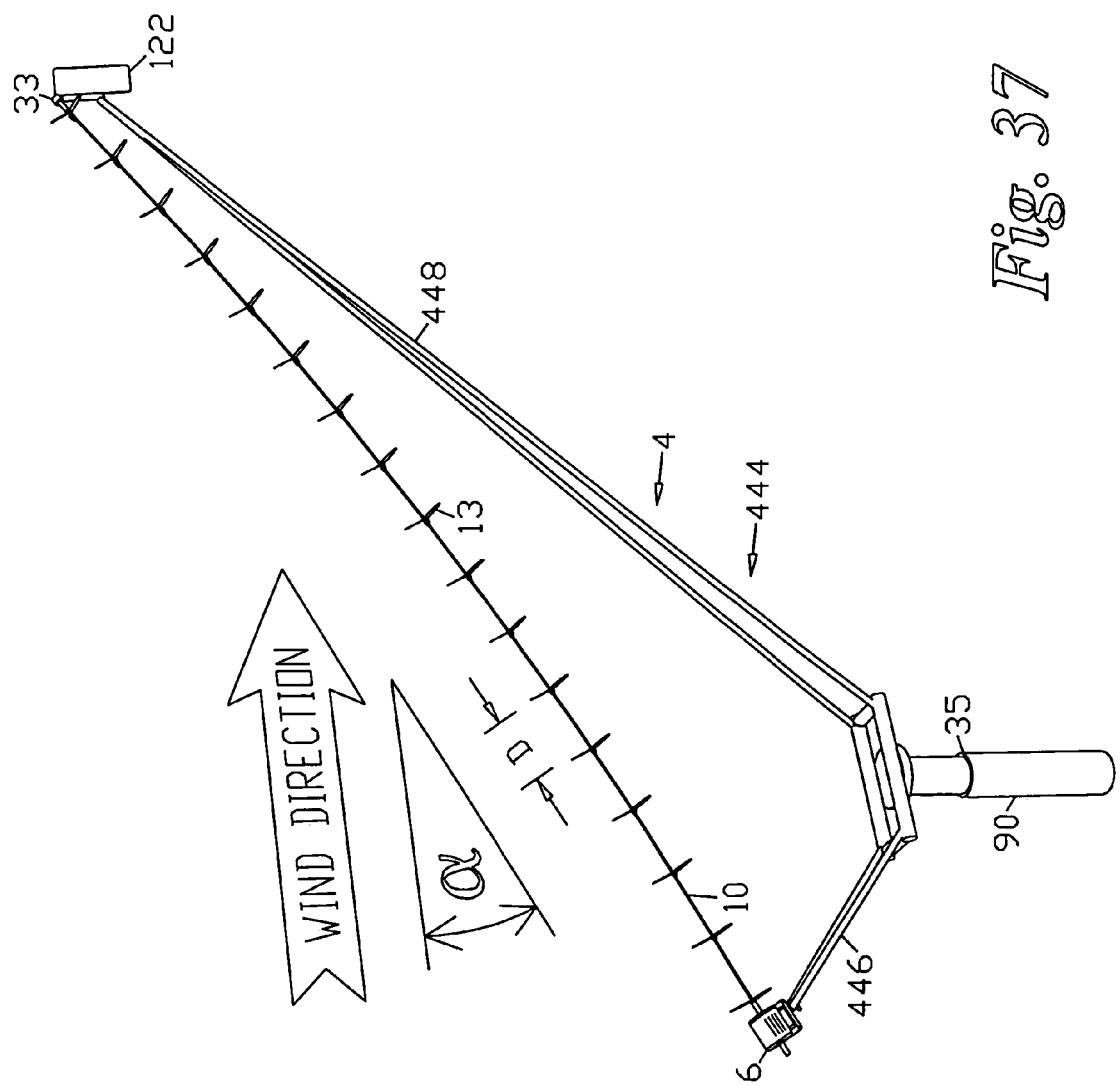
FIG. 37. rotatable frame suspends turbine in tension from outward leaning supports.
Figure 38:
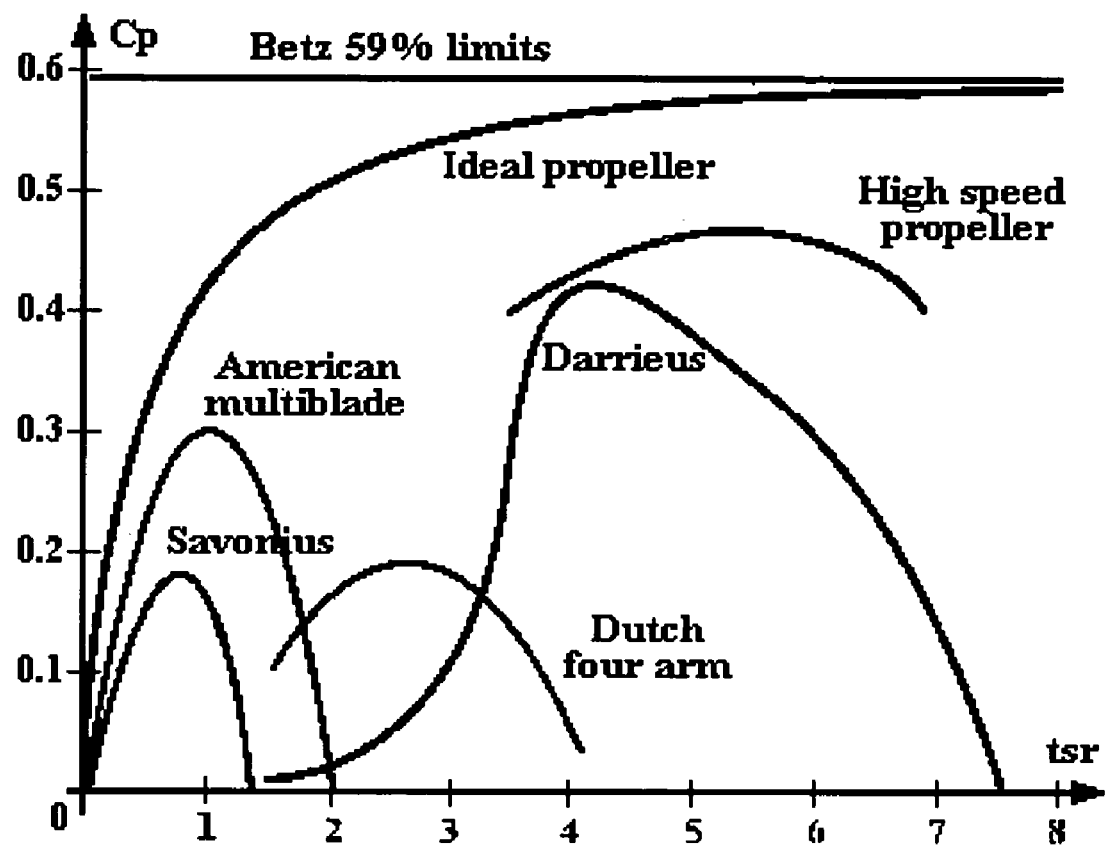
FIG. 38. popular chart compares efficiency vs. tip speed ratio for various turbine types.
Figure 39:
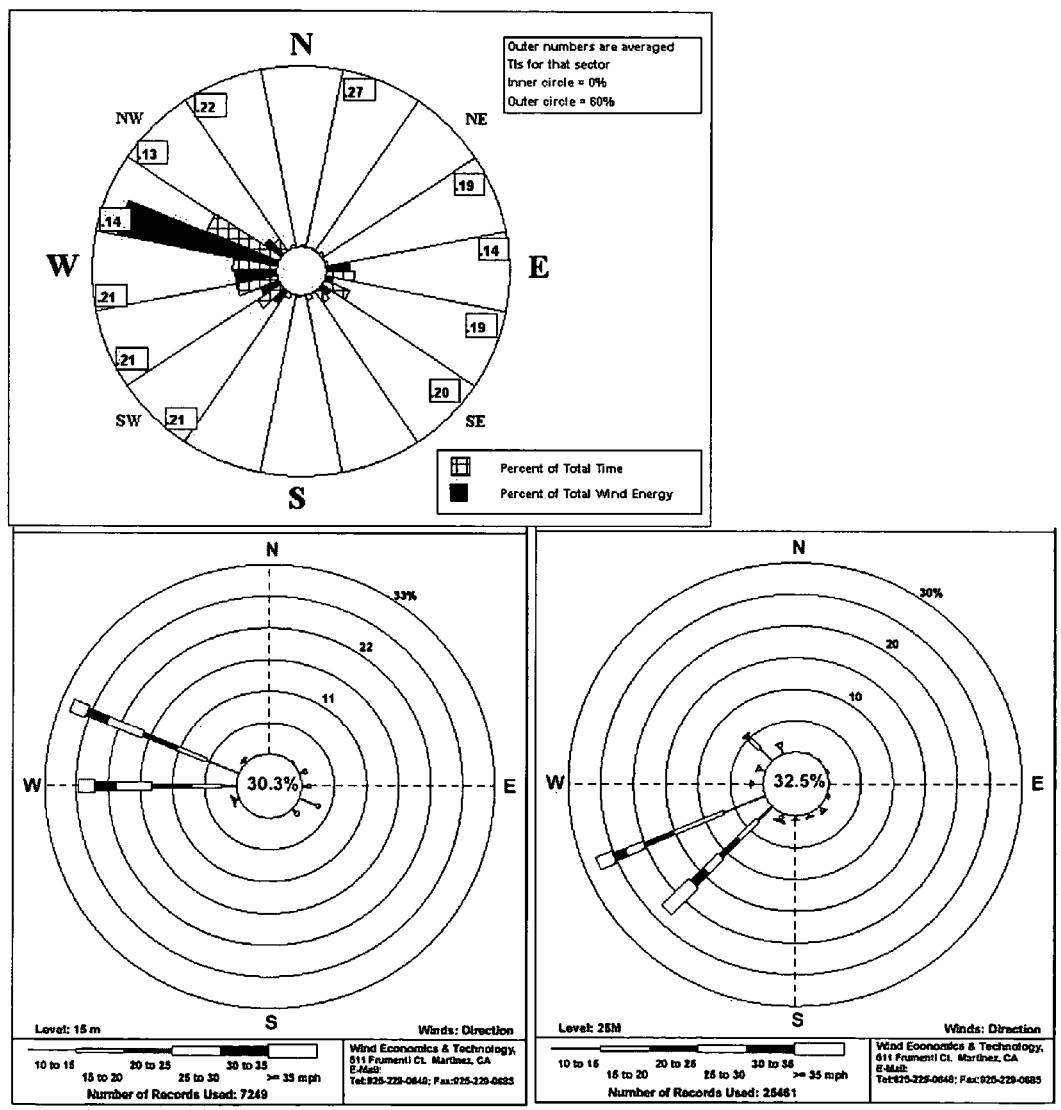
FIG. 39. reprinted wind rose graphs show unidirectional wind resource at windfarms.

Horizontally Rotatable Frame Supporting Driveshaft Under Tension; FIG. 37

A co-axial multi-rotor turbine under tension spans the distance between ends of A generally Y-shaped frame 444, mounted on a tower and provided with a horizontally rotatable yaw bearing 35 so the co-axial, multi-rotor turbine with its driveshaft under tension can be aimed to harness wind from any direction. An upwind arm 446 supports generator 6, and a downwind arm 448 supports suspension bearing 33. The weight of the arms of the frame pushing downward and therefore wanting to separate, will tend to place the driveshaft under tension, with the arms in compression, in a similar manner to the previous embodiment. This forms a triangle and is an optimal use of materials. The stiffness of the frame itself may be used to place additional tension on the driveshaft, and adjustable tension means such as guy wires may be included in the frame opposite the driveshaft, to increase driveshaft tension to a desired level. For aiming, the turbine may be provided with a tail 122, or surfaces serving the function of a tail, or may be located predominantly downwind of the yaw pivot point, or both. Alternatively, an active or manual yaw control mechanism may be utilized. This embodiment is similar to the turbines of U.S. Pat. No. 6,692,230 issued to this inventor. It may also be provided with an overspeed mechanism that tilts back the driveshaft into a horizontal position as described in that patent, or a mechanism that turns the entire turbine sideways to the wind, as described in U.S. Pat. No. 7,008,172 issued to this inventor. This general design with such a Y-frame, or other such framework with similar function, may also be used as a stationary, or non-aiming turbine. One arm of the Y-frame many be minimal in length, or even entirely omitted, with the weight of the remaining arm serving to provide driveshaft tension.

I claim:

1. A method of harnessing power, from a fluid flow having a direction, comprising:
    mounting a series of substantially horizontal-axis type rotors to a continuous, elongate driveshaft, substantially having an axis;
    supporting each said rotor by said driveshaft, proximate a center of each said rotor;
    providing each said rotor with a substantially coplanar set of elongate blades;

orienting said blades, wherein said blades substantially radiate outward, lengthwise, from said center of said rotor;

providing said blades with lifting foils, whereby said rotors may operate on the principle of lift;

configuring each said rotor, whereby each said set of blades is configured to rotate substantially within a plane of rotation;

spacing said rotors at a distance D, along said axis, whereby said planes of rotation are separated;

aiming said continuous elongate driveshaft at angle $\alpha$ (alpha) from said direction of said fluid flow;

spinning said rotors, whereby each said rotor sweeps a circular area from which energy is extracted from said current flow;

whereby;

the combination of angle $\alpha$ (alpha) and distance D allows fresh fluid flow, substantially undisturbed by an upstream rotor, to reach each said circular swept area, thereby exposing each said rotor to a substantially undisturbed portion of said fluid flow, whereby all said rotors are powered by said fluid flow, rotating said drive shaft;

whereby all said rotors contribute to a rotation of said driveshaft about its own said axis, whereby useful power may be drawn from said rotating driveshaft;

suspending said driveshaft between two supports selected from the set of: landforms, natural structures, and man-made structures;

wherein said aiming step comprises suspending said driveshaft across a canyon.

2. The method of claim 1, further comprising: drawing power from said rotating driveshaft.

3. The method of claim 2, wherein said fluid flow is wind.

4. The method of claim 1, further comprising coupling said rotating driveshaft to an electrical generator, whereby useful electricity may be generated.

5. The method of claim 4, further comprising: generating electricity by rotating said electrical generator, using said rotating driveshaft.

6. The method of claim 5, further comprising: connecting said generator to a grid, whereby power is drawn from said generator by said grid.

7. The method of claim 6, wherein said fluid flow is wind.

8. The method of claim 5, further comprising: combining a small diameter, a high TSR, and an aggregate swept area, of said rotors 13, to cause sufficiently high-speed rotation of said driveshaft 10, at sufficient torque, to directly drive a given electric generator 6 without gearing.

9. The method of claim 5, wherein said fluid flow is wind.

10. The method of claim 1, further comprising, fabricating said continuous elongate driveshaft using a composite material, comprising fibers selected from the set of helically-wrapped fibers 262 and longitudinally-oriented fibers 260.

11. The method of claim 10 further comprising: fabricating said continuous elongate driveshaft by the technique of filament winding.

12. The method of claim 10 further comprising: fabricating said continuous elongate driveshaft by the technique of pultrusion.

13. The method of claim 1, further comprising: channeling said flow, by selecting said supports, whereby at least one said support serves to channel said fluid flow through said rotors.

14. The method of claim 13, wherein said fluid flow is wind.

15. The method of claim 1, further comprising: channeling said flow, by selecting a relative placement of said driveshaft and at least one obstacle to said flow, whereby said obstacle tends to channel said flow through said rotors.

16. The method of claim 1, further comprising: providing said foils with sufficient symmetry to operate in reverse, whereby a prevailing flow from a second direction causes said rotors to operate in reverse.

17. The method of claim 1, further comprising: locating at least one additional, similar driveshaft with rotors, substantially parallel to the first said driveshaft with rotors, whereby said rotors form a virtual surface of rotors.

18. The method of claim 17, whereby said virtual surface is at angle $\alpha$ (alpha) to said flow direction.

19. The method of claim 18, wherein said locating step comprises placing one said driveshaft aside another, whereby said virtual surface of rotors comprises a slope.

20. The method of claim 19, wherein said fluid flow is wind.

21. The method of claim 17, further comprising: supporting said driveshafts by a common support.

22. The method of claim 21, further comprising: providing that said common support serves to channel said flow through said virtual surface.

23. The method of claim 21, further comprising: providing that said rotors are staggered between adjacent of said driveshafts to avoid contact.

24. The method of claim 17, further comprising: supporting said driveshafts by a common support frame.

25. The method of claim 24, further comprising: providing that said rotors are staggered between adjacent of said driveshafts to avoid contact.

26. The method of claim 24, wherein said fluid flow is wind.

27. The method of claim 17, further comprising: providing that said rotors are staggered between adjacent of said driveshafts to avoid contact.

28. The method of claim 1, wherein said aiming step comprises supporting said driveshaft by at least one bearing.

29. The method of claim 26, wherein said aiming step comprises projecting said driveshaft from at least one bearing.

30. The method of claim 29, wherein said aiming step comprises supporting at least one said bearing by an elevating structure.

31. The method of claim 26, wherein said aiming step comprises suspending said driveshaft between a pair of bearings.

32. The method of claim 31, wherein said aiming step further comprises utilizing an intermediate support 220, to help support said driveshaft.

33. The method of claim 32, wherein said fluid flow is wind.

34. The method of claim 31, wherein said aiming step comprises supporting at least one said bearing by an elevating structure.

35. A method of harnessing power, from a fluid flow having a direction, comprising:

mounting a series of substantially horizontal-axis type rotors to a continuous, elongate driveshaft, substantially having an axis;

supporting each said rotor by said driveshaft, proximate a center of each said rotor;

providing each said rotor with a substantially coplanar set of elongate blades;

orienting said blades, wherein said blades substantially radiate outward, lengthwise, from said center of said rotor;

providing said blades with lifting foils, whereby said rotors may operate on the principle of lift;

configuring each said rotor, whereby each said set of blades is configured to rotate substantially within a plane of rotation;

spacing said rotors at a distance D, along said axis, whereby said planes of rotation are separated;

aiming said continuous elongate driveshaft at angle $\alpha$ (alpha) from said direction of said fluid flow;

spinning said rotors, whereby each said rotor sweeps a circular area from which energy is extracted from said current flow;

whereby;

the combination of angle $\alpha$ (alpha) and distance D allows fresh fluid flow, substantially undisturbed by an upstream rotor, to reach each said circular swept area, thereby exposing each said rotor to a substantially undisturbed portion of said fluid flow, whereby all said rotors are powered by said fluid flow, rotating said drive shaft;

whereby all said rotors contribute to a rotation of said driveshaft about its own said axis, whereby useful power may be drawn from said rotating driveshaft;

suspending said driveshaft between two supports selected from the set of: landforms, natural structures, and man-made structures;

wherein said driveshaft 10 is hollow, and said suspending step comprises locating said driveshaft around a nonrotating inner core 222, about which said driveshaft rotates.

36. A method of harnessing power, from a fluid flow having a direction, comprising:

mounting a series of substantially horizontal-axis type rotors to a continuous, elongate driveshaft, substantially having an axis;

supporting each said rotor by said driveshaft, proximate a center of each said rotor;

providing each said rotor with a substantially coplanar set of elongate blades;

orienting said blades, wherein said blades substantially radiate outward, lengthwise, from said center of said rotor;

providing said blades with lifting foils, whereby said rotors may operate on the principle of lift;

configuring each said rotor, whereby each said set of blades is configured to rotate substantially within a plane of rotation;

spacing said rotors at a distance D, along said axis, whereby said planes of rotation are separated;

aiming said continuous elongate driveshaft at angle $\alpha$ (alpha) from said direction of said fluid flow;

spinning said rotors, whereby each said rotor sweeps a circular area from which energy is extracted from said current flow;

whereby;

the combination of angle $\alpha$ (alpha) and distance D allows fresh fluid flow, substantially undisturbed by an upstream rotor, to reach each said circular swept area, thereby exposing each said rotor to a substantially undisturbed portion of said fluid flow, whereby all said rotors are powered by said fluid flow, rotating said drive shaft;

whereby all said rotors contribute to a rotation of said driveshaft about its own said axis, whereby useful power may be drawn from said rotating driveshaft;

further comprising: locating at least one additional, similar driveshaft with rotors, substantially parallel to the first said driveshaft with rotors, whereby said rotors form a virtual surface of rotors;

whereby said virtual surface is at angle $\alpha$ (alpha) to said flow direction;

wherein said locating step comprises placing one said driveshaft above another, whereby said virtual surface is a substantially vertical surface.

37. The method of claim 36, wherein said fluid flow is wind.

38. A method of harnessing power, from a fluid flow having a direction, comprising:

mounting a series of substantially horizontal-axis type rotors to a continuous, elongate driveshaft, substantially having an axis;

supporting each said rotor by said driveshaft, proximate a center of each said rotor;

providing each said rotor with a substantially coplanar set of elongate blades;

orienting said blades, wherein said blades substantially radiate outward, lengthwise, from said center of said rotor;

providing said blades with lifting foils, whereby said rotors may operate on the principle of lift;

configuring each said rotor, whereby each said set of blades is configured to rotate substantially within a plane of rotation;

spacing said rotors at a distance D, along said axis, whereby said planes of rotation are separated;

aiming said continuous elongate driveshaft at angle $\alpha$ (alpha) from said direction of said fluid flow;

spinning said rotors, whereby each said rotor sweeps a circular area from which energy is extracted from said current flow;

whereby;

the combination of angle $\alpha$ (alpha) and distance D allows fresh fluid flow, substantially undisturbed by an upstream rotor, to reach each said circular swept area, thereby exposing each said rotor to a substantially undisturbed portion of said fluid flow, whereby all said rotors are powered by said fluid flow, rotating said drive shaft;

whereby all said rotors contribute to a rotation of said driveshaft about its own said axis, whereby useful power may be drawn from said rotating driveshaft;

wherein said aiming step comprises supporting said driveshaft by at least one bearing;

wherein said aiming step comprises suspending said driveshaft between a pair of bearings;

further comprising: applying tension to said driveshaft through application of a tension means 210.

39. The method of claim 38, wherein said tension means 210 comprises the weight of an elevating structure.

40. A method of harnessing power, from a fluid flow having a direction, comprising:

mounting a series of substantially horizontal-axis type rotors to a continuous, elongate driveshaft, substantially having an axis;

supporting each said rotor by said driveshaft, proximate a center of each said rotor;

providing each said rotor with a substantially coplanar set of elongate blades;

orienting said blades, wherein said blades substantially radiate outward, lengthwise, from said center of said rotor;

providing said blades with lifting foils, whereby said rotors may operate on the principle of lift;

configuring each said rotor, whereby each said set of blades is configured to rotate substantially within a plane of rotation;

spacing said rotors at a distance D, along said axis, whereby said planes of rotation are separated;

aiming said continuous elongate driveshaft at angle á (alpha) from said direction of said fluid flow;

spinning said rotors, whereby each said rotor sweeps a circular area from which energy is extracted from said current flow;

whereby;

the combination of angle á (alpha) and distance D allows fresh fluid flow, substantially undisturbed by an upstream rotor, to reach each said circular swept area, thereby exposing each said rotor to a substantially undisturbed portion of said fluid flow, whereby all said rotors are powered by said fluid flow, rotating said drive shaft;

whereby all said rotors contribute to a rotation of said driveshaft about its own said axis, whereby useful power may be drawn from said rotating driveshaft;

whereby said aiming step comprises placing said driveshaft in catenary suspension.

41. A method of harnessing power, from a fluid flow having a direction, comprising:

mounting a series of substantially horizontal-axis type rotors to a continuous, elongate driveshaft, substantially having an axis;

supporting each said rotor by said driveshaft, proximate a center of each said rotor;

providing each said rotor with a substantially coplanar set of elongate blades;

orienting said blades, wherein said blades substantially radiate outward, lengthwise, from said center of said rotor;

providing said blades with lifting foils, whereby said rotors may operate on the principle of lift;

configuring each said rotor, whereby each said set of blades is configured to rotate substantially within a plane of rotation;

spacing said rotors at a distance D, along said axis, whereby said planes of rotation are separated;

aiming said continuous elongate driveshaft at angle á (alpha) from said direction of said fluid flow;

spinning said rotors, whereby each said rotor sweeps a circular area from which energy is extracted from said current flow;

whereby;

the combination of angle á (alpha) and distance D allows fresh fluid flow, substantially undisturbed by an upstream rotor, to reach each said circular swept area, thereby exposing each said rotor to a substantially undisturbed portion of said fluid flow, whereby all said rotors are powered by said fluid flow, rotating said drive shaft;

whereby all said rotors contribute to a rotation of said driveshaft about its own said axis, whereby useful power may be drawn from said rotating driveshaft;

wherein said aiming step comprises supporting said driveshaft by at least one bearing;

wherein said aiming step comprises suspending said driveshaft between a pair of bearings;

whereby said aiming step comprises placing said driveshaft in catenary suspension.

42. A method of harnessing power, from a fluid flow having a direction, comprising:

mounting a series of substantially horizontal-axis type rotors to a continuous, elongate driveshaft, substantially having an axis;

supporting each said rotor by said driveshaft, proximate a center of each said rotor;

providing each said rotor with a substantially coplanar set of elongate blades;

orienting said blades, wherein said blades substantially radiate outward, lengthwise, from said center of said rotor;

providing said blades with lifting foils, whereby said rotors may operate on the principle of lift;

configuring each said rotor, whereby each said set of blades is configured to rotate substantially within a plane of rotation;

spacing said rotors at a distance D, along said axis, whereby said planes of rotation are separated;

aiming said continuous elongate driveshaft at angle á (alpha) from said direction of said fluid flow;

spinning said rotors, whereby each said rotor sweeps a circular area from which energy is extracted from said current flow;

whereby;

the combination of angle á (alpha) and distance D allows fresh fluid flow, substantially undisturbed by an upstream rotor, to reach each said circular swept area, thereby exposing each said rotor to a substantially undisturbed portion of said fluid flow, whereby all said rotors are powered by said fluid flow, rotating said drive shaft;

whereby all said rotors contribute to a rotation of said driveshaft about its own said axis, whereby useful power may be drawn from said rotating driveshaft;

wherein said aiming step comprises supporting said driveshaft by at least one bearing;

wherein said aiming step comprises suspending said driveshaft between a pair of bearings;

wherein said elevating structure comprises a tree.

43. The method of claim 1, wherein said fluid flow is wind.

* * * * *